Figure 3B:
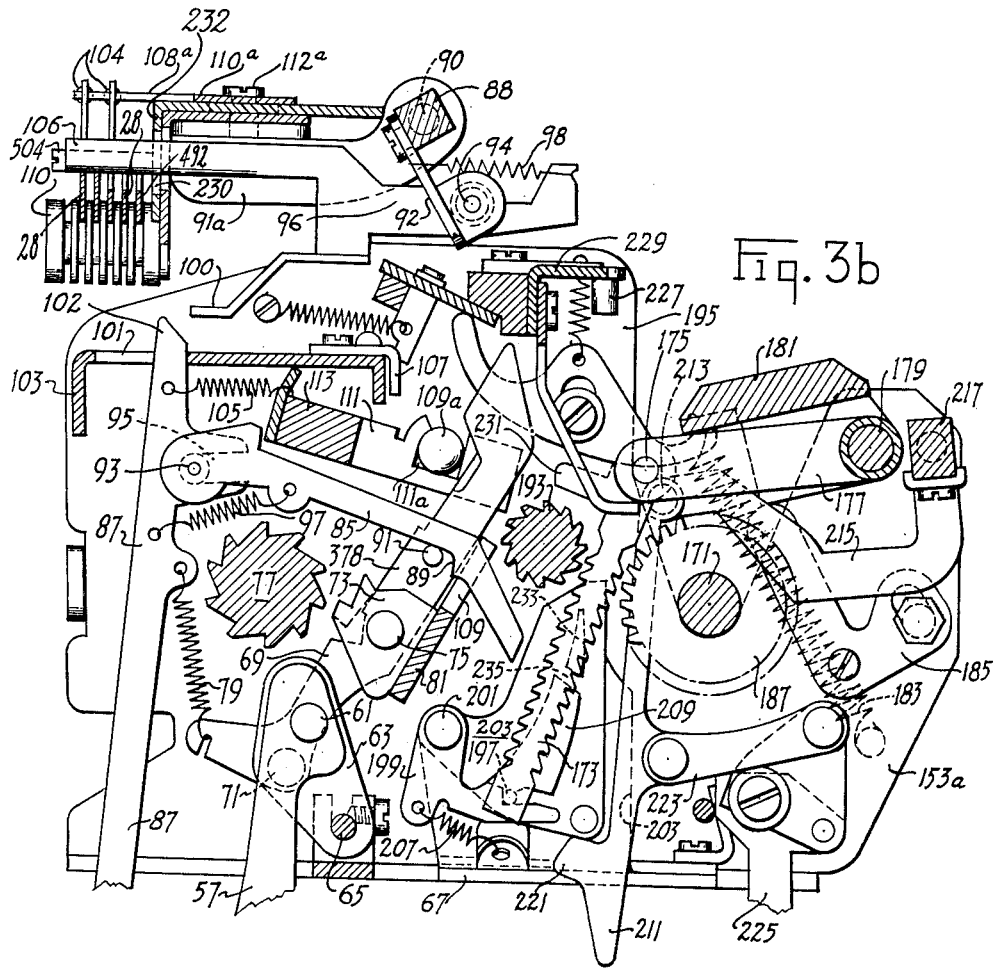

Jan. 13, 1953  O. J. SUNDSTRAND  2,625,324
TOTAL TAKING MEANS FOR TYPEWRITER-COMPUTERS
Filed Sept. 4, 1944  20 Sheets-Sheet 1

Fig. 1.

INVENTOR
OSCAR J. SUNDSTRAND
BY
ATTORNEY

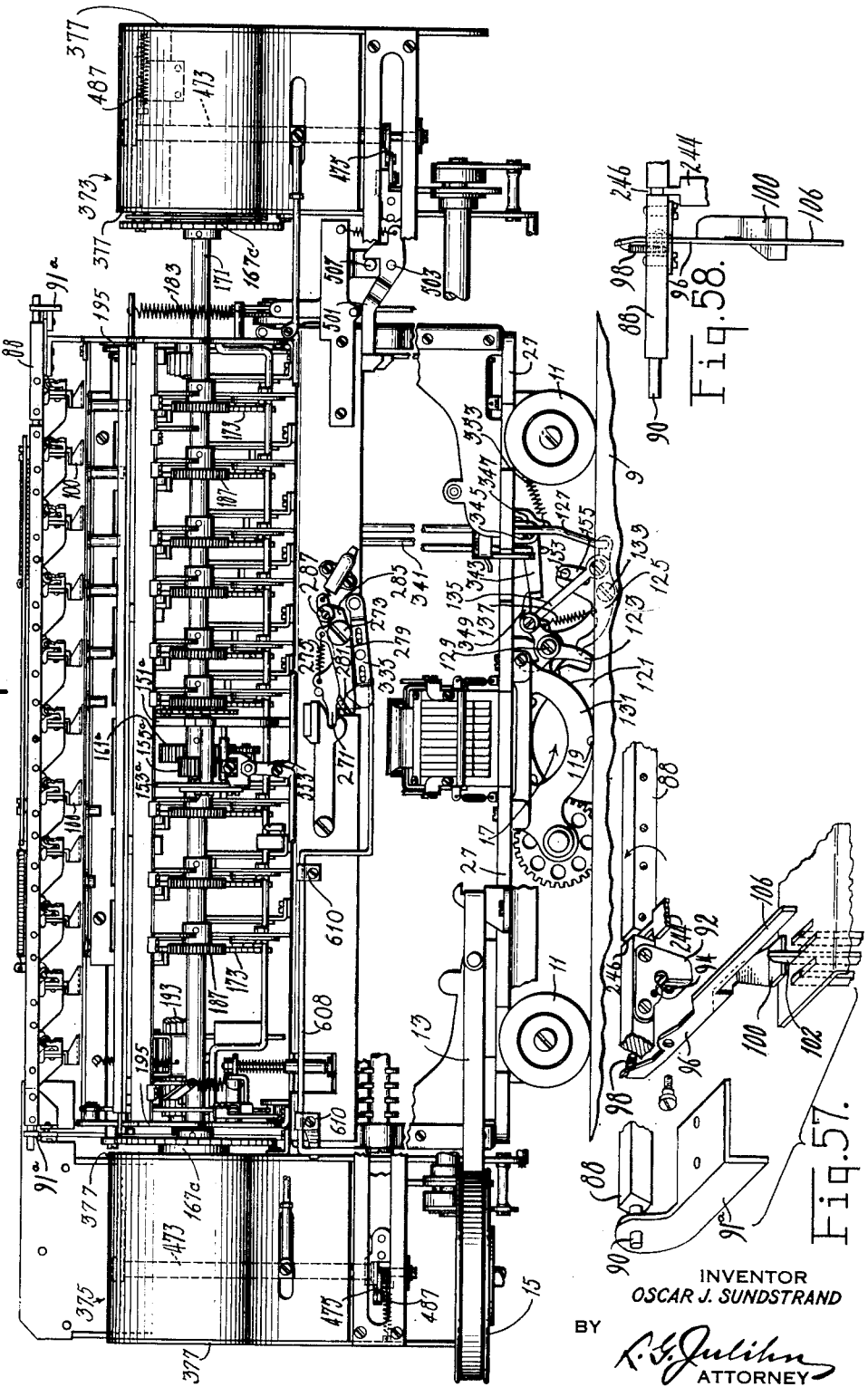

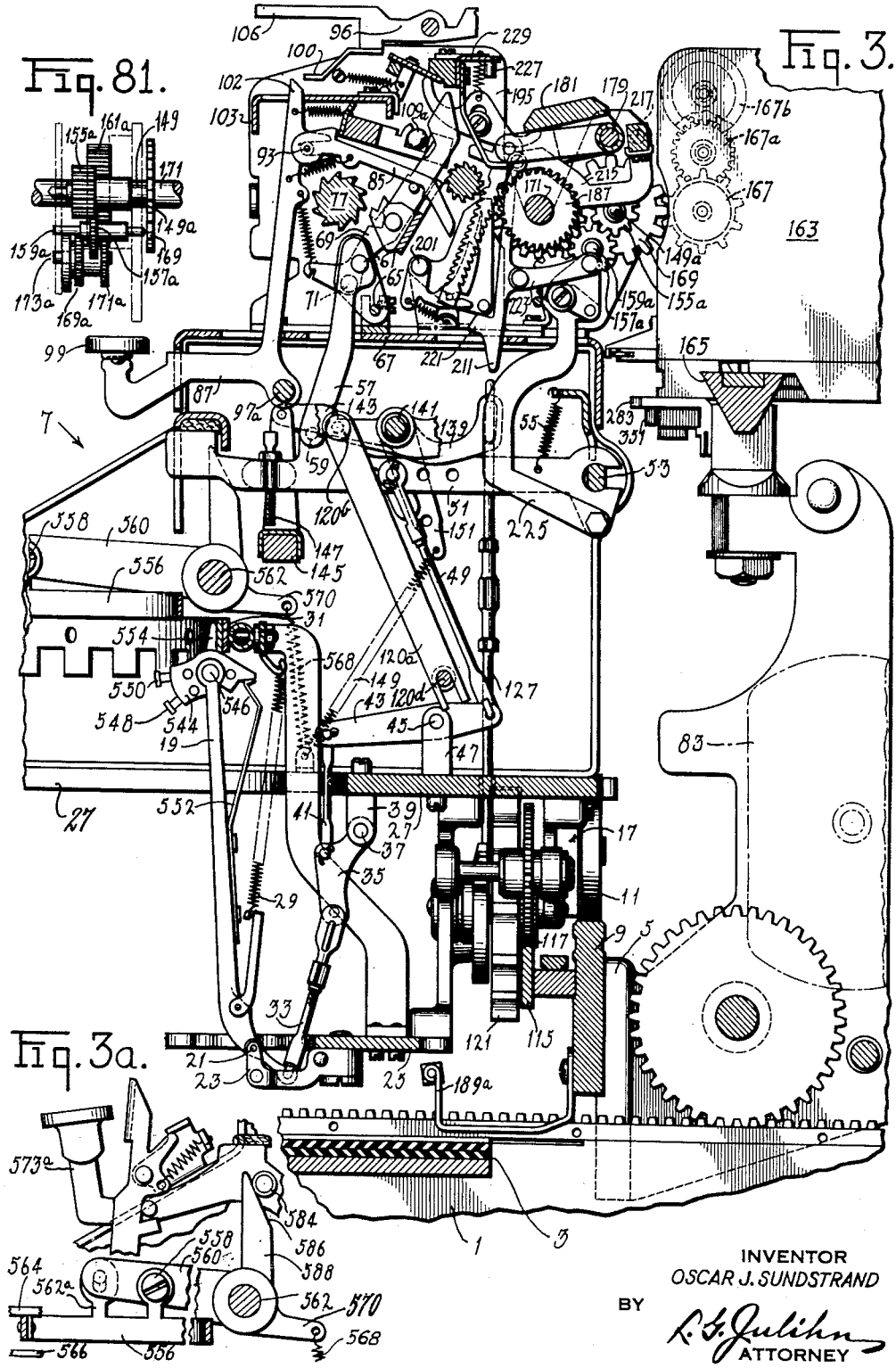

Jan. 13, 1953

O. J. SUNDSTRAND 2,625,324

TOTAL TAKING MEANS FOR TYPEWRITER-COMPUTERS

Filed Sept. 4, 1944

20 Sheets-Sheet 4

INVENTOR
OSCAR J. SUNDSTRAND
BY
ATTORNEY

Jan. 13, 1953          O. J. SUNDSTRAND          2,625,324

TOTAL TAKING MEANS FOR TYPEWRITER-COMPUTERS

Filed Sept. 4, 1944                                            20 Sheets—Sheet 5

Fig. 4.

Fig. 5.

INVENTOR
OSCAR J. SUNDSTRAND

BY *R. G. Julihn*
ATTORNEY

Jan. 13, 1953     O. J. SUNDSTRAND     2,625,324
TOTAL TAKING MEANS FOR TYPEWRITER-COMPUTERS
Filed Sept. 4, 1944     20 Sheets-Sheet 6
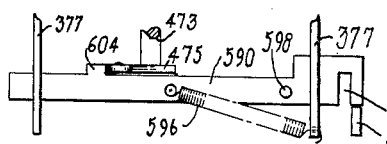
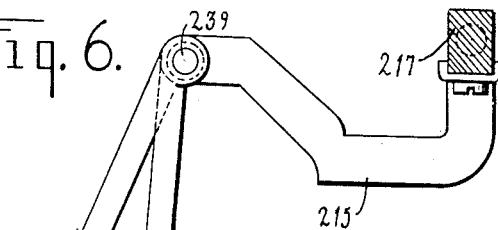
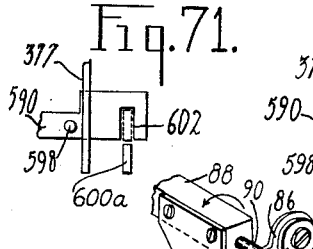
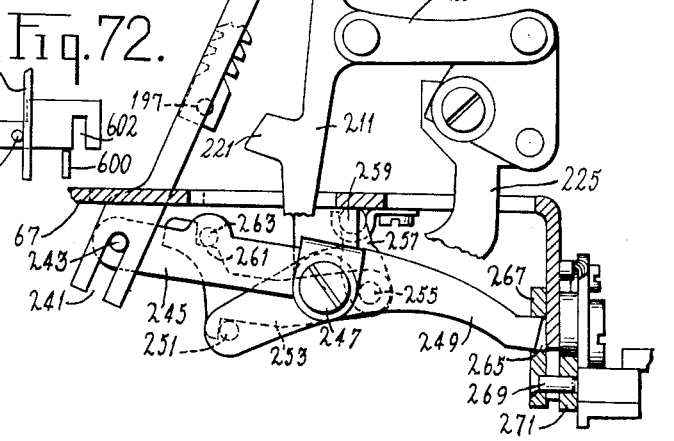
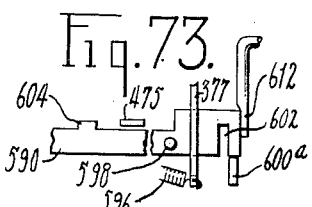
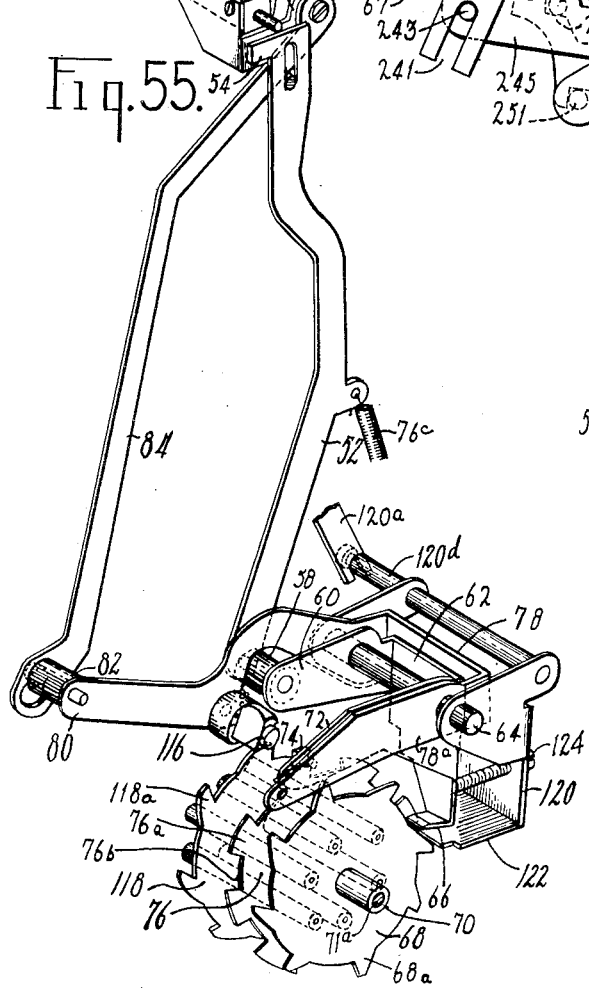
INVENTOR
OSCAR J. SUNDSTRAND
BY
K. G. Julihn
ATTORNEY

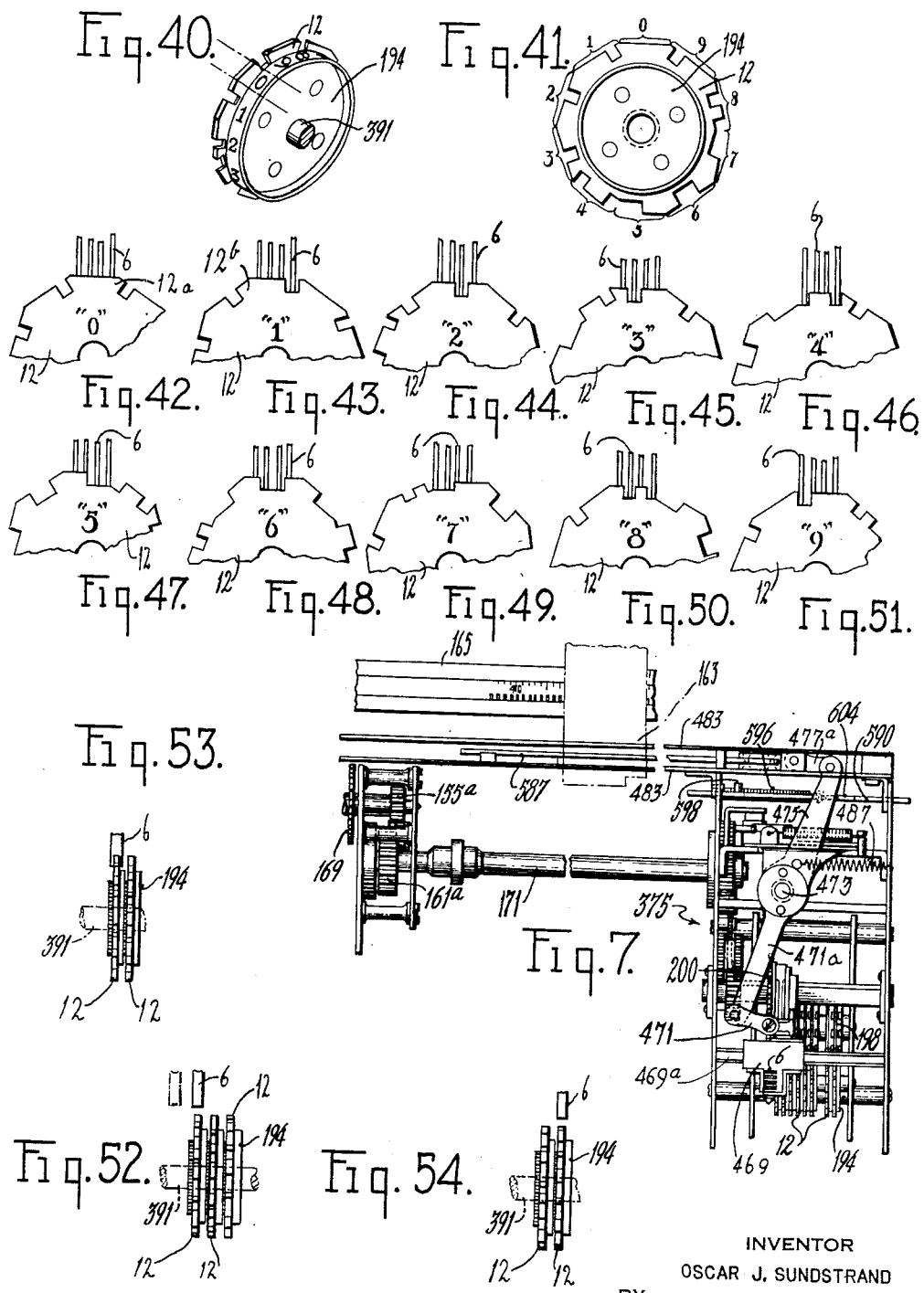

Jan. 13, 1953   O. J. SUNDSTRAND   2,625,324
TOTAL TAKING MEANS FOR TYPEWRITER-COMPUTERS
Filed Sept. 4, 1944   20 Sheets-Sheet 8

INVENTOR
OSCAR J. SUNDSTRAND
BY
*C. G. Julihn*
ATTORNEY

Jan. 13, 1953 O. J. SUNDSTRAND 2,625,324
TOTAL TAKING MEANS FOR TYPEWRITER-COMPUTERS
Filed Sept. 4, 1944 20 Sheets-Sheet 10
Fig. 11.
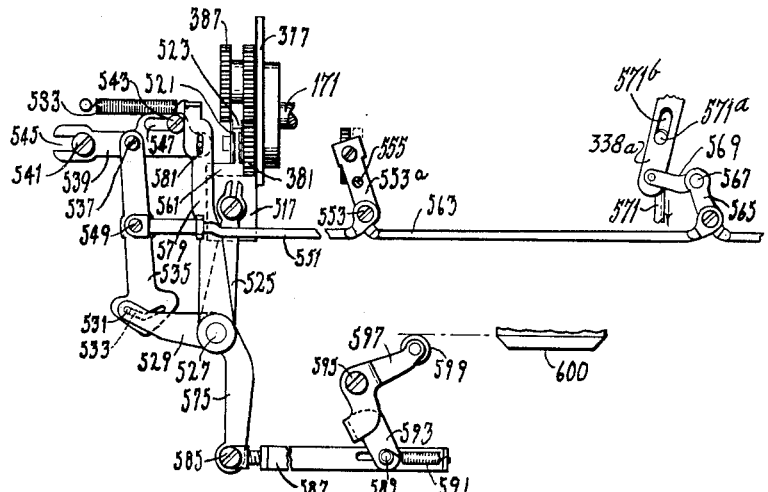
Fig. 12.
Fig. 13.
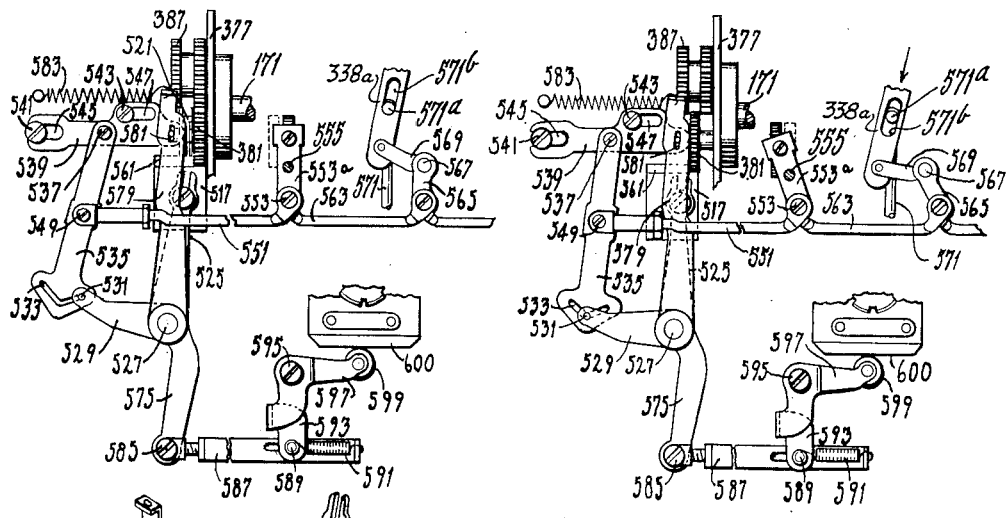
Fig. 14.
INVENTOR
OSCAR J. SUNDSTRAND
BY
ATTORNEY Jan. 13, 1953 O. J. SUNDSTRAND 2,625,324
TOTAL TAKING MEANS FOR TYPEWRITER-COMPUTERS
Filed Sept. 4, 1944 20 Sheets-Sheet 11
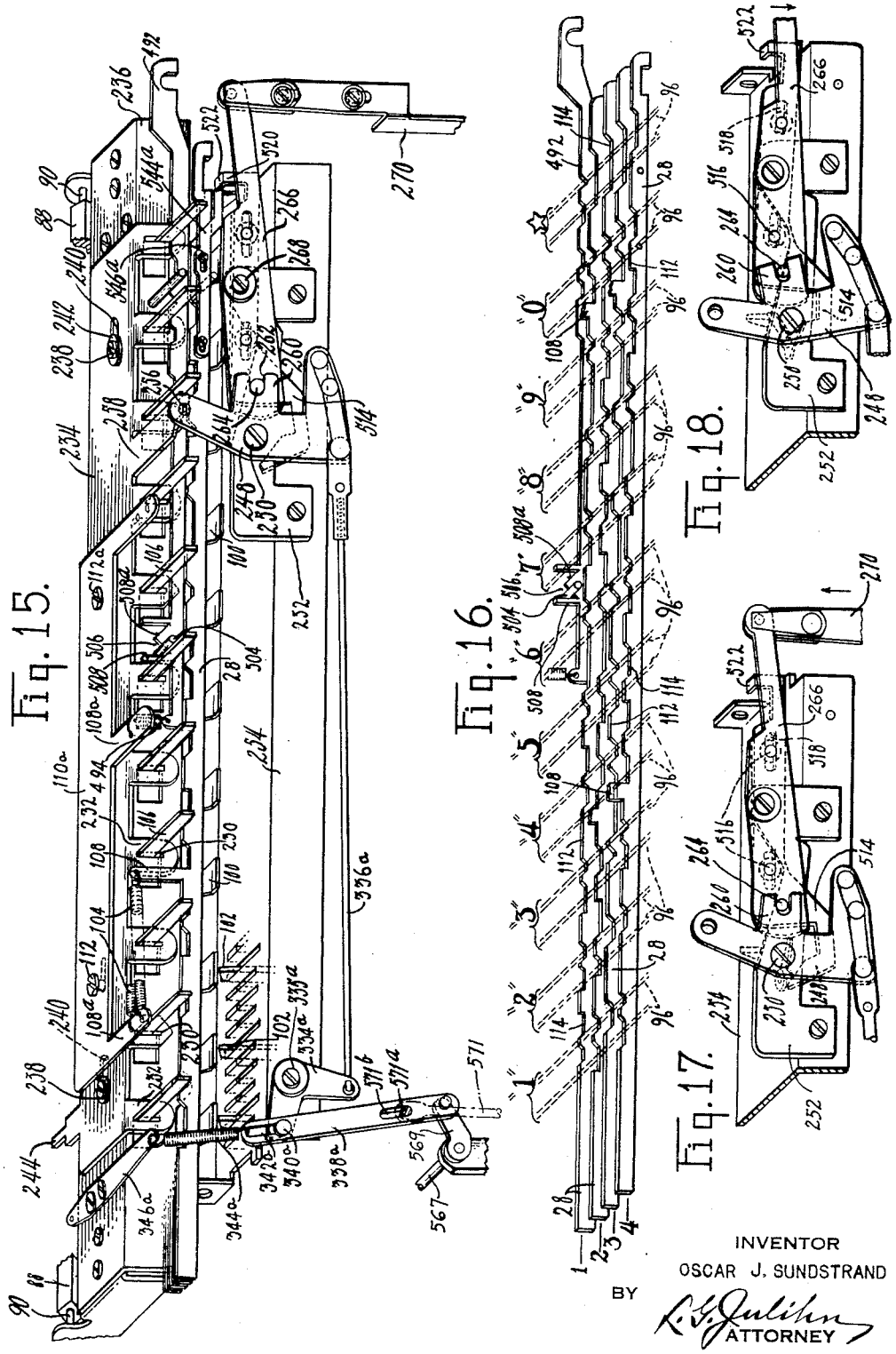
INVENTOR
OSCAR J. SUNDSTRAND
BY
ATTORNEY

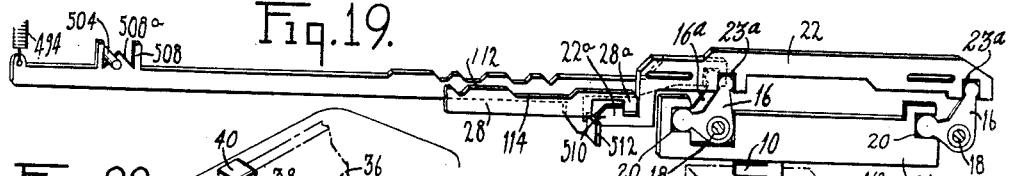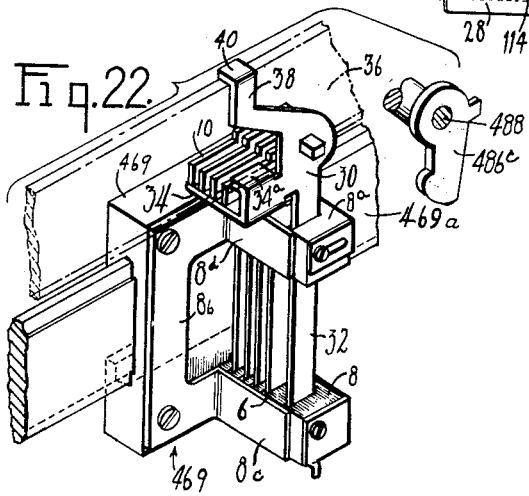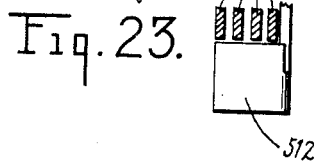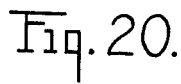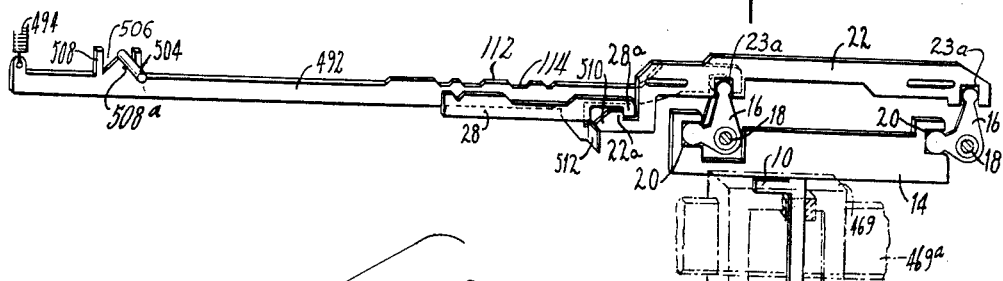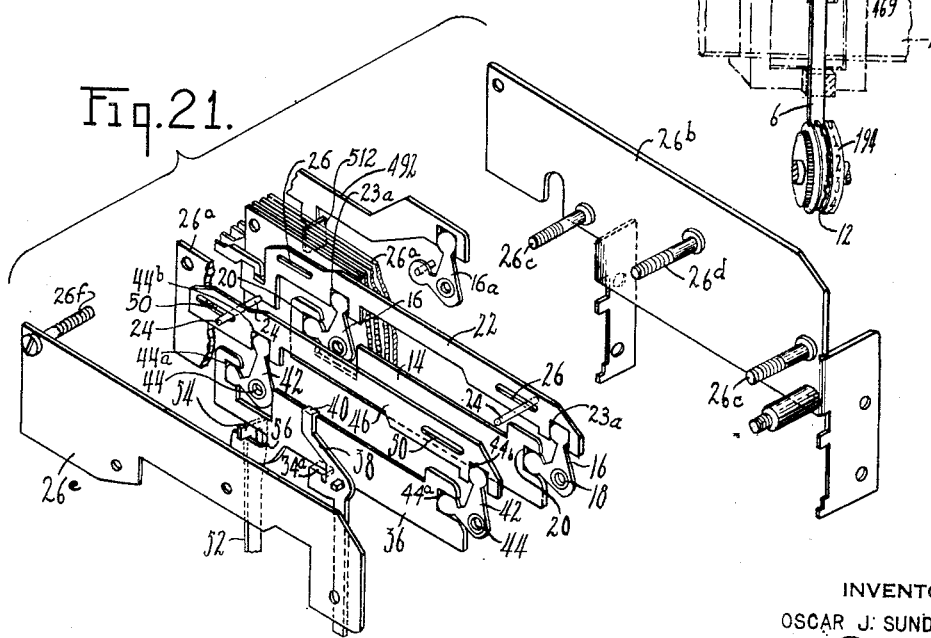

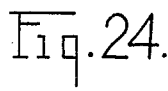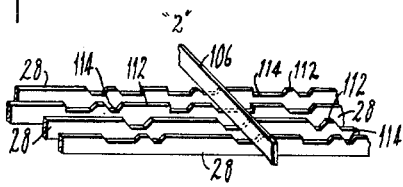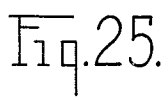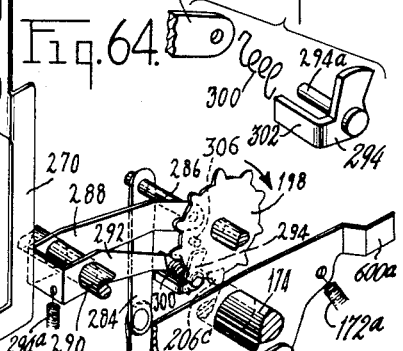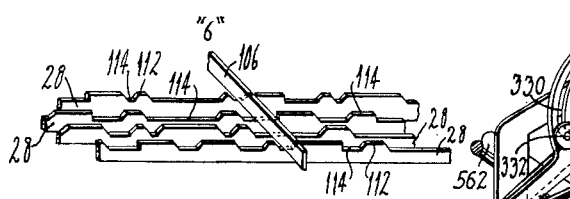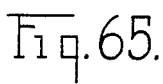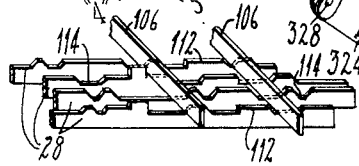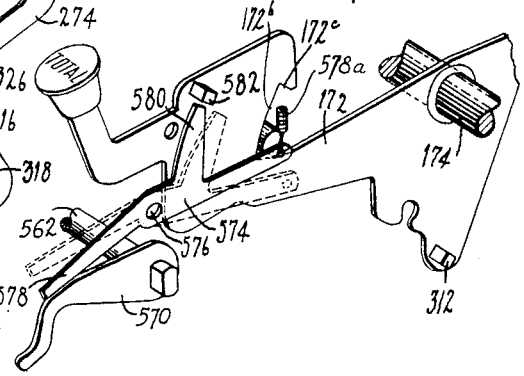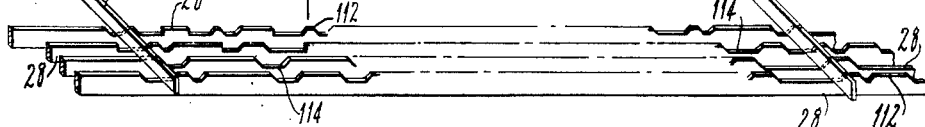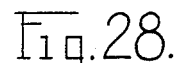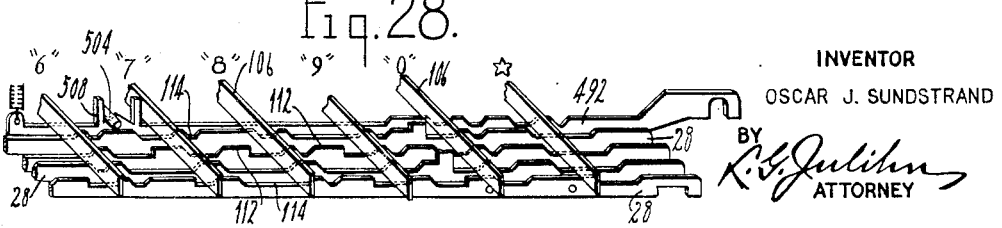

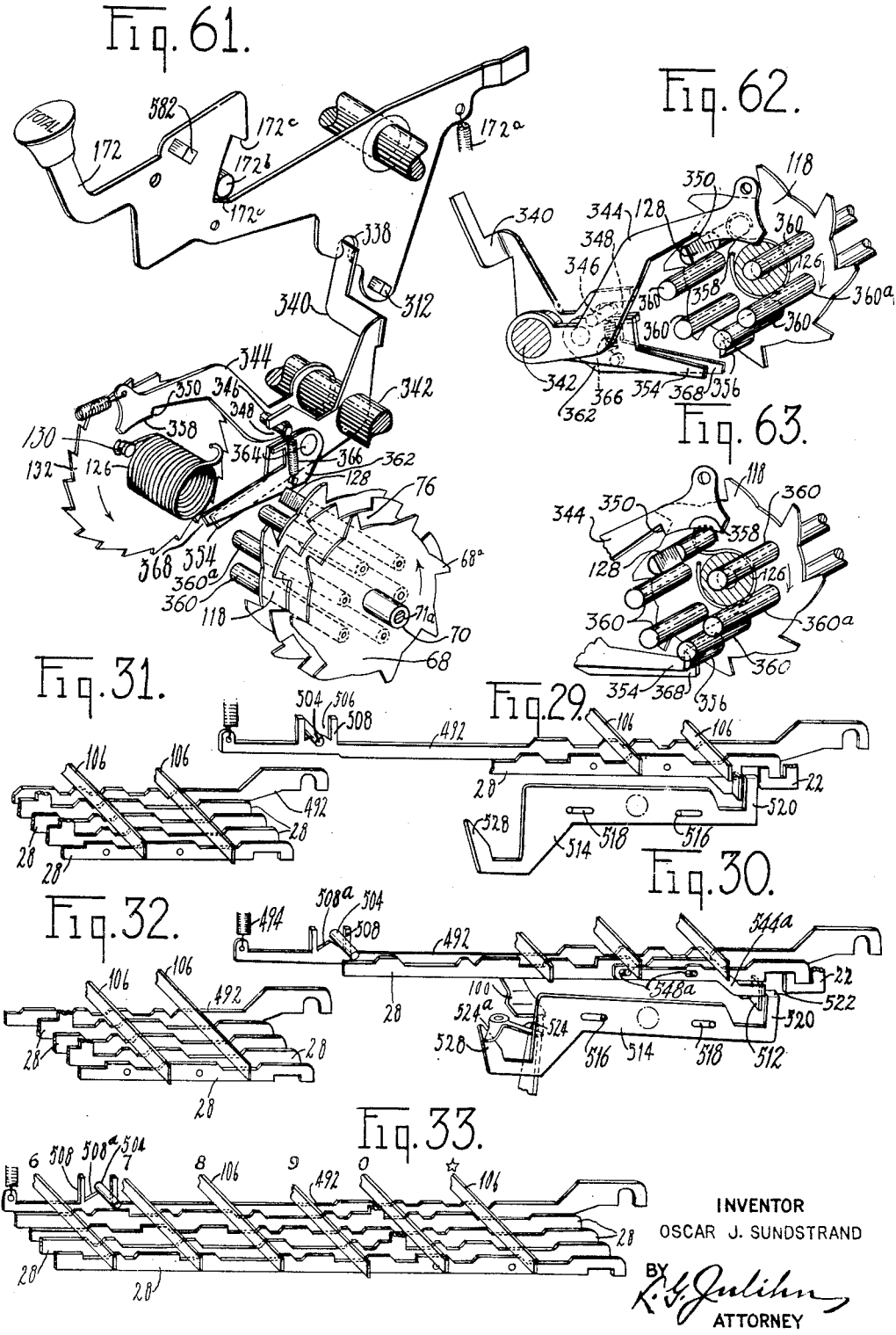

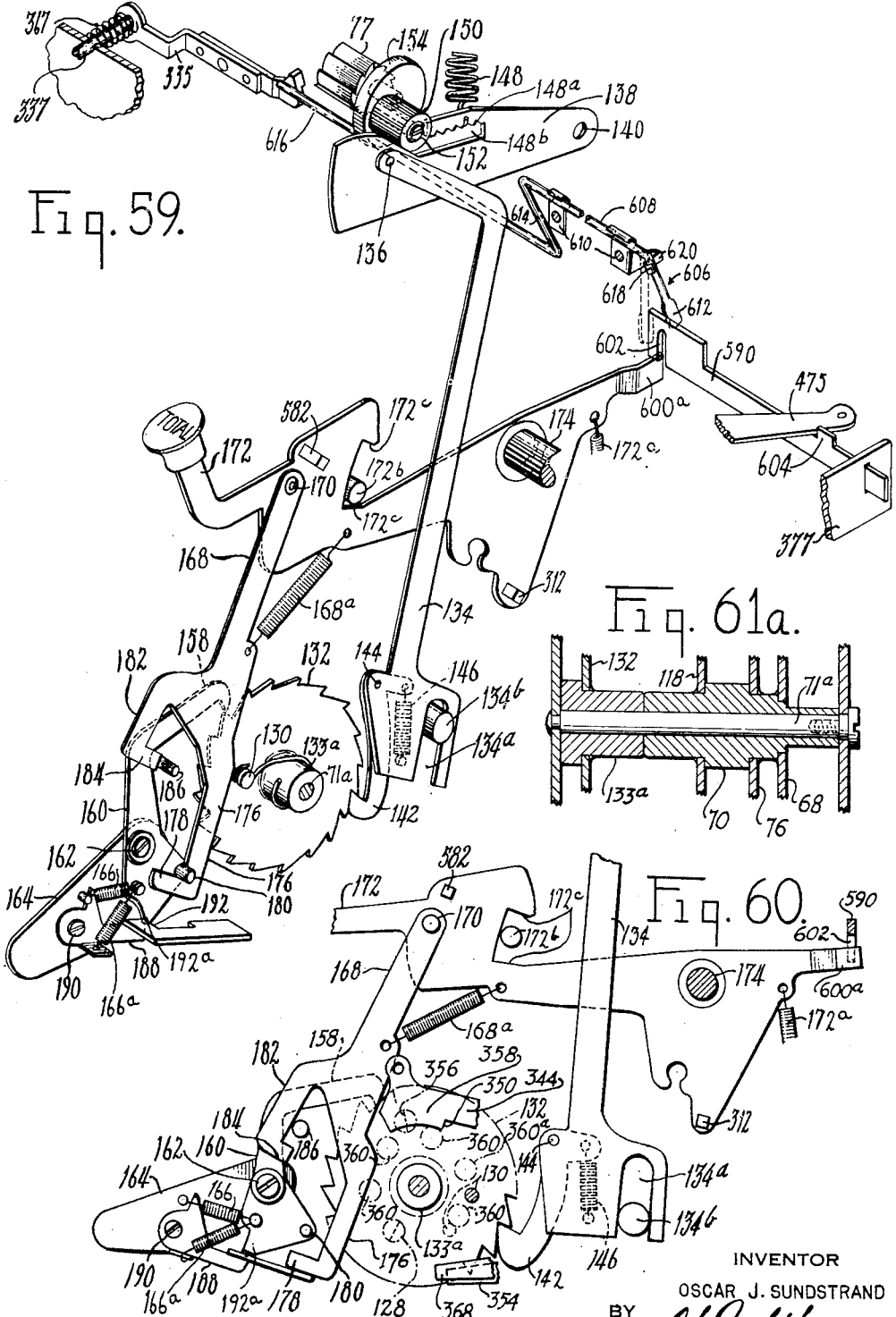

Jan. 13, 1953           O. J. SUNDSTRAND           2,625,324
TOTAL TAKING MEANS FOR TYPEWRITER-COMPUTERS
Filed Sept. 4, 1944           20 Sheets-Sheet 17

INVENTOR
OSCAR J. SUNDSTRAND
BY
ATTORNEY

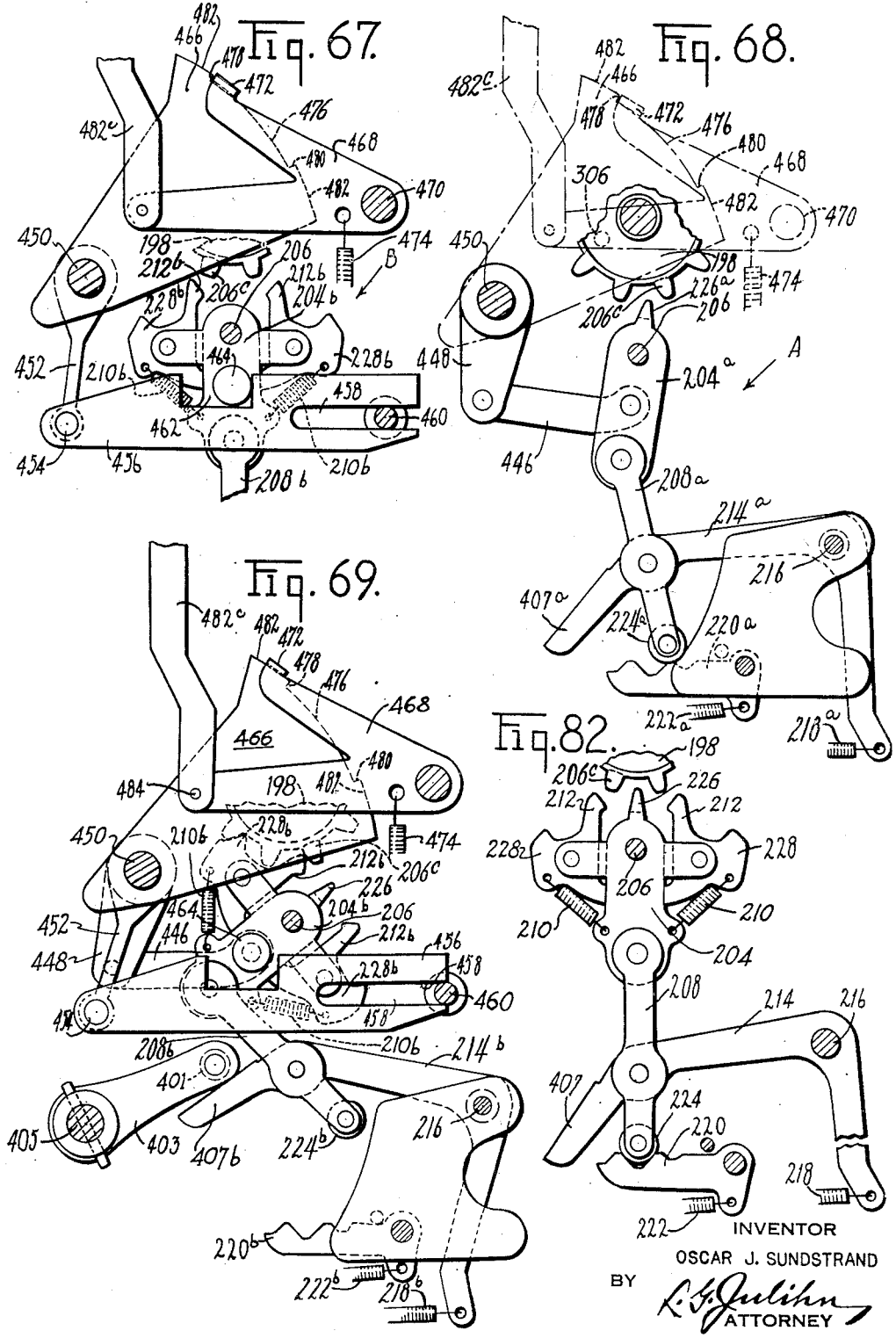

Jan. 13, 1953     O. J. SUNDSTRAND     2,625,324
TOTAL TAKING MEANS FOR TYPEWRITER-COMPUTERS
Filed Sept. 4, 1944     20 Sheets-Sheet 19
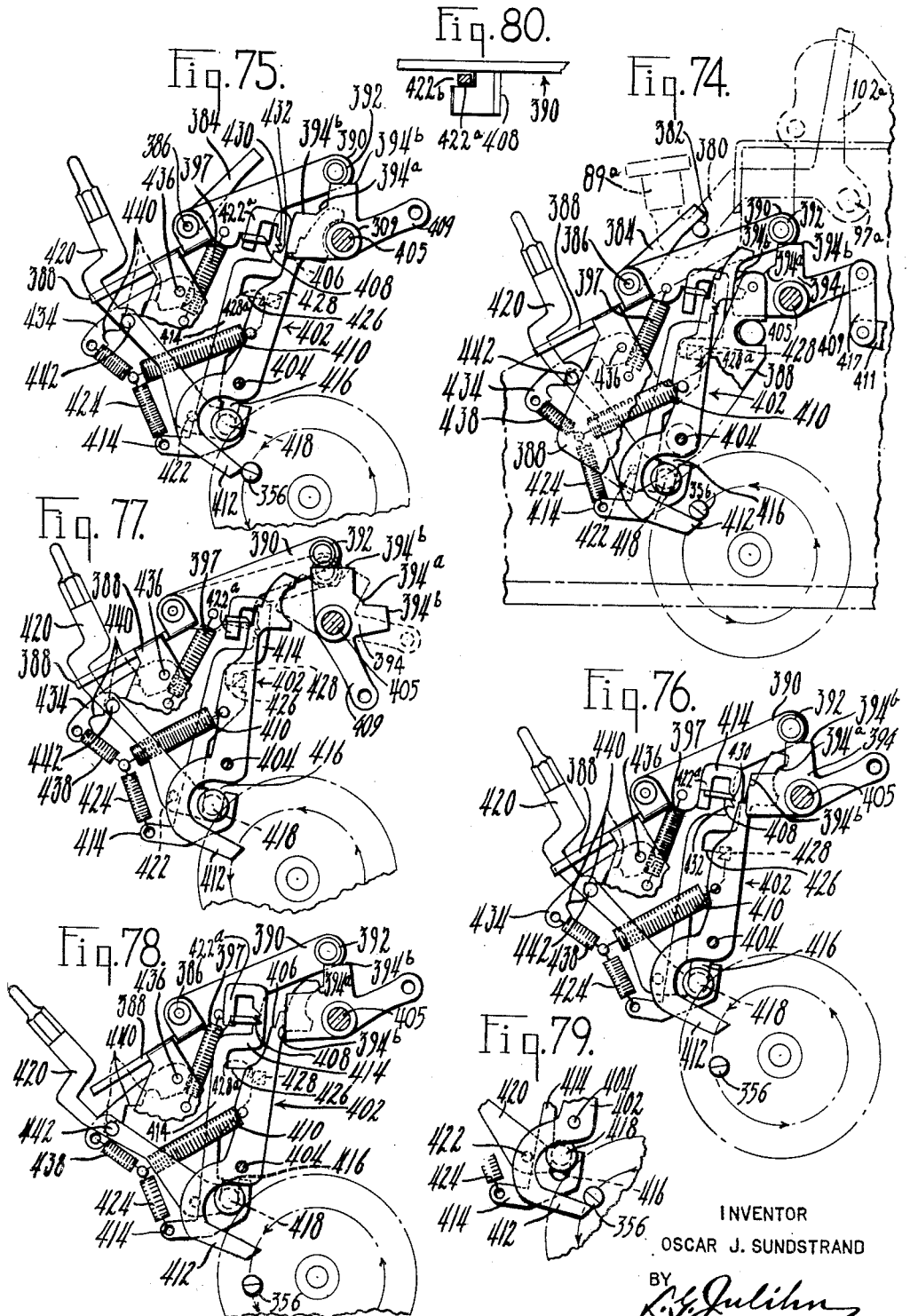
INVENTOR
OSCAR J. SUNDSTRAND
BY
ATTORNEY Patented Jan. 13, 1953

2,625,324

UNITED STATES PATENT OFFICE 2,625,324

TOTAL TAKING MEANS FOR TYPEWRITER-COMPUTERS

Oscar J. Sundstrand, West Hartford, Conn., assignor to Underwood Corporation, a corporation of Delaware Application September 4, 1944, Serial No. 552,656

43 Claims. (Cl. 235—59)

This invention relates to combined typewriting and accounting machines and more particularly to mechanism for automatically selecting the type-bar mechanisms and actuating the same by power to print a total entered in one of the registers of the machine.

One object of the invention is to improve the construction and mode of operation of machines of the above type and to produce a machine having novel and improved mechanism for selecting and actuating the typewriting type bars to print, digit by digit, a total entered in one of the registers of the machine.

Another object of the invention is to provide combined typewriting and accounting machines with novel and improved automatic mechanism for taking negative as well as positive totals from one of the registers.

Another object of the invention is to produce a typewriting and accounting machine of the so-called Elliott-Fisher or flat-platen type having an automatic total-taking mechanism for printing totals entered in one of the cross-totalizers.

With the above and other objects in view, the invention consists in a machine embodying the novel and improved features, constructions, and combination of parts hereinafter described and particularly pointed out in the claims, the advantages of which will be readily understood and appreciated by those skilled in the art.

The various features of the invention will be clearly understood from the accompanying drawings illustrating a machine embodying the invention in its preferred form, and the following detailed description of the construction therein shown.

Figure 8:
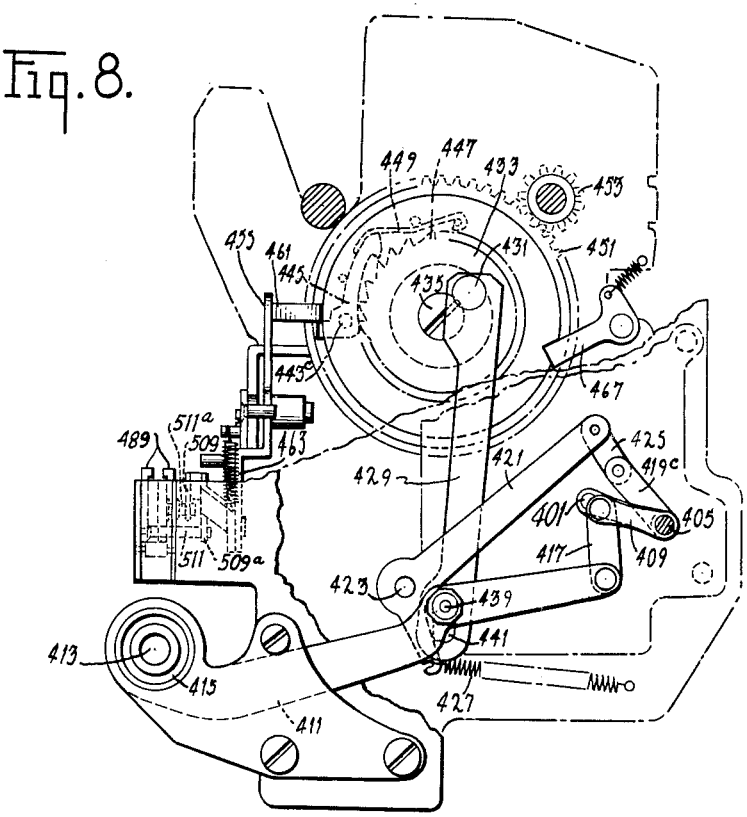
Figure 9:
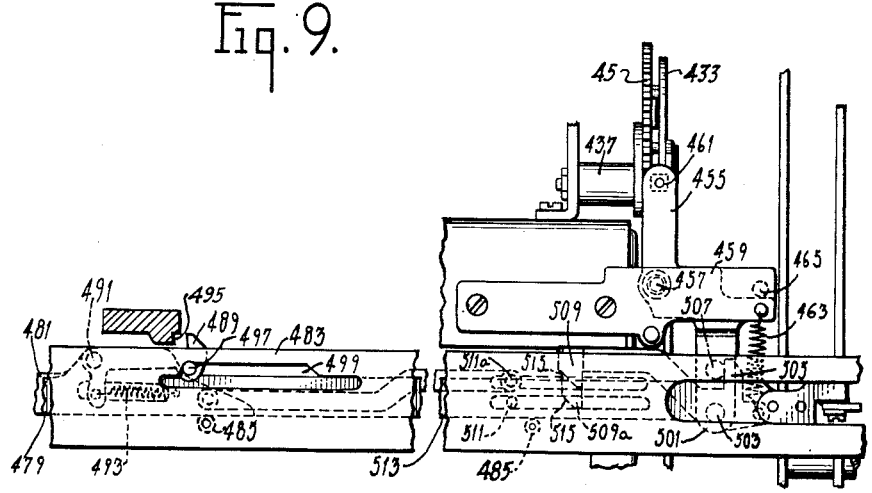
Figure 10:
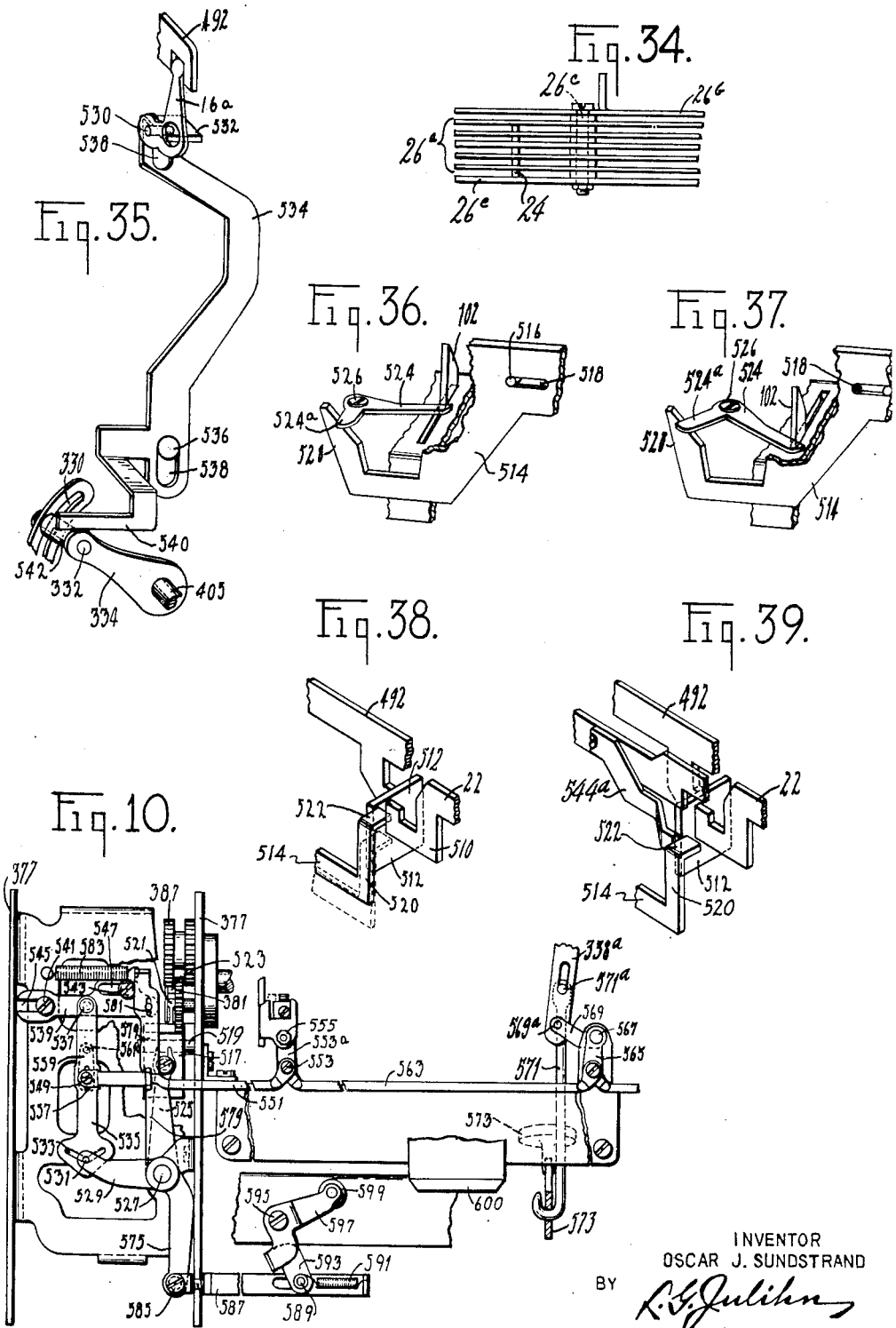
Figure 60A:
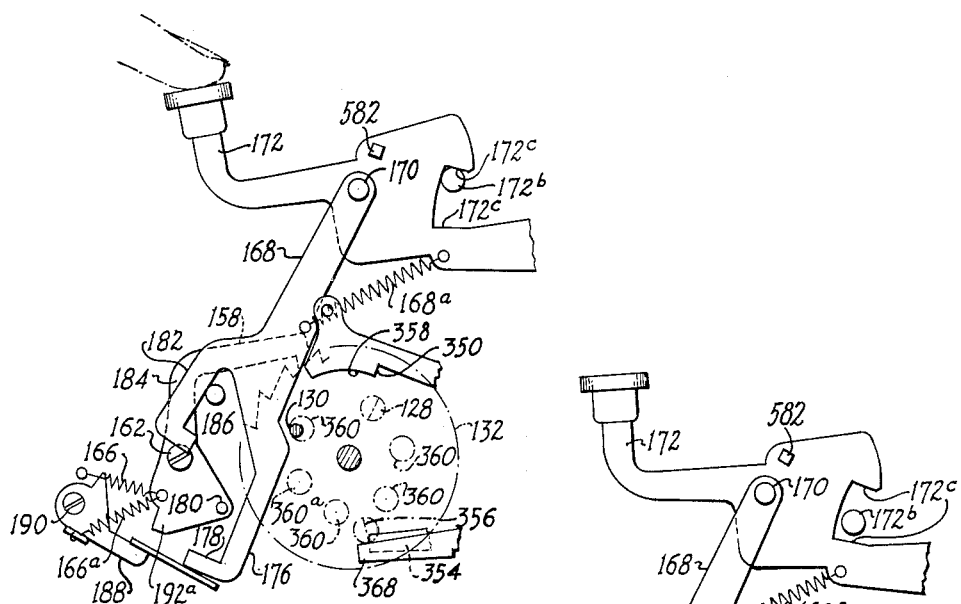
Figure 60B:
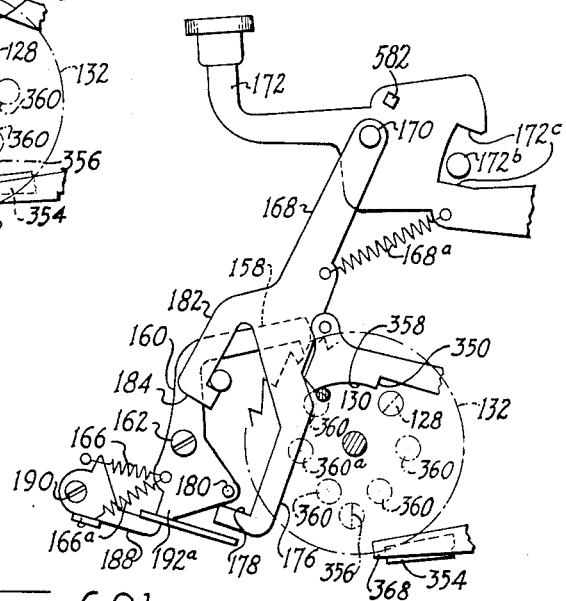
Figure 66:
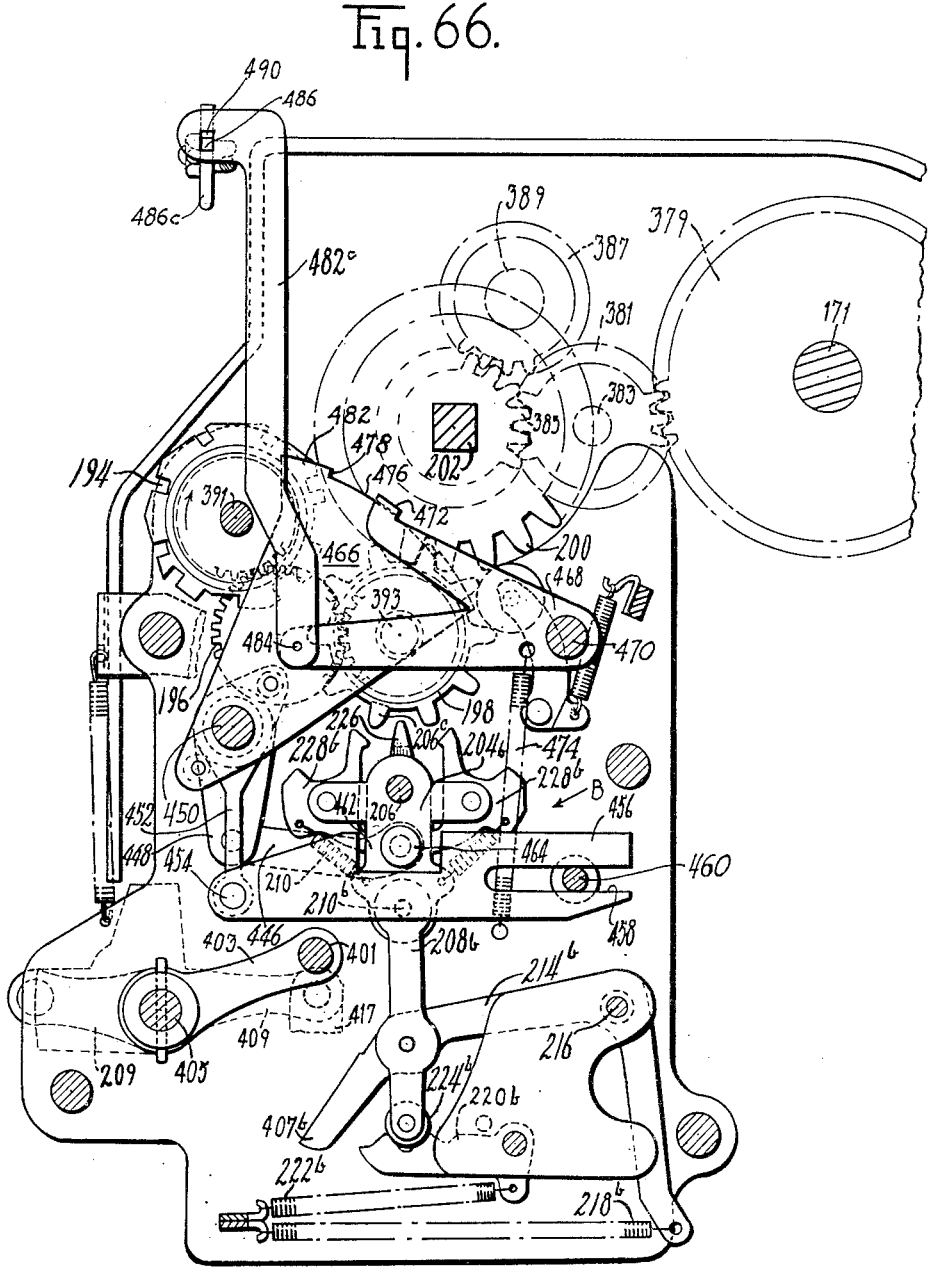

In the drawings:

Figure 1 is a perspective view of a machine embodying the invention, showing the mechanism more directly concerned in the invention in full lines, and the remainder of the machine in dot-and-dash lines, Figure 2 is a view in rear elevation illustrating particularly the type head or carriage of the machine, Figure 3 is a view in vertical section of the machine illustrating particularly the type bar and differential actuator mechanisms, Figure 3a is a detail view in side elevation illustrating the type shift mechanism for the numeral types, Figure 3b is a view similar to Figure 3 illustrating a portion of the mechanism shown in Figure 3 on an enlarged scale, Figure 4 is a detail plan view illustrating the mechanism for rendering the differential mechanism operative when the carriage is in the zone of a column register and the decimal space or trip mechanism, Figure 5 is a view in side elevation illustrating particularly certain parts of the mechanisms shown in Figure 4, and certain associated parts, Figure 6 is a detail view in vertical section illustrating particularly the mechanism for rendering the differential mechanism operative when the carriage is in the zone of a register, Figure 7 is a plan view of a portion of the machine and illustrating particularly one of the cross-computing register mechanisms, Figure 8 is a detail view in side elevation illustrating particularly the transfer reset mechanism for one of the cross-computing registers, Figure 9 is a rear elevation showing certain parts of the mechanism illustrated in Figure 8 and certain associated parts, Figure 10 is a view in rear elevation illustrating the driving means for one of the cross-computing registers and the mechanism for controlling the state of said driving means, as to addition or subtraction, from the subtract key and from an automatically acting subtract cam, Figures 11, 12, and 13 are views similar to Figure 10 and illustrating certain parts of the mechanism, respectively, in different positions in the several figures, Figure 14 is a detail perspective view showing certain parts illustrated in Figures 10–13, inclusive, Figure 15 is a detail perspective view taken from the front of the type head and illustrating the mechanism for selectively controlling the actuation of the type bars from the total contained in one of the cross-computing registers and the mechanism for shifting certain of the parts, when the register moves from positive to negative condition, and from negative to positive condition, Figure 16 is a detail perspective somewhat diagrammatic view illustrating certain longitudinally movable code bars for controlling the selective actuation of the type bars, detached from the machine, looking from the front thereof, Figure 17 is a detail perspective view illustrating certain of the parts shown in Figure 15, Figure 18 is a view similar to Figure 17 showing certain of the parts in different positions, Figure 19 is a detail perspective view illustrating certain of the parts shown in Figures 15 and 16 for selectively controlling the actuation of the type-bars and an associated feeler mechanism, Figure 20 is a view similar to Figure 19 illustrating certain of the parts in different positions, Figure 21 is an exploded view in perspective illustrating certain parts of the feeler mechanism for selectively controlling the actuation of the type-bars, Figure 22 is a detail perspective view illustrating particularly certain parts of said feeler mechanism, Figure 23 is a detail view, partly in side elevation and partly in section, illustrating the code bars for controlling the selection of the type-bar mechanisms, Figure 24 is a perspective somewhat diagrammatic view illustrating a porton of each of the code bars for controlling the selection of the type-bar mechanisms and a portion of a cooperating selector lever, looking from the front thereof, Figure 25 is a view similar to Figure 24 illustrating certain of said code bars and another of the selector levers, Figure 26 is a view similar to Figures 24 and 25 illustrating certain of the code bars and two other selector levers, Figure 27 is a view similar to Figures 24 and 25 illustrating certain of the code bars and two other selector levers, Figure 28 is a view similar to Figures 24 and 25 illustrating the code bars and the selector levers for the numbers 6, 7, 8, 9 and 0 and the star signal selector lever, Figure 29 is a detail perspective view illustrating two of the code bars for selecting the type-bars, two of the selector levers and certain associated parts for controlling the printing of the star signals and zeros, Figure 30 is a detail view similar to Figure 29 illustrating certain of the parts in different positions, Figure 31 is a detail perspective view similar to Figures 24 to 28 inclusive, illustrating the several code bars and the selector levers for controlling the printing of zeros and star signals, Figure 32 is a view similar to Figure 31, illustrating certain of the parts in different positions, Figure 33 is a detail perspective view similar to Figures 31 and 32, illustrating the code bars and the selector levers, corresponding to the numerals 6, 7, 8, 9 and 0, and the star signal lever, with certain parts in different positions from those in which they are shown in any of the other figures, Figure 34 is a detail plan view illustrating certain parts of the feeler mechanism, Figure 35 is a detail perspective view illustrating the mechanism for restoring the rear code bar to normal position, Figure 36 is a detail perspective view illustrating certain parts of the mechanisms for controlling the positions of the code bars, Figure 37 is a view similar to Figure 36 illustrating certain of the parts in different positions, Figure 38 is a detail perspective view illustrating certain other parts of the mechanisms for controlling the positions of the code bars, Figure 39 is a view similar to Figure 38 illustrating the mechanism shown in said figure and certain associated parts, with certain of the parts in different positions, Figure 40 is a detail perspective view illustrating one of the number wheels of the cross-computing register and an associated code disc, Figure 41 is a view in side elevation illustrating the structure shown in Figure 40, Figures 42, 43, 44, 45, 46, 47, 48, 49, 50 and 51 are detail views in side elevation illustrating a code disc associated with one of the number wheels of the cross-computing register and the cooperating feelers, with said disc in positions, respectively, corresponding with the numbers from "0" to "9," inclusive, Figure 52 is a detail view in front elevation illustrating certain of the number wheels of the cross-computing register, corresponding code discs, and one of the feelers for sensing the discs, Figure 53 is a view similar to Figure 52 illustrating the feeler in a different position, Figure 54 is a view similar to Figure 53 illustrating the feeler in a still different position, Figure 55 is a perspective view illustrating the cycle cams, the mechanism for controlling the movement of said cams, certain parts of the mechanism for actuating the selector levers, and certain parts of the mechanism for actuating the feelers, Figure 56 is a detail view in side elevation illustrating certain of the parts shown in Figure 55, Figure 57 is a detail exploded view in perspective, partly broken away, illustrating the selector levers and the mechanism for moving the same, Figure 58 is a detail plan view illustrating a portion of the mechanism shown in Figure 57, Figure 59 is a perspective view illustrating the spring-winding mechanism for winding the spring for rotating the cycle cams, Figure 60 is a view in side elevation illustrating certain of the parts shown in Figure 59, Figures 60a and 60b are views similar to Figure 60 illustrating certain of the parts in different positions, Figure 61 is a perspective, partially exploded view illustrating the mechanisms for rotating the cycle cams and for controlling the rotation thereof, Figure 61a is a detail view in vertical section illustrating the construction for supporting the cycle cams, Figure 62 is a detail perspective view illustrating a portion of the mechanism shown in Figure 61 with certain of the parts in different positions, Figure 63 is a view similar to Figure 62 illustrating certain of the parts in still different positions, Figure 64 is a detail perspective view illustrating the mechanism for shifting certain parts of the selecting mechanism when the cross-computing register is turned in a subtract direction to "0" and a lock mechanism for the total key, Figure 64a is a detail exploded view in perspective illustrating certain of the parts shown in Figure 64, Figure 65 is a detail perspective view illustrating the total key and the mechanism for locking said key shown in Figure 64, Figure 66 is a view in side elevation illustrating the right-hand cross-computing register and the "fugitive one" mechanism for said register, Figure 67 is a view in side elevation illustrating a portion of the mechanism shown in Figure 66 with certain of the parts in different positions, Figure 68 is a view in side elevation illustrating a portion of the mechanism shown in Figure 66 with certain of the parts in still different positions, Figure 69 is a view in side elevation illustrating a portion of the mechanism shown in Figure 66 with certain of the parts in still different positions, Figure 70 is a detail view in rear elevation illustrating mechanism for locking the total key from depression except when the master wheel and feeler mechanism are in the highest denominational position of the cross computing register from which the total is taken, Figure 71 is a view similar to Figure 70 illustrating a portion of the mechanism shown in Figure 70 with certain of the parts in different positions.

Figure 83:
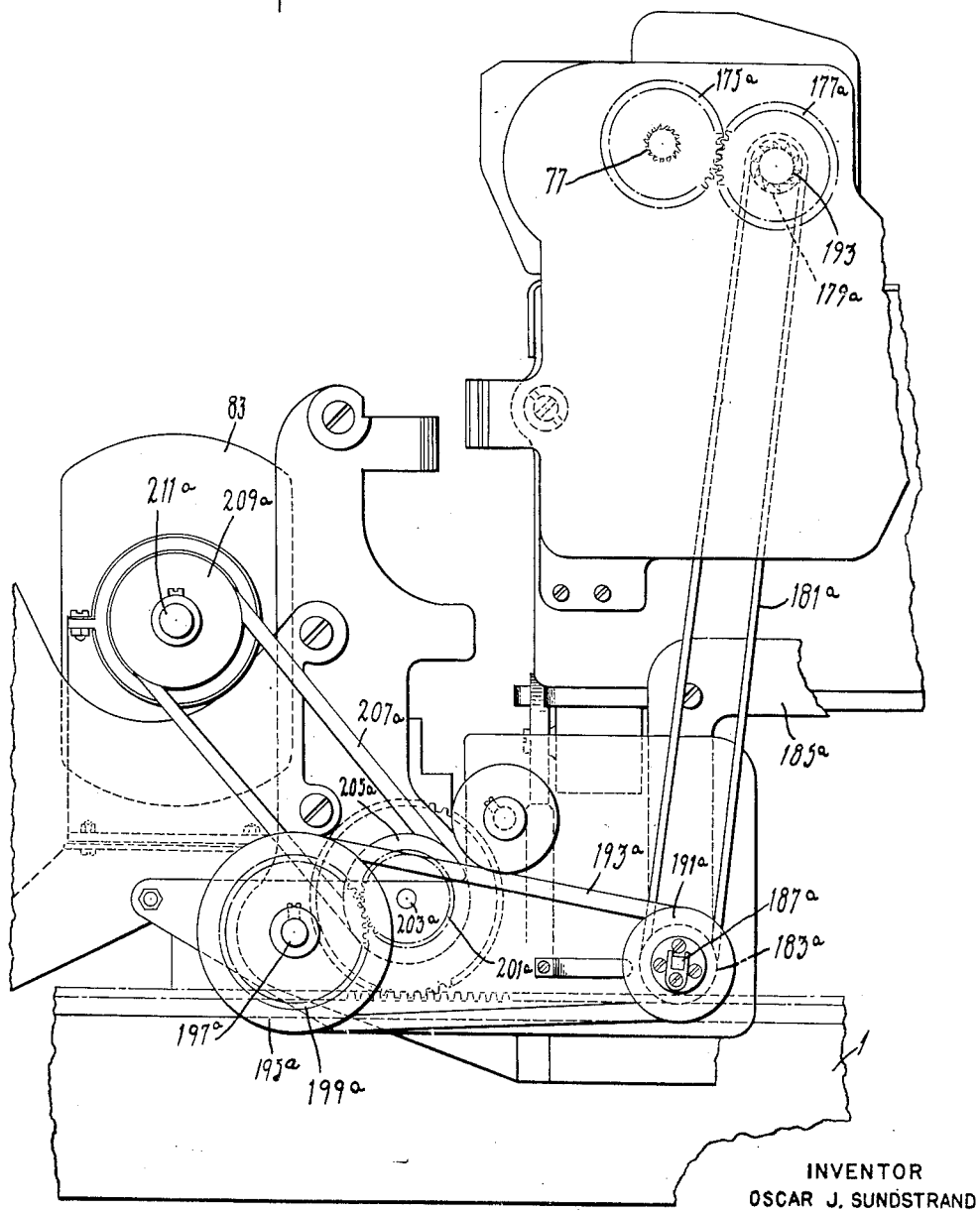

Figure 72 is a view similar to Figure 71 illustrating certain of the parts in still different positions, Figure 73 is a view similar to Figure 70 illustrating the greater portion of the mechanism shown in said figure and certain associated parts with certain of the parts in still different positions, Figure 74 is a view in side elevation illustrating the mechanism for controlling the actuation of the star signal key with the controlling lever set for the printing of a single star, Figure 75 is a view similar to Figure 74 illustrating the greater part of the mechanism shown in Figure 74 with certain of the parts in different positions, Figures 76 and 77 are views similar to Figure 75 illustrating the mechanism shown in said figure with certain of the parts in different positions from those in which they are shown in said figure, Figure 78 is a view similar to Figure 75 illustrating the mechanism for controlling the actuation of the star signal key with the controlling lever set for the printing of two stars, Figure 79 is a detail view in side elevation illustrating a portion of the mechanism shown in Figure 78 with certain of the parts in different positions, Figure 80 is a detail view partly in plan and partly in horizontal section illustrating certain parts of the mechanism shown in Figure 74, Figure 81 is a detail view in rear elevation illustrating the driving mechanism for the master wheel for operating the column registers, Figure 82 is a detail view in side elevation illustrating the regular two-way transfer mechanism of the crossfooter, and Figure 83 is a view in side elevation illustrating the driving mechanism for the machine.

The invention is illustrated and described in this application as applied to a combined typewriting and accounting machine of the Elliott-Fisher type, the typewriting and accounting mechanisms of which have substantially the same construction, arrangement, and mode of operation of parts as the corresponding mechanisms in the machine illustrated and described in applicant's copending application Serial No. 281,772, filed June 29, 1939, now Patent 2,370,505, issued February 27, 1945. As shown and described in said application, the type-bar mechanisms and the differential actuating mechanisms are operated by power from a suitable motor.

In the illustrated construction, the machine comprises a platen frame, one of the side rails of which is indicated at 1, Fig. 3, a substantially flat platen 3 mounted for vertical movement in said frame, a line-space frame, a portion of which is indicated at 5 mounted for forward and rearward movement on said platen frame and mechanisms for imparting a line-spacing movement to the line-space frame at the end of each return movement of the carriage, all as shown and described in said pending application.

Upon the line-space frame is mounted a type carriage or head indicated as a whole at 7 upon which are mounted the usual series of type bars each carrying one or more types for engaging the work sheets supported on the platen (see Fig. 1). The type bars are arranged to be operated by power-driven mechanism in the present machine, and this mechanism, in part, is carried by the carriage. The carriage also carries the usual series of keys forming the keyboard of the machine and controlling the coaction of the type bars with the power-driven mechanism. The carriage also carries a master wheel by which the totalizers or registers are driven and mechanism for driving the master wheel differentially by power to set up or enter successively the various digits of a number step by step in a register.

The type carriage is mounted for movement forwardly and rearwardly with the line-space frame and is also mounted for lateral movement on said frame in a right-hand direction to letter space during a typing operation and for return movement in a left-hand direction to restore the carriage to position for starting the typing of a line (see Figs. 2 and 3). The carriage is provided with front and rear wheels or rollers arranged to engage, respectively, the front and rear rails of the line-space frame of which the rollers engaging the rear rail 9 are indicated at 11. The carriage is acted upon by the usual metallic band 13 having one end attached to the carriage and connected with the usual spring drum 15 which tends yieldingly to move the carriage constantly in a right-hand direction along the rails of the line-space frame, as shown in said pending application. The letter-spacing movement of the carriage is controlled by the usual escapement mechanism, indicated as a whole at 17, this escapement mechanism preferably having substantially the same construction, arrangement and mode of operation of the parts as the escapement mechanism shown and described in the patent to Foothorap, No. 1,203,519, dated October 31, 1916.

*Type action*

(See Fig. 3)

The present machine is provided with a series of type bars 19 each pivoted at 21 to a hanger 23 secured to the semi-circular type-bar ring 25 suspended below the deck 27 of the carriage. The type bars are, respectively, acted upon by coil springs 29 which operate to retract the bars and tend to retain them in their normal positions in engagement with a semi-circular buffer ring 31.

The tail of each of the type bars is connected by a link 33 with an elbow lever 35 pivoted at 37 upon a hanger 39 depending from the deck 27. Each elbow lever is connected by a link 41 with the forward end of a sub-lever 43 pivoted at 45 upon a support 47 secured to the upper face of the deck 27. The rear end of the sub-lever 43 is connected by a link or push rod 49 with a horizontally arranged intermediate lever 51 pivoted on a fulcrum bar 53 extending across the rear of the key carriage. Each of the intermediate levers 51 is acted upon by a coil spring 55 which assists the retracting spring 29 in yieldingly holding the parts of the mechanism in the normal positions shown in Figure 3.

*Power driven type bar actuating mechanism*

(See Figs. 3 and 3b)

In the present machine, power-driven mechanism is provided for swinging the intermediate levers 51 in a downward direction about the fulcrum bar 53 to actuate the type bars. This mechanism comprises a longitudinally movable transmitting link 57 pivotally connected to the intermediate lever 51 by means of a stud 59. The transmitting link is pivoted at 61 to a radius arm or lever 63 which is journaled on a rod 65 extending longitudinally of the type carriage and supported on the cover plate 67. Said mechanism also comprises a longitudinally movable driving link 69, the lower end of which is pivoted at 71 to the radius arm 63. A pawl 73 is pivoted at 75 to the driving link and is provided with two teeth arranged to engage the teeth of a continuously rotating toothed or fluted shaft 77 mounted in bearings in the type carriage. The lower end of the driving link is acted upon by a coil spring 79 which tends to swing the link in a clockwise direction about the pivot 71 and to maintain normally the link substantially in the position shown in Figure 3 with the pawl 73 in engagement with a fixed inclined arresting plate 81 extending across the type carriage, in which position the pawl is disengaged from the toothed shaft. In order to engage the pawl with the shaft, the driving link 69 is swung to the left (Figures 3 and 3b) about the pivot 71. The shaft 77 is continuously driven by power through suitable driving connections from a motor 83 as shown and described in said application Serial No. 281,772. Upon the engagement of the pawl with the shaft, the driving link 69 is driven in a downward direction to actuate the transmitting link 57 and the intermediate lever 51 downwardly.

The driving links are swung to the left to engage the respective pawls carried thereby with the toothed shaft by mechanism actuated by the keys of the keyboard. This mechanism comprises a drag link 85 connected at its left-hand end (Figure 3) with an upwardly extending arm of the key lever 87 and having a shoulder 89, Fig. 36, adjacent its right-hand end arranged to engage a pin 91 mounted on the driving link 69. The left-hand end of the drag link is connected with the upwardly extending arm of the key lever 87 by means of a stud 93 mounted on the link and engaging in a slot 95 in said arm of the key lever and a coil spring 97 which normally holds the stud 93 seated in the left-hand end of the slot. Each of the key levers 87 is pivoted on a shaft 97a common to the keys of all the banks and is provided with a forwardly extending arm on which is fixed a key 99. The end of the upwardly extending arm of each of the key levers, extends through a guide slot 101 formed in a guide plate 103 secured to the upper portion of the frame of the type carriage and the movement of the key lever is limited by the engagement of said arm with the ends of the guide slot. Each of the key levers is acted upon by a coil spring 105 which normally maintains the upwardly extending arm thereof in engagement with the rear end of the guide slot.

With this construction, upon the depression of the key 99 of the key lever, the upwardly extending arm thereof will be swung forwardly or to the left (Figure 3) to engage the pawl 73 with the toothed shaft 77.

When the key is depressed to actuate the key lever to swing the driving link to the left to engage the pawl with the toothed shaft, the movement of the driving link is limited by the engagement of the pawl with said shaft. As the driving link is carried downwardly by the rotary movement of the shaft, the link is swung to the left, during the latter part of its movement by the engagement of the pawl contacting tooth of the shaft with the upper tooth of the pawl, the movement of said tooth of the shaft then having a substantial component toward the left (Figure 3). In order to limit this swinging movement of the driving link and cause the disengagement of the pawl from the tooth of the shaft at the desired time in the actuation of the type-bar mechanism, a series of stop plates 107 are adjustably mounted on the guide plate 103 and are arranged to be engaged respectively, by the upper ends of the driving links to limit the swinging movement thereof.

The free rear ends of the drag links 85 project through guide slots 109 formed in the upper portion of the arresting plate 81. The bottom walls of these slots limit the downward movement of the drag links under the influence of the springs 97 as the driving links move downwardly to actuate the type bars.

The trailing ends of the driving links 69 travel up and down and move forwardly and rearwardly in guide slots 111 formed in a transverse bar 113 supported on the frame of the type carriage.

*Interlock for driving links*

(See Fig. 3)

An interlock mechanism is provided for preventing more than one of the driving links from being swung forwardly into operating position at the same time. This mechanism comprises a series of interlocking balls 109a confined in a channel 111a formed in the bar 113 as shown and described in said Patent No. 2,370,505.

*Escapement mechanism*

(See Fig. 2)

The present machine, as stated above, is provided with an escapement mechanism for controlling the letter-spacing movement of the type carriage having substantially the same construction, arrangement, and mode of operation of parts as the corresponding mechanism illustrated and described in the patent to Foothorap, No. 1,203,519. This escapement mechanism comprises a carriage-feed rack 115 secured to the rear rail 9 of the line-space frame and a feed pinion 117 journaled on a shaft 119 having its ends engaged in suitable supports on the frame of the type carriage. To this pinion is secured an escapement wheel 121 controlled by escapement dogs 123 and 125 arranged to engage said wheel and operated from the universal bar by means of the usual draw wire 127. The holding dog 123 is pivoted at 129 on the bracket 131 suspended from the deck 27, the spacing dog 125 is pivoted at 133 on said bracket and said dogs are connected by a link 135 and by an operating spring 137 as fully shown and described in said patent. The draw wire 127 is connected at its upper end with an arm 139 (see Figure 3) secured to a rock shaft 141 arranged transversely of the type carriage. Arms 143 are secured to this rock shaft from which is suspended a universal bar 145. This bar extends beneath the several intermediate levers 51 and is arranged to be engaged by an abutment screw 147 mounted in each of said levers. The depression of the universal bar 145 by the downward movement of any one of the intermediate levers 51 swings the rock shaft 141 in a counter-clockwise direction (Fig. 3) thereby swinging upwardly the arm 139 to swing the holding dog 123 out of operative position and to swing the spacing dog 125 into operative position. The rock shaft is acted upon by a return spring 149 connected with an arm 151 fixed to the shaft which acts to turn the rock shaft back in a clockwise direction upon the release of the universal bar 145 by the intermediate lever 51. This movement of the rock shaft swings the arm 139 back downwardly and releases the draw wire 127 and the spacing dog 125 is swung out of operative position and the holding dog 123 is swung back into operative position by the spring 137. An arm on the spacing dog 125 engages a pin 153 mounted in a fixed arm 155 extending from a bracket constituting one of the supports for the escapement mechanism, said pin being engaged by an arm on the dog to limit the movement of the dog.

The escapement mechanism is controlled from the space bar by mechanism having substantially the same construction, arrangement and mode of operation of parts as the corresponding mechanism illustrated and described in applicant's Patent No. 2,239,023. This mechanism comprises devices operated by power for swinging the rock shaft 141 in a counter-clockwise direction (Figure 3) to throw out the holding dog 123 and to throw in the spacing dog 125 and the parts are restored to their normal positions by the action of the restoring springs 137 and 149.

*Register and differential actuator mechanisms*

(See Figs. 3, 3b, 4 and 6)

The machine illustrated is provided with a series of registers 163 mounted at the rear of the machine upon a register bar 165 fixed to the line space frame, said registers being provided with totalizer wheels 167, 167a and 167b. The type carriage is provided with power-driven mechanism for actuating the totalizer wheels of the column registers to set up numbers in said wheels. This mechanism is controlled by the numeral keys of the typewriter keyboard. This mechanism comprises a master wheel 169 (Fig. 3) located at about the middle of the type carriage at the rear thereof and extending rearwardly from the carriage into position to engage the lowest set of wheels of the totalizer mechanism. The master wheel is fixed to a shaft journaled in the carriage and is connected by suitable gearing with the main differential actuator shaft 171 extending across the type carriage and journaled in suitable bearings 167c supported on the frame of the carriage.

The shaft 171 is rotated differentially to impart differential movements to the master wheel 169 and to the totalizer wheels of a register to enter the desired numbers in the register by differential mechanisms selectively controlled from the several numeral keys of the type-bar mechanisms. These differential mechanisms are selectively thrown into operation by the corresponding numeral type-bar actuating mechanisms respectively. The said differential mechanisms have substantially the same construction, arrangement, and mode of operation as the corresponding mechanisms shown and described in applicant's Patent No. 2,370,505. The several mechanisms for differentially rotating the shaft 171 under control of the numeral keys from 3 to 9, inclusive, to enter corresponding numbers in the register, all have the same general construction, arrangement, and mode of operation of parts, these mechanisms differing only in the respects hereinafter pointed out to vary the rotative movement imparted to the shaft.

Each of these mechanisms (see Figure 3) comprises a longitudinally movable rack bar 173, pivotally suspended at 175 on an arm 177 which is pivoted on a shaft 179 extending across the type carriage. These arms are acted upon by a bail 181 also pivoted on said shaft and normally held yieldingly in depressed position by a spring 183, the bail engaging the upper sides of the arms as shown in Figure 3. The downward movement of the bail is adjustably limited by an adjustable stop lever 185 such as shown in said application Serial No. 281,772.

Each of the racks 173 is provided, on the rear side thereof, with a series of downwardly inclined teeth arranged to engage the teeth of a gear 187, fixed to the shaft 171, the teeth of a gear 187 being inclined in a clockwise direction, Figures 3 and 3b. The shaft 171 is connected with the master wheel 169 to drive the same by suitable gearing hereinafter described. Each of the rack bars is also provided on its forward side with a series of downwardly inclined teeth arranged to engage the teeth of a continuously rotating power-driven toothed or fluted shaft 193 extending across the type carriage and journaled in bearings carried by the side plates 195.

Each of the rack bars is normally held in a position intermediate between the shaft 193 and the corresponding gear 187 as shown in Figure 3 in which it is disengaged from both shaft and gear. The mechanism for holding each rack in this position comprises a pin 197 secured in the bar adjacent the lower end thereof and engaging in a recess in a lever 199 pivoted at 201 on an upright supporting plate or bracket 203 secured to the cover plate 67. This lever is acted upon by a coil spring 207 which tends to swing the lever upwardly and yieldingly holds the pin engaged in the recess with the pin in contact or substantially in contact with the lower edge of a fixed cam plate 209 attached to the upright plate 203.

In order to throw into operation the differential mechanism for entering a given digit in the totalizer wheels of a register, the rack bar 173 corresponding to this digit is swung forwardly to engage the teeth on the forward side of the rack bar with the teeth of the continuously rotating shaft 193. By the engagement of the rack bar with the shaft, the rack bar is moved longitudinally upward and the corresponding arm 177 and the bail 181 are swung upwardly by the movement of the rack bar against the action of the spring 183. When the rack bar has been moved upward the distance required for the subsequent action thereof, it is swung rearwardly to disengage the teeth on the forward side thereof from the shaft 193, this movement being limited to prevent the engagement of the teeth on the rear side thereof at this time with the gear 187. The rack bar is then moved longitudinally downward by the action of the bail 181 to a constant position, which is substantially the same for all of the several bars. At a predetermined point in the downward movement of the rack bar, the bar is swung farther to the rear to engage the teeth on the rear side of the bar with the gear 187, and, during the continued downward movement of the bar, the gear is rotated to actuate the totalizer wheels to enter the corresponding digit in the register.

The several mechanisms for swinging the rack bars forwardly to engage said bars selectively with the continuously rotating shaft 193 are operated from the several corresponding intermediate levers 51 connected with the numeral type bars as these levers are moved downward respectively to actuate the type bars corresponding to the numeral keys. These mechanisms, however, are rendered operative only when the master wheel 169 is in position to engage and actuate one of the wheels of the totalizer mechanism of a register. The position of the type carriage when the master wheel is in position to operate the totalizer wheels of a register, will be, in certain instances, hereinafter referred to as the position of the carriage, when in the zone of a register.

The mechanism for swinging each of the rack bars forwardly comprises a lever 211 (one for each rack bar) pivotally suspended at 213 upon an arm 215 secured to a rock shaft 217 extending across the type carriage and supported in bearings in the end plates thereof. The lever 211 projects at its lower end through a guide slot in the cover plate 67 and is formed on its left-hand side with a projection 221 arranged to engage the pin 197. The rock shaft 217 is acted upon by a coil spring attached to an arm on said shaft (not shown) which normally maintains the arm 215 and the lever 211 in lowered position with the projection 221 below the pin 197. The lever 211 is connected by a link 223 with a plate fixed to the upper end of an arm 225 secured to one of the intermediate levers 51.

The levers 211, when the carriage is not in the zone of a register, occupy their lowered positions as shown in Figure 3. The machine is provided with the usual state control device and register engaging cam mechanism for controlling the actuation of the totalizer wheels of a register from the differential mechanism when in the zone of a register, both of which are shown and described in applicant's Patent No. 2,370,505. With the state control device adjusted in "write" or "total" positions, the levers 211 will occupy their normal lowered positions, when the carriage is in the zone of a register. With the state control device adjusted in "compute" position, when the carriage is in the zone of a register, the levers 211 assume elevated positions to locate the projections 221 opposite the pins 197.

With this construction, when the lever 51 of a numeral type bar mechanism is swung downwardly to actuate the type bar, the corresponding lever 211 is swung forwardly through its connection with the arm 225. If the lever 211 is, at this time, in lowered position, the projection 221 thereon will not engage the pin 197 and this movement of the lever 211 will not affect the position of the rack bar. However, if the lever 211 is then in elevated position, the projection 221 on the lever will engage the pin 197 on the rack bar, as said lever is swung forwardly, and the rack bar will be swung forwardly therewith to engage the same with the continuously rotating shaft 193.

When the rack bar is engaged with the shaft 193, the bar is moved upwardly by the action of the shaft for the distance required for its subsequent action and is then swung rearwardly to disengage the same from the shaft by means of a pin 227 projecting downwardly from a supporting plate 229 secured to the frame of the carriage, which pin engages a laterally projecting arm 231 on the rack bar.

During the lateral swinging movement of the rack bar forwardly to engage the same with the shaft 193, the pin 197 travels along the lower edge of the fixed cam plate 209, and then passes beyond said edge to locate the same forwardly of the plate. The upward movement of the rack bar produced by its engagement with the shaft 193 then carries the pin in front of the cam plate. During the upward movement of the rack bar, the pin travels along the forward edge of the cam plate which is shaped as shown in Figure 3 and tends to guide the lower end of the rack bar and prevent it from disengaging the continuously rotating shaft. As the rack bar approaches the upper end of its movement, the upward movement of the rack carries the pin 197 beyond the upper end of the cam plate so that the pin leaves the forward edge of the cam plate and the rack bar is free to swing rearwardly. As the rack bar is swung rearwardly by the action of the pin 227, the pin 197 engages the forward side of a fixed guide plate 233 secured to the upright supporting plate 203 above the cam plate 209 and arranged to leave a crossover or channel 235 between the lower edge of the same and the upper edge of said cam plate. This plate 233 limits the rearward movement of the rack bar to prevent, at that time in the cycle, the engagement of the rack with the gear 187, and forms a guide for the lower end thereof during the first part of the downward movement of the bar.

During the first part of the downward movement of the rack bar, under the action of the bail 181, the pin 197 moves along the forward side of the guide plate 233 until it reaches the channel 235, the rack bar then being disengaged from the gear 187. As the pin reaches the channel, which occurs at a predetermined point in the downward movement of the rack bar, said pin is directed into said channel by the cam plate 209 which projects to the left some distance beyond the guide plate 233 as shown in Figure 3. The channel 235 is inclined downwardly and to the right (Figure 3) and, during the passage of the pin 197 through the same, the rack bar is swung rearwardly by the action of the cam plate 209, thereby engaging the rack bar with the gear 187 at a predetermined point in the downward movement of the rack bar.

During the continued downward movement of the bar under the action of the bail 181, the gear 187 is actuated to accumulate the number, corresponding to the numeral key depressed, in the number wheels of the totalizer mechanism of the column register. After the rack bar 173 is engaged with the gear 187, and the rack bar continues its downward movement, the pin 197 engages the rear edge of the cam plate 209 which forms a guide for the rack and, at substantially the end of the downward movement of the rack, the pin engages the projecting end of the lever 199. By the engagement of the pin with the lever, the lever is swung downwardly slightly and the pin is deflected forwardly into the recess in the lever by the contacting edge of the lever which is inclined to a slight degree to the direction of downward movement of the pin, thereby again locating the rack bar in its intermediate position.

The cam plate 209 and the guide plate 233 differ in size and contour for each of the several actuator racks. The position of the channel 235 or the position of the upper inclined edge of the cam plate 209 determines the point in the downward movement of the rack bar at which the rack bar is engaged with the gear 187 to actuate the totalizer wheels of a register and this determines the extent of actuation of said wheels and the number which is entered therein.

The differential mechanisms for actuating the gears 187 corresponding to the actuator racks for the numeral keys 1 and 2, differs in certain respects from the corresponding mechanisms for actuating the gears 187 for the numeral keys from 3 to 9, inclusive. These differential mechanisms all have substantially the same construction, arrangement and mode of operation as the corresponding mechanisms illustrated and described in said Patent No. 2,370,505. In each of these mechanisms each rack 173 is disengaged from the fluted shaft 193 at a predetermined point in the upward movement of the rack, differing in the case of each rack, the rack is immediately engaged with the corresponding gear 187 and the gear is actuated at the beginning of the downward movement of the rack. Thus, the differential movement of the respective racks is produced by disengaging the racks from the fluted shaft 193 with the racks in differential positions. In this case also, the upward movement of the racks is produced by the rotation of the fluted shaft 193 and the downward movement is produced by the downward movement of the bail under the influence of the bail actuating spring as in the case of the racks for entering the numbers from 3 to 9, inclusive.

The master wheel 169 is located at about the middle of the type carriage at the rear thereof and extends rearwardly from the carriage into position to engage the gears 167 of the totalizer mechanisms of the column registers. The master wheel is fixed to a short shaft 149a (see Figures 2 and 81) journaled in bearings in brackets 151a and 153a secured to the type carriage. To the shaft is fixed a pinion 155a which is constantly in mesh with a gear 157a fixed to a shaft 159a mounted for rotative and axial sliding movements in the brackets 151a and 153a. When the mechanism is set for addition, this gear also meshes with a gear 161a attached to the main differential actuator shaft 171 extending across the type carriage and journaled in bearings 167c supported on the frame of the carriage. The gear 157a, when the machine is set for subtraction, is demeshed from the gear 161a and meshes with a gear section 169a of a twin gear 169a, 171a journaled on a shaft 173a supported in the bracket 153a. The other section 171a of said twin gear is constantly in mesh with the gear 161a and, when the machine is set for addition, the twin gear rotates idly.

The mechanism for driving continuously the fluted shafts 77 and 193 (see Figure 83) comprises a gear 175a fixed to the shaft 77 and a gear 177a fixed to the shaft 193 and meshing with the gear 175a. To the fluted shaft 193 is attached a pulley 179a connected by a belt 181a with a pulley 183a journaled on a hollow bearing secured to a bracket 185a attached to the frame of the carriage. This pulley is provided with a square opening in which fits a square shaft 187a having bearings at its ends on the linespace frame, one of which is indicated at 189a in Fig. 3, the pulley being slidable longitudinally of the shaft. Upon the shaft 187a is secured a pulley 191a connected by a belt 193a with a pulley 195a fixed to a shaft 197a mounted in bearings on the line-space frame. To the shaft 197a is attached a gear 199a meshing with a gear 201a journaled on a shaft 203a secured at its ends to the line-space frame. To the gear 201a is attached a pulley 205a connected by a belt 207a with a pulley 209a fixed to the shaft 211a of the motor 83.

The driving connections above described between the motor 83 and the fluted shaft 77 have substantially the same construction, arrangement and mode of operation as the driving connections between the motor and the corresponding fluted shaft shown and described in applicant's application Serial No. 281,772, except that, in the present construction, there is no provision for driving the square shaft 187a at variable speeds from the shaft 197a. The sliding connection between the pulley 183a and the square shaft 187a maintains a driving connection between these parts while allowing the letter spacing and return movements of the carriage.

*Means for enabling differential mechanism*

(See Figs. 2 and 6)

The mechanism for raising the levers 211 into operative position with relation to the pins 197 comprises one of the arms 215 secured to the rock shaft 217 and a link 237 pivotally suspended at 239 upon said arm. The link 237 extends through a suitable slot in the cover plate 67 and is formed at its lower end with a slot 241 in which engages a pin 243 secured in the left-hand end, Fig. 6, of a lever 245 pivoted at 247 upon a bracket depending from the cover plate. The vertical position of the lever 245 is controlled by means of a lever 249 also pivoted at 247 on said bracket and carrying a pin 251 which engages the underside of an interposer 253 intermediate between the lever 249 and the lever 245. The interposer 253 is pivoted at 255 to an arm 257 fixed to a rock shaft 259 supported in suitable bearings upon the underside of the cover plate 67 and is formed with a shoulder 261 upon which rests, under certain conditions, a pin 263 secured in the lever 245. Thus the interposer is supported by the lever 249 and the arm 257 and the position of the interposer longitudinally of the lever 245 is determined by the position of the arm 257 and the rock shaft 259.

The angular position of the lever 249 is controlled by the usual register engaging cam lever. This cam lever and the construction through which it is connected to the lever 249 is similar to the corresponding construction illustrated and described in the patent to Foothorap No. 1,512,282, dated October 21, 1924. The right-hand end, Fig. 6, of the lever 249 engages in a slot 265 in a vertically movable plate or slide 267 located on the inside of the cover plate which is connected by a pin 269 with a lever 271 located on the outside of the cover plate (see Figs. 2 and 6), the pin 269 moving in a slot in the cover plate. The lever 271 is pivoted upon a stud 273 secured in a downturned portion of the cover plate and is connected by a coil spring 275 with the cam lever 279. The cam lever is also pivoted upon the stud 273 and is provided with the usual cam 281 which is engaged and depressed to depress the cam lever by a cam surface formed on the left side of a plate 283 secured to the base of the register upon the movement of the carriage into the zone of a register. The cam lever, in its downward movement, swings the lever 271 downwardly therewith by the engagement of an arm 285 (see Figure 2) formed on the cam lever with an eccentric stop 287 secured to the lever 271. Thus, through the connections described, when the register engaging cam is depressed by the locating of the type carriage in the zone of a register, the right-hand end of the lever 249 (Fig. 6) is also depressed. The position of the rock shaft 259 is controlled by a manually settable element for determining the condition of the machine. When the rock shaft is at this time positioned to locate the interposer 253 in the position shown in Figure 6, the link 237 and the arm 215 will be elevated by the action of the register engaging cam lever to raise the levers 211 into operative position. When the rock shaft 259 is positioned to locate the interposer 253 in a position to the left of that shown in Figure 6, the shoulder 261 on the interposer does not lie beneath the pin 263 and the arm 215 and link 237 will not be elevated by the movement of the lever 249.

The rock shaft 259 and arm 257 are located in the position shown in Figure 6 to condition the machine for the operation of the totalizer actuating mechanism, or to enable said mechanism. The rock shaft and arm are swung to the left from the position shown in Figure 6 to condition the machine to disable the totalizer actuating mechanism. The mechanism for positioning the rock shaft comprises a second arm 289 (see Figure 5) extending downwardly from said shaft and carrying a pin 291 projecting laterally therefrom and engaging in a slot 293 in a lever 295 pivoted at 297 on the side plate 299 of the carriage casing. This lever is acted upon by a coil spring 301 which tends constantly to swing said lever to the right and to maintain the arm 289 in the position shown in Figure 5. A second lever 303 is also pivoted at 297 on said side plate and is connected with the lever 295 by means of a pin 305 secured to the lever 295 and engaging in a slot 307 formed in the lever 303. The lever 303 is pivotably connected at its upper end to a longitudinally movable link 309, which is supported by said lever and by a stud 311 secured in the side plate of the carriage and engaging in a longitudinal slot 313 in the link. The longitudinal position of the link is controlled by means of a manually operable setting lever 315 pivoted on a stud 317 secured in the upright plate 195 at one end of the carriage and having a slot 321 at its lower end in which engages a pin 323 secured in the link 309. The lever 315 is provided with an arm 325 extending forwardly beyond the frame of the carriage by which the lever may be manually adjusted. The lever is arranged to be adjusted in three different positions to control the condition of the machine and a detent lever 327 is pivoted at 329 on the plate 319 and is acted upon by a coil spring 331 which tends to swing the lever to engage the projection at the forward end thereof with any one of the three notches 333 to hold the lever in any one of the three positions in which it may be adjusted.

*Decimal space mechanism*

The decimal space mechanism of the machine is similar to the corresponding mechanism illustrated and described in Patent No. 1,512,282 referred to above, many of the parts having substantially the same construction, arrangement and mode of operation. This mechanism comprises a trip lever 335 (see Figs. 4 and 5) secured to the rear end of a longitudinally movable rock shaft 337 to the forward end of which is attached an arm 339 pivotally connected to the upper end of a rod or wire 341. The lower end of this wire is pivotally connected to a lever 343 (see Fig. 2) pivoted at 345 upon a hanger 347 suspended from the deck 27, said lever being provided with a lateral projection which engages beneath the outwardly projecting arm 349 formed on the holding pawl of the escapement mechanism. When the decimal trip lever 335 is located axially in its rearward or operative position and the carriage is located so that the master wheel 169 is in the units of dollars position of a register and a numeral key is depressed, the V-shaped projection extending upwardly at the end of the lever is engaged by the V-shaped cam 351 (see Fig. 3) projecting downwardly from the plate 283 secured to the base of the register. By the engagement of this cam with the decimal space lever, the lever is swung downwardly and the wire 341 is elevated to hold the escapement pawl 123 out of position to engage the escapement wheel 121, Fig. 2, until the carriage has executed a two space or double escapement movement. This movement of the carriage disengages the projection on the decimal space lever from the cam 351 and the parts are then restored to their normal positions by the action of the coil spring 353 on the lever 343. With the decimal space lever located in its forward position, the V-shaped projection at the end thereof will not engage the cam 351 during the passage of the carriage through the zone of a register.

The decimal space lever is moved axially into and out of position to be engaged by the cam 351 by longitudinal movement imparted to the rock shaft 337 upon which the lever is mounted. The mechanism for moving the shaft longitudinally comprises a rock shaft 355 mounted in suitable bearings carried by the frame of the type carriage and having on one end a downwardly extending arm connected by a link 357 (see Fig. 4) with the arm 339 on the rock shaft 337. To the other end of the rock shaft 355 is secured a second downwardly extending arm 359 which is connected with lever 303 by means of a link 361 (see Fig. 5). To provide a lost motion connection between the link and said lever, the link is formed with a slot 363 in which engages a pin 365 secured in the lever. The rock shaft 337 is acted upon by a coil spring 367 which constantly tends to move the same rearwardly to locate the decimal space lever in operative position, the rearward movement of the shaft being limited by the engagement of the hub of the arm 339 with a bracket 369 through which the shaft passes.

*Crossfooter register mechanisms*

As shown clearly in Figure 2 of the drawings, the shaft 171 is extended beyond the side plates 195 of the type carriage at each end of said carriage and right and left-hand cross-computing registers or crossfooters 373 and 375 are mounted at the respective ends of the carriage. The totalizer mechanisms of these crossfooters are connected respectively with the ends of said shaft for operation by the shaft. The totalizer mechanisms of the crossfooters preferably are substantially identical and each of these mechanisms has the same general construction arrangement and mode of operation of parts as the corresponding mechanism illustrated and described in the patent to Foothorap, No. 2,145,254, dated January 31, 1939.

The mechanism for driving the totalizer of each crossfooter (see Figure 66) comprises a master wheel 200 mounted on a shaft 202 to rotate therewith but shiftable longitudinally of the shaft to select the denomination of the totalizer mechanism corresponding with the denomination in which the master wheel 169 is located with relation to the column register. The master wheel 200 is driven by mechanism similar to that shown and described in Foothorap patent, No. 1,847,429, dated March 1, 1932, and in Foothorap Patent No.

2,032,691, dated March 3, 1936. The master wheel shaft 202 is journaled in bearings in the side plates 377 (see Figure 2) of the crossfooter frame and is driven from the actuator shaft 171 through a gear 379 fixed to said shaft and meshing with a gear 381 journaled on and shiftable axially of the shaft 383 fixed to one of the side plates 377. When the machine is set for addition, the gear 381 is arranged to mesh with a gear 385 secured to the master wheel shaft. To set the crossfooter mechanism for subtraction, the gear 381 is shifted axially out of engagement with the gear 385 and into engagement with one section of a twin gear 387. The gear 387 is journaled on a shaft 389 secured to the adjacent side plate 377 and the other section of said gear is constantly in mesh with the gear 385, the gear 387 rotating idly when the machine is set for addition.

The crossfooter totalizers comprise a set of numeral indicating wheels 194 journalled on a shaft 391 and for the right hand crossfooter totalizer only, a set of notched code discs 12 fixed to the numeral wheels 194, a disc 12 and a numeral wheel 194 being hereinafter referred to as a digital representing wheel. Shafts 391 are mounted in supporting plates 377 of the crossfooter frame and carry their wheels for driving in opposite directions for addition and subtraction by toothed denominational wheels 198 journaled side by side on the shaft 393 supported in the crossfooter frame plates 377, said denominational wheels being connected with the value indicating wheels by intermediate gears 196. The master wheels of the two crossfooter registers are respectively shifted axially step by step to the right, looking from the front of the machine, into engagement successively with the wheels 198 to select the denominations corresponding to the denominations of the column register wheels successively engaged by the master wheel 169 by mechanism described later in this application.

Each crossfooter register is provided with a two-way transfer mechanism of the type illustrated and described in Patents No. 2,032,691 and No. 2,145,254, referred to above. This mechanism (see Figure 82) includes a series of transfer heads 204, one for each denomination, mounted to rock upon a fixed shaft 206 to either side of a central normal position. Rocking movement of a transfer head is effected initially by the engagement of a wide tooth 206c on the corresponding denominational wheel 198 with a trip member 226 on the head arranged in the plane of said tooth to rock the head in one direction or the other at the time in the movement of said wheel at which a transfer is required. Movement of the head is continued in the direction in which it is initially rocked by actuating mechanism including a bell crank actuator lever 214 pivoted at 216 on the frame of the crossfooter, a spring 218 connected with the downwardly extending arm of the lever and urging the forwardly extending arm of the lever toward the axis of the head and a link connection 208 between the head and the latter arm of the actuator lever. The arrangement of each head and its actuating mechanism is such that, in the normal position of the parts, they assume a dead-center position providing a toggle lock resisting the action of the spring 218, in which position they are yieldingly held by a pivoted detent 220 urged by a spring 222 against a roller 224 mounted on one end of the link 208. Combined carrying fingers and locking dogs 228 tensioned by springs 210 are mounted on each head and are each provided with a projection 212 arranged in the plane of the next higher denominational wheel 198 to impart the carrying step of movement to said wheel upon the rocking of the head.

*Transfer resetting mechanism for crossfooter registers*

(See Figs. 8, 9, 69, and 82)

After each of the transfer heads 204 is rocked into inclined position in the manner above described, to execute a carry, the head remains in this position until it is positively restored to the normal or upright position shown in Figure 82. The present machine is provided with mechanism which operates, immediately after the master wheel 169 leaves the units of cents position in a column register, to automatically restore the transfer mechanism of the crossfooter or crossfooters which may then be in operation. This mechanism comprises a rod or shaft 401 carried by spaced arms 403 secured to a rock shaft 405 mounted to turn in bearings in the crossfooter frame. In restoring the transfer mechanism, the rock shaft 405 is turned in a clockwise direction (Figure 66) thereby swinging the rod 401 downwardly into engagement with the projecting ends 407 of any of the actuator levers 214 which may have been swung upwardly out of normal position by the rocking of a transfer head, thereby swinging the horizontally extending arms of said levers downwardly therewith. This restores the links 208 and the transfer heads to their normal positions shown in Figure 66.

The mechanism for thus actuating the rock shaft 405 (see Fig. 8) comprises an arm 409 secured to the rock shaft, a lever 411 fixed to a rock shaft 413 mounted in bearings 415 on the frame of the carriage and links 417 connecting the arm 409 with the lever 411. The rock shaft 405 is turned in the opposite direction by mechanism comprising an arm 419c secured to said rock shaft, a lever 421 pivoted at 423 on the frame of the crossfooter mechanism and connected with the arm 419c by a link 425. The lever 421 is acted upon by a coil spring 427 which constantly tends to swing the same in a counterclockwise direction (Figure 8) and thereby to turn the rock shaft 405 in a clockwise direction.

The lever 411 is connected by a pitman 429 with a crank pin 431 fixed in a disk 433 journaled on a screw stud 435 threaded into a supporting bar or block 437 (see Figure 9) secured to one of the side plates of the frame of the carriage, the pitman having a lost-motion connection with the lever 411 by means of a stud 439 secured in the lever and engaging in a slot 441 in the pitman. The disk 433 constitutes one element of a one-revolution clutch for actuating the pitman 429 and the arm 411. Pivoted at 443c on the disk is a pawl 445 arranged to engage the teeth of a ratchet wheel 447 journaled on the hub of the disk 433 (see Figure 8). The pawl is acted upon by a leaf spring 449 which tends to swing the pawl into engagement with the teeth of the ratchet wheel 447. A gear wheel 451 is fixed to the hub of the ratchet wheel 447 and is continuously driven by means of a gear wheel 453 secured on an extension on the shaft 77 projecting beyond the adjacent side plate of the carriage.

The pawl 445 is held out of engagement with the ratchet wheel 447 during the movement of the master wheel 169 past the denominational number wheels 167 of a column register until the master wheel passes from the number wheel of the units of cents position by means of a detent lever 455 pivoted at 457 on a bracket 459 attached to the frame of the carriage, which lever carries a detent stud 461 arranged to engage the tail of the pawl as shown in Figure 8. The lever 455 is acted upon by a coil spring 463 which normally holds the lever yieldingly in position with the stud 461 in engagement with the pawl, the movement of the lever under the action of the spring being limited by means of a stop pin 465. When the master wheel 169 passes from the units of cents position in a register, the lever 455 is swung in a clockwise direction (Figure 9), thereby disengaging the stud 461 from the tail of the pawl 445 to allow the same to be engaged with ratchet wheel 447 by the spring 449. Upon the engagement of the pawl with the ratchet wheel 447, the disk 433 is given a single rotation by said wheel and, during this movement of the disk, the lever 411 is swung downwardly by the pitman 429 thereby actuating the rock shaft 405 and the rod 401 to restore the transfer mechanism. Immediately after the lever 455 is actuated to cause the stud 461 to release the pawl 445, said lever is, itself, released by its actuating mechanism and, when the tail of the pawl has passed the stud, the lever is swung back to normal position by the spring 463 thereby locating the stud in the path of the tail of the pawl. As continued rotation of the disk 433 engages the tail of the pawl with the stud 461, the pawl is again disengaged from the teeth of the ratchet wheel 447, and the disk 433 comes to rest. To prevent reverse rotation of the disk 433 when the clutch is disengaged, a spring pressed dog 467 pivoted on the frame of the crossfooter is arranged to engage in a notch in said disk.

The present machine is provided with mechanism for moving the master wheel 200 of each of the crossfooter mechanisms from denomination to denomination (Fig. 66) along the series of denominational wheels 198 during the passage of the master wheel 169 of the column register actuating mechanism through the several denominations of a column register, having the same general construction, arrangement and mode of operation of parts as the corresponding mechanism illustrated and described in Patent No. 2,145,254, and in part in Patent No. 2,032,691, referred to above. Each master wheel 200 is shifted by a master wheel carriage 469 movable on a guide 469a (see Fig. 7) in the direction of the axis of the wheel and connected by a link 471 to a forwardly extending crank arm 471a fixed to the upper end of a vertical rock shaft 473 mounted to turn in bearings in the crossfooter framework. A rearwardly extending arm 475 is fixed to the lower end of said shaft and is connected by a link 477a with one of a pair of longitudinally slidable coupling bars 479 and 481 (see Figures 7, 8, and 9), one for actuating each of the master wheel carriages. These bars are mounted side by side between a pair of laterally spaced housing plates 483 secured to the frame of the type carriage and said bars slide between upper and lower series of rolls 485. The rock shafts 473 are each acted upon by a coil spring 487 connected, in one crossfooter, with the arm 471a and, in the other crossfooter, with the arm 475 which tends to swing each shaft in a direction to maintain the corresponding carriage 469 in starting position with the master wheel 200 in a position just above the first denominational wheel 198. These springs, acting through the connecting mechanism, urge the coupling bars 479 and 481 to the left (Fig. 9). A coupling dog 489 is pivoted at 491 upon each of the coupling bars and is acted upon by a coil spring 493 which tends to swing the same upwardly into position to engage and interlock with a lug 495 on the base of each column register. A pin or stud 497 is mounted on each of the coupling dogs 489 and engages in an elongated slot 499 formed in the adjacent housing plate 483, the stud cooperating with cams formed at the opposite ends of the slot to swing the dogs downwardly out of engaging position with relation to the lug 495 on the column register.

Normally the dogs 489 lie in their upper or operative positions, one behind the other as illustrated in Figure 8, with the pins 497 located in the left-hand portions of the corresponding slots 499 and adjacent to the respective cams at the ends of the slots (see Figure 9). When the carriage has advanced the printing point to a position within one letter space of a columnar position on the work sheet in which a number is to be printed or a position at which the master wheel 169 of the column register actuating mechanism is within one space of the first number wheel 167 of a column register, the coupling dog or dogs 489 which are in operative position will engage the lug 495 on the column register and will hold the corresponding slide or slides stationary during the continued advance of the carriage. Because of the relative movement of the carriage upon which the crossfooter mechanisms are mounted and the slides 479 and 481, the corresponding master wheel or wheels 200 will be advanced from denomination to denomination across the corresponding series of denominational wheels 198. When the master wheel 169 advances one step beyond the lowest denominational order of a column register, the pin on each coupling dog, which is then connected with the lug 495, engages the cam at the right-hand end of the corresponding cam slot 499 and the dog is depressed out of engagement with the lug thereby releasing the corresponding coupling slide. Each rock shaft 473 is then swung by the corresponding spring 487 in a direction to carry the master wheel 200 back to its normal or starting position and the corresponding coupling slide is moved back to the left to its starting position shown in Figure 9.

The clutch control detent lever 455 is swung in a clockwise direction, Figure 9, to throw the one revolution clutch into operation to actuate the resetting mechanism for each of the crossfooters, by the retracting movement of either of the coupling slides, following the release of the coupling dog from the lug 495, under the action of either of the springs 487. The mechanism for swinging the detent lever 455 from the movement of the slides, comprises a connecting lever 501 pivoted at 503 on the detent lever 455 and connected by the spring 463 with the bracket 459, this spring normally holding the connecting lever in the position shown in Figure 9 with relation to the detent lever with a projection 505 on the connecting lever in engagement with a stop pin 507 fixed to the detent lever. Thus, with the levers in the relative positions shown in this figure, the spring 463 tends to swing the detent lever 455 in a counter-clockwise direction. To enable the connecting lever 501 to be actuated from the coupling slides, the lever is provided with two downwardly extending projections 509 and 509a, the projection 509a being arranged in front of and extending below the projection 509 as shown clearly in Figures 8 and 9. The projection 509a is arranged to be engaged by a connecting pin 511 secured in the slide 479 and extending forwardly therefrom through a slot in the forward housing plate 483. The projection 509 is arranged to be engaged by a connecting pin 511a fixed in a bar 513 rigidly secured to the slide 481, said pin also extending forwardly from the slide through a slot in the forward housing plate 483. The length of the pin 511a is such that it does not project forwardly far enough to engage the projection 509a as shown in Figure 8. In order to enable the projections 509 and 509a to by-pass the pins 511 and 511a when the coupling slides are held stationary during the advance of the carriage, each of the projections is provided with a cam face 515 arranged to engage the corresponding pin.

The above described mechanism has the following mode of operation: Referring to the mechanism controlled by the coupling slide 479, when the slide is in its normal left-hand position, with relation to the housing plates 483 as shown in Figure 9, the connecting pin 511 is located in the position shown in this figure with relation to the projection 509a on the connecting lever 501. When the slide is held stationary by the engagement of the coupling dog 489 with the lug 495 on a column register, the connecting pin 511 is engaged with the cam 515 on the projection 509a and the laterally extending arm of the connecting lever 501 is lifted to allow the pin to pass the projection after which the connecting lever is swung back to its normal position by the spring 463, these movements of the lever being produced without effecting the detent lever 455 which remains in its normal clutch disengaging position. When the coupling slide 479 is released by the action of the coupling dog, and the slide is moved back to the left by the slide actuating springs (Figure 9) the connecting pin 511 engages the right-hand side of the projection 509a thereby swinging the detent lever 455 into the position to set in operation the one revolution clutch. During this movement of the detent lever 455, the connecting lever 501 swings as a unit therewith, thereby carrying the projection 509a upwardly beyond pin 511 and the pin is restored to its normal position shown in Figure 9, by the movement of the coupling slide. After the pin 511 passes beyond the connecting lever 501, the levers 455 and 501 are restored to their normal positions as shown in Figure 9 by the action of the spring 463 so that the stud 461 on the lever 455 will again engage the tail of the pawl 445 to disengage the clutch as the disk 433 completes a revolution.

The one revolution clutch is tripped in the same manner by the action of the coupling slide 481, the pin 511a on this slide acting on the connecting lever 501 to swing the detent lever 455 to trip the clutch during the retracting movement of the slide.

The one revolution clutch shown in Figure 8 is arranged to reset the transfer mechanisms of both the crossfooters in the event that the several transfer mechanisms have been operated during the passage of the carriage through the zone of a column register. To this end the rock shaft 413 is extended across the rear of the type carriage and one of the arms or levers 411 is attached to each end of the shaft. Mechanism connected with each of these levers having substantially the same construction as that shown in Figure 8 is provided for restoring the transfer mechanism of each crossfooter. In the present application it has been considered necessary to show this mechanism only as applied to the right-hand crossfooter.

*General description of selector mechanism*

The machine illustrated in this application is provided with a total taking mechanism applied to the right hand cross-footer. When a total has been set up or registered in the right hand crossfooter, this total may be automatically analyzed and printed on the work sheet and the crossfooter cleared by the total taking mechanism hereinafter described.

Hereafter, in this application, whenever the crossfooter is referred to in connection with the total taking mechanism, it is to be understood that the right hand crossfooter is meant unless otherwise specified.

The digital representing wheels of the crossfooter each comprises a numeral indicating wheel 194 and a code disk attached thereto so that the code disk rotates with the indicating wheel and the rotary position of the disk corresponds with the rotary position of the indicating wheel. The code disks are sensed or analyzed by means of a series of feelers arranged to engage successively these code disks. The feelers are mounted on the master wheel carriage for movement with the master wheel of the crossfooter in the direction of the axis of the code disks. The master wheel carriage is normally located to position the master wheel to the left of the accumulator train of the totalizer of the crossfooter of the highest denomination and the feelers are then located by the carriage to the left of the left-hand code disk or that disk attached to the indicating wheel of highest denomination. In taking a total automatically, the master wheel carriage is shifted to shift the master wheel from denomination to denomination of the accumulator trains of the totalizer of the crossfooter beginning with the highest denomination and is held stationary with the master wheel in registry with the accumulator train of each denomination to enable said train to be cleared by the rotation of the master wheel as is done in the taking of totals by manual operation of the key levers in machines of this type. The respective positions and movements of the feelers during the total-taking operation correspond with the positions and movements of the master wheel. That is, the feelers are shifted first into registry with the code disk attached to the indicating wheel of the accumulator train of highest denomination of the crossfooter and is then shifted from denomination to denomination of the code disks to correspond with the shifting of the master wheel. After completion of the total-taking operation, the master wheel carriage is shifted back to normal position to restore the master wheel and the feelers to their normal positions to the left of the accumulator train of the totalizer of the highest denomination.

During their shifting movement, the feelers are positioned radially out of position to contact with the code disks; and when the carriage is stationary, with the feelers in registration with a code disk, the feelers are moved inwardly toward the axis of the disks to analyze the disk. The feelers are respectively connected with a series of longitudinally movable permutation code bars, and the positions of the feelers determine the longitudinal positions of these bars. The edges of these bars are engaged by a series of selectors, one for each numeral type bar. These selectors are all given a forward movement during each cycle of operations, and when any one of the selectors is depressed into operative position, it will actuate the corresponding numeral key lever 87 to engage the type bar operating mechanism with the fluted or toothed shaft 77. The selectors are controlled by the permutation bars so that one and one only of said selectors will be depressed into operating position during each cycle of the total-taking mechanism, this selector corresponding with the position of the code disk analyzed by the feelers during the cycle.

*Feeler mechanism*

The feeler mechanism of the present machine (see Figures 1, 19, 20, 21, 22, 23 and 40 to 54, inclusive) comprises a series of feelers 6 mounted on the master wheel carriage for movement therewith and for vertical movement with relation to said carriage. The feelers are mounted in spaced relation for vertical sliding movements in the forwardly projecting portions 8 and 8a formed on the master wheel carriage, the feelers operating in suitably formed slots, respectively, in said portions of the carriage. The slots in said forwardly projecting portions of the carriage are closed by means of a retainer plate 8b attached to the master wheel carriage and having forwardly bent slot closing arms 8c and 8d as shown in Figure 22.

The movement of the master wheel carriage shifts the feelers successively over the code disks 12, one of which is attached to each of the indicating wheels 194 of the totalizer mechanism to form the number wheels of the crossfooter. When the master wheel is located in registry with the wheel 198 of an accumulator train, the feelers are located in registry with the code disk 12 of said train. As stated above, the master wheel carriage is normally located to position the master wheel to the left of the accumulator train of highest denomination of the crossfooter and to position the feelers to the left of the code disk attached to the indicating wheel of said train.

In each cycle of operations, the master wheel carriage is shifted to the right to locate the master wheel 200 in registration with the denominational wheel 198 of an accumulator train of the crossfooter and to locate the feelers 6 in registration with the corresponding code disk 12, the feelers being lifted during said movement of the carriage. The feelers are then depressed into engagement with the code disk. The position of the feelers controls a selector mechanism for selecting the type bar which is to be actuated in the cycle. Following the setting of the selector mechanism by the positioning of the feelers, the selected type bar mechanism is actuated to print on the work sheet a number corresponding with the position of the indicating wheel. Immediately following the printing of the number on the work sheet, the corresponding differential mechanism is actuated to rotate the master wheel to clear the accumulator train engaged by said wheel. This completes the cycle.

These cycles of operation are repeated to print the total appearing in the crossfooter register and to clear the register digit by digit until the total printing and clearing operation is completed.

Each of the code disks 12 preferably has substantially the construction illustrated in Figures 40 to 51, inclusive. As shown in these figures, each code disk is provided with a periphery having certain elevated portions and depressed portions or notches formed in accordance with a predetermined code. There are ten differently formed portions on the code disks, having a code formation corresponding to the numbers from 0 to 9 inclusive. Figures 42 to 51, inclusive, show respectively a code disk with the ten differently formed peripheral code portions, corresponding to the numbers from "0" to "9," in uppermost or analyzing positions, and the feelers 6 engaging respectively these differently formed code portions. Thus Figure 42 shows the code portion 12a of a code disk corresponding to the number "0" in uppermost of analyzing position, and the feelers 6 engaging this portion of the code disk. Fig. 43 shows the code portion 12b of the code disk corresponding to the number "1" in uppermost position with the feelers in engagement with this portion of the code disk. Figures 44 to 51, inclusive, correspondingly show the code portions of the code disk corresponding to the numbers from "3" to "9" inclusive in uppermost or analyzing position with the feelers engaging these respective portions of the disk. It will be noted that, as shown in each of these figures, the elevations on each code portion of the disk hold the feelers, when engaged therewith, in elevated positions, and that the depressions or slots in each code portion allow the feelers to drop to depressed positions.

Figures 52, 53, and 54 show successive positions occupied by a feeler during a cycle of operation of the feeler mechanism. Figure 52 shows a feeler 6 located above the left-hand code disk 12 of the three code disks shown in this figure. The feeler occupies this position upon being first shifted to the right by the movement of the master wheel carriage or slide to bring the feeler into registration with the code disk. Thereafter the feeler is moved downwardly to analyze the left-hand code disk 12 as shown in Figure 53. After the analyzing of the code disk, the feeler is lifted to substantially the position shown in Figure 52 and is then moved in a right hand direction to a position over the next code disk to the right as shown in Figure 54. The cycle of operations of the feeler is then repeated.

Upon the upper edge of each of the feelers 6 rests a vertically movable bar 14 (see Figs. 19, 20, and 21) mounted upon the laterally extending arms of two bell crank levers 16 pivoted at 18 on the frame of the type head or carriage 7, the rounded ends of said arms of the bell cranks engaging in slots 20 formed in the opposite ends of the bar. The vertical movements of each of the bars 14 impart horizontal movements to one of the bars 22 mounted to slide horizontally upon the said type head and having slots 23a in which engage the rounded ends of the upwardly extending arms of the bell cranks 16. The bars 22 are slidably mounted on the type head by means of studs 24 secured in the frame of the type head and engaging in slots 26 in the bar.

With the above construction, the lateral position of each of the bars 22 is determined by the vertical position of one of the feelers 6. To the left-hand end of each of the bars 22 is connected the right-hand end of one of the code bars 28 which determine the numerals which are printed during the several cycles of the machine. The code bars 28 are connected with the respective bars 22 by means of a hook 28a formed on each bar 28 which engages with a hook 22a, Figures 19 and 20, formed on each bar 22.

The mechanism for raising and lowering the feeler bars 6 comprises an actuator 30 having an arm or bar 32 mounted for vertical movement in slots in the forwardly projecting portions 8 and 8a on the master wheel carriage 469 by the side of the feeler bars. This actuator is provided with a rearwardly extending arm 34 projecting beneath each of the arms 10 on the feeler bars and engaged by said arms 10. The actuator is also provided with a shorter arm 34a (see Figs. 21 and 22) extending rearwardly beneath a vertically movable bar 36 mounted by the side of the forward bar 14 and supported in a manner similar to said bar. The actuator 30 is also provided with an upwardly extending arm 38 having a rearwardly bent extension 40 projecting over the upper edge of the bar 36, as shown in Figures 21 and 22. This construction enables the actuator 30 to slide along the bar 36 during the movements of the carriage 469 but the actuator is moved vertically with said bar during the vertical movements of the bar.

The bar 36 is mounted upon the horizontally extending arms of bell cranks 42 pivoted at 44 on the frame of the type head, the said arms of the bell cranks engaging in slots 44a formed in the ends of said bar. The upwardly extending arms of the bell cranks are tied together by the engagement of the same in slots 44b formed in a longitudinally movable bar 46 mounted on the type head for horizontal movements by means of the pins or studs 24 which engage in slots 50 in the bar.

The bars 22 are separated by spacing plates 26a and one of these plates separates the forward bar 22 from the bar 46. A spacing plate 26a also is located back of the rear bar 22 in spaced relation to the backing and supporting plate 26b fixed to the frame of the type head. The spacing plates are mounted upon screw studs 26c and 26d supported on the backing plate 26b and passing through corresponding openings in the spacing plates and in the forward plate 26e. The screws 26c pass through and form pivots for the bell crank levers 16 and for the similar bell crank levers 42 hereinafter referred to. The spacing plates also separate the bars 14 from each other, and the forward bar 14 from the bar 36. The backing plate 26b, spacing plates 26a, and the forward plate 26e enclose and form guides engaging lateral faces of the bars 22, the bar 46, the bars 14, and the bar 36. The pins 24, supporting the bars 22 and 46, fit in openings in the four forward spacing plates 26a and are held from endwise movement by the engagement of the forward plate 26e and the backing and supporting plate 26a with the forward and rear ends respectively of the pins.

The bar 36 is moved upwardly to lift the feeler bars prior to each denominational movement of the carriage 469, and prior to the return movement of the carriage to starting position, and is allowed to descend to permit the descent of the feeler bars when said bars are located in registration with a code disk. The mechanism for moving the bar 36 vertically comprises a link 52 (see Fig. 55), the upper end of which is formed with a forwardly extending projection 54 engaging in a slot 56, see also Fig. 21, formed in the bar 36. The lower end of the link 52 is pivotally connected by means of an eccentric stud 58 to the arm 60 of a U-shaped lever, indicated as a whole at 62 and pivoted on a shaft 64 fixed to one of the side plates of the machine head. The lever 62 is formed with a blade 66 arranged to engage the inclined faces of the projections or teeth on a cam disk 68 fixed to the hollow shaft or bushing 70 mounted to turn on a fixed shaft 71a supported at its ends on the frame of the type head.

Formed on the lever 62 is a second arm 72 upon which is mounted a stud 74 having a square head arranged to engage the periphery of a timing disk 76 fixed to the bushing 70. The disk 76 is formed with projections or teeth 76a and with recesses or slots 76b between the teeth as clearly shown in Figures 55, 56 and 61. When the head of the stud 74 rests on the outer edge of one of the projections 76a of the disk, the arm 60 of lever 62 and the link 52 are held in elevated positions to locate the feelers 6 in their uppermost positions above the code disks. When the link 52 is depressed and the arm 72 of lever 62 is swung downwardly to engage the head of the stud 74 in one of the recesses 76b, the feelers 6 are located in lowered positions to engage one of the code disks 12. The link 52 is acted upon by a coil spring 76c connecting the same with the lever 120 hereinafter described, which spring tends to depress the link and to swing downwardly the arms 60 and 72 of lever 62.

*Selector mechanism*

Pivoted upon the shaft 64 is a second U-shaped lever 78, the arm 80 of which is connected by a stud 82 and a link 84 with an arm 86 fixed to a square shaft 88 having pintles 90 at its ends engaging in brackets 91a, Figs. 2 and 57, attached to the frame of the type head or carriage. To the shaft 88 are secured a series of brackets 92, Fig. 57, upon each of which is pivoted at 94 a selector 96 acted upon by a coiled spring 98 which tends to depress the forward end thereof. Each of the selectors 96 is formed with a spade-shaped pusher 100 arranged to engage the upwardly extending arm 102 of the corresponding numeral key lever 87. Each of the selectors may be held up in a position to locate the pusher blade 100 above the arm 102, on the corresponding key lever, so that the blade will not act on the key lever (see Fig. 15). The selector may be allowed to descend into a position back of the upper end of said arm, as shown in Figure 57. To control the vertical position selectively of the selectors, each selector is formed with a forwardly extending arm 106 arranged to rest upon the upper edges of the four longitudinally movable control code bars 28 referred to above which are mounted for longitudinal movement in slots in supporting studs 110, Fig. 1, fixed to the upper portion of the frame of the machine head. The code bars 28 are each acted upon by a coiled spring 104 connecting an upwardly extending arm 108 on the code bar with a forwardly extending arm 108a formed on a fixed plate 110a attached by screws 112a to the frame of the type head of the machine. These springs tend constantly to move the code bars and the bars 22 to the left, Figs. 1 and 15, and to depress the bars 14 and the feelers. These code bars are provided with elevated, upper-edge portions 112 and with depressed upper-edge portions 114. When an elevated edge portion on any one of the code bars is engaged with the arm 106 on a selector, the blade 100 of said selector will be located above the corresponding arm 102 of the corresponding numeral key lever and the key lever will not be actuated by the selector during the movement of the selector-operating shaft 88. When depressed portions in all four selector code bars 28 are engaged with the arm 106 of a selector 96, the selector is held depressed in position to locate the blade 100 of the selector behind the arm 102 of the corresponding numeral key lever; and, as the selector-operating shaft 88 is given a clockwise movement, Figure 55, the selector 96 will operate the key lever to connect the corresponding type-bar mechanism with the fluted shaft. The longitudinal positions of the code bars are controlled, respectively, from the longitudinally movable bars 22 and the longitudinal positions of these bars are controlled by the feelers 6 as the code disks are sensed.

Upon the arm 80 of the U-shaped lever 78 is mounted a roller 116 arranged to engage a cam disk 118 fixed to the shaft 70. By the engagement of this disk with the roller, the lever 78 is actuated to raise and lower the link 84 and thereby actuate the shaft 88. Upon the shaft 64 is pivoted an escapement lever 120 having an inwardly directed blade 122 arranged to engage the cam projections on the cam disk 68 and having a set screw 124 mounted on the body of the lever and arranged to engage the corresponding portion of the lever 62 to actuate said lever to lift the link 52 and thereby lift the feelers of the sensing mechanism. The spring 76c tends to swing the lever 120 in a counterclockwise direction, Figs. 55 and 56. The lever 120 is actuated from each type-bar mechanism or, to be more specific, from the universal bar, during each typing operation or cycle. To an arm 78a of the lever 78 is attached a relatively light coil spring 78b which tends constantly to swing the lever upwardly. The weight of the parts together with the tension of the springs 98, however, is sufficient to overcome the tension of the spring 78b so that, when the arm 80 of the lever 78 is free to swing downwardly, said lever is swung downwardly against the tension of the spring 78b.

*Spring winding mechanism for spring for operating control cam shaft*

(See Figs. 59, 60, 61, and 61a)

The control cam shaft 70, to which the disks 68, 76, and 118 are fixed, is mounted for rotation on the fixed shaft 71a and is rotated to actuate certain parts in the total-taking operation by means of a suitable spring. This spring is normally maintained in a wound-up or tensioned condition so that it tends to rotate the shaft 70 in a counterclockwise direction, Fig. 55, and the shaft is released to the action of the spring, upon the upward movement of the total-taking key lever after it is depressed. The spring for rotating the shaft 70 consists of a spiral spring 126, Fig. 61, one end of which is attached to a stud 128 fixed to the cam disks 118, 68 and 76. The other end of the spring is connected to a stud 130 fixed to a ratchet wheel 132 mounted on a bushing 133a, Figs. 59 and 61a, also journaled on the shaft 71a inside the cam disk 118. The ratchet wheel 132 is rotated step by step in a counterclockwise direction, Fig. 59, to wind up the spring 126. The mechanism for rotating the ratchet wheel comprises a link 134 pivoted at 136 on a lever 138 pivoted at 140 to the frame of the machine head. The lower end of the link 134 slides on a pin 134b fixed to the frame and engaged in a slot 134a formed in the link. The link 134 carries, at its lower end, a pawl 142 pivoted at 144 on the link and acted upon by a spring 146. This spring tends to maintain the acting or toothed end of the pawl in engagement with the peripheral teeth on the ratchet wheel 132. The lever 138 is acted upon by a coiled spring 148, the lower, hooked end of which is engaged in any one of a series of notches 148a formed in said lever at the upper side of a slot 148b therein. This spring maintains the upper edge of the lever in engagement with a roller 150 journaled on a stud 152 mounted in an eccentric position on a disk 154 fixed to one end of the fluted shaft 77, by which the type-bar mechanisms are actuated. By adjusting the spring 148 in the different notches 148a, the force exerted by the spring tending to lift the forward portion of the lever may be adjusted.

During the normal operation of the machine, the ratchet wheel 132 is free to turn in both directions, and, as the link 134 is reciprocated vertically, by the action of roller 150, the ratchet wheel turns in a counterclockwise direction, Fig. 59, during the upward movement of the link, under the action of the pawl 142, and then turns back in the opposite direction, under the action of the spring 126 during the downward movement of the link. Upon the depression of the total-key lever, however, a pawl is thrown into operation which, after the movement of the ratchet wheel in a counterclockwise direction, produced by the upward movement of the link 134, prevents the ratchet wheel from returning in a clockwise direction so that the spring is wound up step by step by the reciprocation of the link 134. When the spring 126 reaches a predetermined tension, its force, tending to turn the ratchet wheel 132 in a clockwise direction, will equal the force of the spring 148, so that the spring 126 will not be wound any further.

The mechanism for holding the ratchet wheel 132 from turning back in a clockwise direction, after its movement in a counterclockwise direction, comprises a pawl 158 formed on a lever 160 pivoted at 162 on bracket 164 attached to the frame of the machine head. This pawl is acted upon by coiled springs 166 and 166a which tend to swing the same in a clockwise direction, Fig. 59, to engage the pawl with the ratchet wheel 132. The pawl, however, is normally maintained out of engagement with the ratchet wheel by means of a pawl retainer 168 pivoted at 170 on the total-key lever 172, which lever is pivoted on the shaft 174 mounted in the frame of the machine head. The retainer 168 is acted upon by a spring 168a which tends to swing the same in a counterclockwise direction, Figs. 59 and 60, about the pivot 170. The key lever 172 is acted upon by a coiled spring 172a which tends to raise the forward key carrying portion of the lever and the movement of the lever in opposite directions is limited by means of a stop stud 172b mounted on the frame of the type head and arranged to be engaged by spaced stop faces 172c on the lever. The pawl retainer is formed with an arm 176 having a forwardly directed finger 178 arranged to engage a pin 180 fixed to the lever 160. The retainer 168 is provided with a second arm 182 spaced from the arm 176 and formed with a projection 184 which normally rests against a pin 186 mounted on the frame of the type head. Thus, when the key lever 172 is in elevated position, the retainer 168 is located in the position shown in Fig. 59, with the end of the projection 184 resting against the pin 186, and with the finger 178 engaged beneath the pin 180, thereby holding the lever 160 in position with the pawl 158 out of engagement with the ratchet wheel 132. Upon the depression of the key lever 172, projection 184 is carried downwardly and to the left beyond the pin 186, and the finger 178 is moved downward and to the left away from the pin 180; and when the projection 184 is completely disengaged from the pin 186, the retainer is swung downwardly and to the right into substantially the angular position shown in Figure 60, the arm 182 then resting against the pin 186, as shown in this figure. During the continued downward movement of the key lever, after the pin 180 is released by the projection 178, the lever 160 is still held in position to hold the pawl 158 out of engagement with ratchet wheel 132 by a latch 188 pivoted at 190 on the bracket 164 and having a shoulder 192 arranged to engage a tail 192a on the lever, the latch lever being yieldingly held in latching position by spring 166a which is connected at its lower end to the lever. At a point adjacent the end of the downward movement of the key lever, the lower end of the arm 176 engages the latch lever 188 and depresses the same, thereby releasing the lever 160 and allowing the same to be actuated by springs 166 and 166a to engage the pawl 158 with the ratchet wheel 132.

Upon the elevation of the key lever, the retainer 168 moves diagonally upwardly, and to the right, Fig. 60, until the movement of said parts is stopped by the engagement of the projection 184 with the pin 186, the arm 182 sliding along the upper side of said pin during this movement of the retainer. The upward movement of the retainer is thus arrested slightly before the finger 178 engages the pin 180. The retainer 168 is held substantially in this position during the rotation of the ratchet wheel 132 to wind up the spring 126 until the stud 130 engages the retainer and swings the same upwardly, and to the left, into substantially the angular position shown in Figure 59. This movement of the retainer carries the lower end of the projection 184 beyond the pin 186, and the retainer is then moved a short distance upwardly and to the right by a short upward movement of the key lever, which locates the projection in a position opposite the pin 186. This final upward movement of the retainer, through the engagement of the finger 178 on the same with the pin 180, actuates the lever 160 to carry the pawl 158 out of engagement with the ratchet wheel 132. The latch lever 188 then swings upwardly to carry the shoulder 192 to the left of the tail of the lever 160 to hold the latter lever in pawl disengaging position against the action of the springs 166 and 166a. The rotation of the ratchet wheel finally brings the stud 130 substantially to the position shown in Fig. 59, thereby releasing the retainer and the retainer is restored by the spring 168a to the position shown in this figure, with the end of the projection 184 resting against the pin 186.

*Mechanism for controlling rotation of cam disk assembly from total key lever*

(See Figs. 61, 62, and 63)

The total key lever 172 is formed with a recess 338 in which engages a projection at the end of the upwardly extending arm of a lever 340 fixed to a rock shaft 342 mounted in the frame of the type head. Loosely pivoted on the shaft 342 is a lever 344 connected with the lever 340 by means of a pin 346 mounted on said lever and engaging in a slot 348 in the forwardly extending arm of the latter lever. The lever 344 is formed with a shoulder 350 arranged to be engaged by the flat side of the pin or stud 128 fixed to the cam disk assembly 118, 76 and 68, to hold the disk assembly from rotation. The engagement of the pin 128 with the shoulder 350 on lever 344 holds the disk assembly from rotation when the total-key lever 172 is in its upper position. Upon the depression of the key lever, the lever 340 is swung in a direction to lift the lever 344, and thereby disengage the shoulder 350 from the stud 128. The disk assembly is then held from rotation by means of a finger 354 formed on the lever 340 which, by the swinging movement of the lever, is moved upwardly into position to engage the flat side of a second stud 356 also mounted on the disk 118. The engagement of this finger with the stud holds the disk assembly from rotation as long as the total key is held depressed. The end of the finger 354 is located so that there is a slight rotary movement of the cam disk assembly following the release of the same by the lever 344 before the rotation of said assembly is arrested by the finger. This slight rotary movement of the disk assembly carries the stud 128 beneath the curved face 358 of the lever 344.

Upon the release of the key lever, the finger 354 is swung downwardly out of engagement with the stud 356, allowing the disk assembly to rotate. During this rotation, the curved face 358 of the lever 344 engages first the stud 128 and then the studs 360 and 360a, also fixed to the cam disks.

The stud 360a is somewhat longer than the studs 360 and is arranged to extend behind the stud 130 carried by the ratchet wheel 132 so that the stud 360a cannot, at any time, get ahead of the stud 130. Thus, there is slightly less than a complete revolution between the position of the ratchet wheel 132 with relation to the disk assembly, when the coil spring 126 is completely wound up, and the position of said ratchet wheel with relation to the disk assembly when the coil spring is under its minimum tension.

*Mechanism for preventing misoperation of total-taking mechanism through erroneous operation of total key*

It may happen that, after the total key lever is depressed and released, said lever is again depressed, before a rotation of the cam disk assembly is completed, and held down until the end of the total-taking operation and then released. The second depression of the key lever will swing the lever 344 upwardly so that the shoulder 350 thereon will not engage the flat side of the stud 128 to arrest the movement of the disk assembly at the end of a rotation. The finger 354, however, will be swung upwardly into position to engage the flat side of the stud 356 to arrest the rotation of the disk assembly after slightly more than a complete rotation. Upon the release of the key lever after this second depression, the finger 354 will be disengaged from the stud 356 and the lever 344 will be depressed. The cam disk assembly, however, will have turned to a position such that the flat side of stud 128 has passed the shoulder 350 in said lever and the cam disk assembly will continue to rotate under the action of spring 126. This, of course, will give an erroneous result in the total-taking operation.

To avoid the above misoperation, a dog 362 is pivoted at 364 on the horizontally extending arm of the lever 340 and is acted upon by a coil spring 366 which tends to swing the forwardly projecting finger 368 on said dog upwardly with relation to lever 340. The finger 368 projects forwardly a slight distance beyond the forward end of the finger 354.

The length of the finger 368 is such that, when the total key is depressed, thereby swinging the finger 354 upwardly behind the flat surface of the pin 356, the finger 368, which is swung upwardly with the finger 354, engages the underside of the pin 356. The finger 368, therefore, has no function in the normal operation of the mechanism. However, when the total key lever is depressed and released to throw the total-taking mechanism into operation and, while the total-taking operation is being performed, the key is depressed again and is held in depressed position until after the completion of a rotation of the cam disk assembly and is then released, the finger 368 operates to prevent the misoperation, referred to above. As the total key is depressed during the total-taking operation and is held down, the lever 344 is swung upwardly to carry the shoulder 350 out of the path of the stud 128, and the finger 368 is swung upwardly with the finger 354. The end of the finger 368 is thus carried up into the path of the stud 356 and is engaged by said stud to arrest the rotation of the disk assembly slightly before the end of a complete revolution of said assembly. Then, when the total key is released, the finger 368 is swung downwardly out of engagement with the stud 356 to allow the cam disk assembly to rotate, and the lever 344 is swung downwardly to locate the shoulder 350 in position to be engaged by the stud 128 to arrest the rotation of the disk assembly after a slight rotation thereof.

*Cycle of cam disks and mechanisms operated thereby*

When the total-taking mechanism is idle, the cam disk assembly and the parts operated by the cams occupy substantially the positions shown in Fig. 55.

Upon the release of the cam disk assembly produced by the depression and release of the total key lever 172, the assembly is rotated in a counterclockwise direction, Figure 55, under the influence of the coiled spring 126. During the first part of the rotation of the cam disk assembly, the rotation of the cam disk 76 carries the projection 76a, with which the said stud 74 is engaged, out of contact with said stud thereby releasing the lever 62. This lever is then actuated by one of the projections 68a on the cam disk 68 and by the spring 76c to depress the arm 60 of said lever and the link 52 to lower the feelers 6 into operating position, the lever 120 having previously been swung counterclockwise, Fig. 55, by the spring 76c to its limiting position. As the cam disk assembly continues to rotate, the projection 118a on the cam disk 118, which was engaged with the roller 116, releases said roller, the lever 78 is swung counterclockwise and arm 80 is depressed by gravity and the action of springs 98 (Fig. 57) to advance the type-bar selectors 96. One of these selectors is then in lowered position and actuates a key lever 87 to connect the corresponding type-bar mechanism with the continuously rotating toothed shaft 77. During the operation of said mechanism to advance the type bar, the initial step in the escapement movement of the type carriage takes place but this escapement movement is relatively slight. This type-bar mechanism, in its operation, depresses the universal bar 145 and through the link 120a, the lever 120 is swung clockwise, Figure 55, to swing the lever 62 clockwise to lift the arms 60 and 72 of said lever. The lifting of the arm 60 raises the link 52 to carry the feelers to their upper positions and the lifting of the arm 72 carries the stud 74 above the outer edge of the next projection 76a on the disk 76 and said projection is carried under the stud by the further rotation of said disk. These movements of the levers 62 and 120 place the blades 66 and 122 of said levers between two cam projections 68a on the disk 68. At about the same time, the arm 80 is lifted by the engagement of a projection 118a on the disk 118 with the roller 116 to raise the link 84 and restore the selector actuating mechanism and the selectors to normal positions. During the further rotation of the cam disk assembly, following the above-described actuation of lever 120, a projection 68a on the disk 68 engages the blade 122 on the lever 120 thereby holding up the rotation of the disk until the type-bar mechanism moves back toward its normal retracted position and allows the universal bar 145 to swing upwardly and the lever 120 to swing counterclockwise under the influence of the spring 76c. During the retraction of the type bar, the second step in the escapement movement of the type carriage takes place, and this step constitutes the major part of the escapement movement. When the cam disk assembly is thus released by said lever, the cycle of said assembly is completed to bring the same to the position shown in Fig. 55, ready to start another cycle. The above cycle of operations is repeated, one cycle for each denomination in the total entered in the totalizer of the crossfooter, until the entire total is printed on the work sheet. During the taking of a total, the cam disk assembly executes nearly a complete rotation.

*Mechanism for setting the crossfooter*
(See Figs. 10 to 14 inclusive)

The mechanism for setting the crossfooter for addition or subtraction comprises a carriage 517 upon which is mounted the shiftable gear 381. The carriage 517 is slidably supported on a guide bar or rod 519 secured at its ends to the side plates 377 of the crossfooter frame and is provided with an arm 521 engaging in a groove 523 in the hub of the gear 381.

The carriage 517 is moved longitudinally on the guide rod 519 by means of an arm 525 fixed to the forward end of a rock shaft 527 mounted to turn in bearings on the crossfooter frame, said arm having a pin-and-slot connection with the carriage. To the rear end of said shaft is attached an arm 529 having a pin 531 engaging in an angular slot 533 in the shifting lever 535 pivotally supported at 537 on a laterally shiftable slide 539. The slide 539 is slidably mounted on screws 541 and 543 engaging respectively in slots 545 and 547 in the slide and threaded into the crossfooter frame. Between its upper and lower ends, the shifting lever 535 is connected by a stud 549 with one end of a link 551, the other end of which is pivotally connected at 553 with a lever 553a pivoted at 555 on the frame of the type carriage. The lever 553a is connected to shift the shiftable gear for reversing the direction of rotation of the master wheel 169 for driving the column registers. The stud 549, connecting the shift lever 535 with the link 551, engages in a slot 557 in the lever (see Fig. 10) and is supported on a swinging arm 559 pivoted at 561 on the frame of the crossfooter.

The arm 525 is shifted to shift the carriage by swinging the shift lever 535 either about the pivot 537 or about the pivot stud 549. Figure 10 shows the parts in normal or adding positions, with the gear 381 dimeshed from the twin gear 387 and in mesh with the gear 200 (see Fig. 66). The position of the lever 553a is such that the driving mechanism for driving the master wheel of the column register is adjusted to drive said wheel in a positive or adding direction. It will be noted that, as shown in Figure 10, the position of the lever 535 is such that the pin 531 is located in the central part of the cam slot 533. In setting the machine for subtraction by the depression of the subtract key, the lever 535 is swung to the right, Figure 10, about the pivot 537, thereby locating the pin 531 in the left-hand portion of the cam slot 533 as shown in Figure 11. This movement of said cam lever, through the engagement of the pin in the cam slot swings the arm 529, the rock shaft 527 and the arm 525 in a clockwise direction and shifts the carriage 517 and the gear 381 to the right to carry said gear out of mesh with the gear 385 and into mesh with the right-hand section of the twin gear 387 as shown in Fig. 11.

In setting the crossfooter for subtraction automatically under control of the type carriage, the shift lever 535 is swung in a clockwise direction about the pivot stud 549 by shifting the slide 539 to the right as shown in Fig. 12. This movement of the lever locates the pin 531 in the right-hand portion of the cam slot 533 and, through the engagement of the pin in the slot, shifts the carriage 517 and the gear 381 to the right into the positions shown in Fig. 12 which are the same as shown in Fig. 11. In this case the subtract key is not depressed and the column register is in condition for adding.

In setting the crossfooter for addition and the column register for subtraction, the slide 539 is shifted to the right and the stud 549 is also correspondingly shifted to the right so that the lower end of the lever 535 is mintained substantially in constant position laterally of the machine. The pin 531, the arm 529, the rock shaft 527, the arm 525, and the carriage 517 are therefore not shifted and the gear 381 is maintained in adding position.

The lever 553a and the lever 535 are shifted into subtract positions as shown in Fig. 11 through a link 563, the left-hand end of which is pivotally connected with the lower end of the lever 553a. The right-hand end of the link 563 is pivotally connected with an arm 565 fixed to a rock shaft 567 mounted to turn in bearings on the type head. To this rock shaft is fixed a second arm 569 pivotally connected at 569a to the lower end of a vertically movable spring suspended link 338a hereinafter described. The link 338a is connected with the subtract key lever 573 by means of a link 571 the lower hooked end of which engages said lever as shown in Fig. 10. The upper end of the link 571 is connected with the link 338a by means of a pin 571a which engages in a slot 571b in link 338a.

The lever 535 is shifted into the subtract position shown in Fig. 12 with the lever 553a in normal or add position by mechanism comprising a lever 575—579 pivoted on an extension of the rock shaft 527, the upper arm 579 of which has a pin-and-slot connection 581 with the slide 539. This arm is acted upon by a coiled spring 583 which tends to swing the lever in a counterclockwise direction, Figs. 10 to 13 inclusive. The downwardly extending arm 575 of said lever is pivotally connected at 585 with one end of a link 587, the other end of which is connected by a pin-and-slot connection 589 and a spring link 591 with the lower end of an arm 593 of a bell crank lever pivoted at 595 on the casing plates 483 between which are mounted the bars 479 and 481 of the denominational shift mechanism of the crossfooter. The other arm 597 of said bell crank lever carries a roll 599 which is arranged to engage a cam 600 carried by the column register.

When the subtract key lever is in elevated position and the arm 597 of the bell crank lever 593—597 is depressed by the engagement of the cam 600 with the roll 599 upon the passage of the master wheel 169 into the register zone, through the connection described, the lever 535 is swung in a clockwise direction about the stud 549 thereby shifting the lower end of the lever to the left, Fig. 10, to engage the pin 531 in the right-hand portion of the cam slot 533 and shifting the carriage 517 to the right into the position shown in Fig. 12.

*Clearing of crossfooter*

The total is always taken with the type carriage in a position on the line-space frame in the direction of letter-spacing movement such that the master wheel 169 is in the zone of a column register having a subtraction cam such as the cam 600 shown in Figs. 10 to 13 inclusive. Thus, when the totalizer of the crossfooter is in a positive condition, digits corresponding to those indicated by the indicating wheels 194 of the crossfooter and to those printed by the type-bar mechanism will be subtracted in the several denominations of the totalizer, thereby clearing the totalizer.

In taking a total from the crossfooter, the state control lever 315 is set in "compute" position and the type carriage is adjusted to locate the master wheel 169 in registration or in mesh with the wheels 167 of the accumulator train of highest order of the column register 163 which is to be used in the taking of totals, said register having a subtract cam 600 and a pickup lug 495 for moving the master wheel carriage 469 of the crossfooter 373. This locates the master wheel 200 in registration or mesh with the wheel 198 of the accumulator train of highest order of the crossfooter. The location of the type head in this position engages the roll 599 with the cam 600 on the column register and the bellcrank lever 593—597 is thereby positioned to adjust the driving mechanism for the crossfooter register into subtract condition. The total key is then depressed and immediately released.

The depression and release of the total key lever, by this actuation of the total key, releases the cam disk assembly to the action of the spring 126 and said assembly is rotated in the manner above described to cause the machine to execute as many cycles as there are denominations in the crossfooter. During each cycle, mechanisms controlled by the cams on the cam disks of the cam disk assembly are operated to perform the following operations:

The feelers 6 are actuated to analyze the code disk of the indicating wheel 194 of the denomination with which the master wheel 200 is in registration, the code bars 28 are positioned in accordance with the positions of the feelers, the selector lever 96, corresponding to the number indicated by the wheel 194, is allowed to be depressed into operating position, said lever is advanced to actuate the key lever 87 to connect the corresponding type-bar mechanism with the continuously rotating fluted or toothed shaft 77 and the type-bar mechanism is actuated to print the digit indicated by the indicating wheel upon the work sheet. The depression of the universal bar 145 produced by the type impression movement or stroke of the type-bar mechanism, actuates the escapement to cause a relatively slight escapement movement of the type head.

The type-bar mechanism, in its type impression stroke, engages the corresponding differential actuator rack 173 with the power-driven toothed or fluted shaft 193 to drive the rack in an upward direction for the distance required for the subsequent operation of the differential mechanism. The rack is then disengaged from the shaft 193 and the differential mechanism of which it forms a part is moved in a downward direction by suitable springs. The differential mechanism, during its downward or return movement, or during a part of said movement, is connected with the driving mechanism for the crossfooter register and the accumulator train with which the master wheel 200 is engaged is actuated in a subtract direction to clear the indicating wheel of said train. The upward movement of the universal bar, during the retracting movement of the type-bar mechanism, actuates the escapement to allow the type head to execute the second step in the escapement movement. The greater part of the escapement movement occurs during this second step.

The above cycle of operations is repeated until the entire total in the crossfooter is printed and the crossfooter is cleared. The final escapement movement of the type carriage carries the master wheel 169 to a position one step beyond or below the lowest denomination of the column register and the master wheel 200 below the lowest denomination of the crossfooter and the carriage 469 is released during this final escapement movement and is restored to normal position, as shown in Fig. 7, by the spring 487, the master wheel 200 thus being located one step above or to the left of the highest denomination of the crossfooter.

*Mechanism for printing stars after a total*
(See Fig. 1 and Figs. 74 to 80 inclusive)

The machine is provided with a star printing type-bar mechanism and means for controlling said mechanism to print one or more stars after a total. This control means operates to cause the printing of the star by actuating the star-printing key lever. The means for actuating the star-printing key lever is controlled from the transfer re-set mechanism of the crossfooter through an adjustable lever arranged to be located in any one of three different positions. The means for actuating the key lever is controlled either to actuate the key lever twice to cause the star-printing type-bar mechanism to print two stars, or to actuate the lever once to cause said mechanism to print a single star, or is held from actuating the key lever so that no star is printed after a total is taken. The star-printing control mechanism is normally held out of operation by a suitable latch lever which is operated to release or set said mechanism during the taking of a total by a stud carried by the cam disk assembly of the total-taking mechanism so that it operates only after the taking of a total. Then, after the completion of the total-taking operation, the star-printing key lever is operated by means controlled from the transfer re-set mechanism.

The star-printing mechanism comprises a key lever 89a pivoted on shaft 97a on the type head and having an upwardly extending arm 102a connected by the usual drag link with the thrust link of the star-printing mechanism. This thrust link carries a pawl for engaging the fluted shaft 77 and is connected with the star-printing type bar by substantially the same connections as are employed in the other type-bar mechanisms. The key lever 89a is provided with a key-carrying arm 380 in which is mounted a pin 382. For the purpose of actuating the lever 89a to print stars, the pin 382 is arranged to be engaged by an arm 384 fixed to a rock shaft 386 mounted in bearings in the attachment frame 388 secured to the type head. To the rock shaft 386 is attached an arm 390 extending rearwardly from said shaft and carrying a roll 392 arranged to engage a cam plate 394 fixed to the rock shaft 405 constituting part of the transfer re-set mechanism. Mounted upon the rock shaft 405, see Fig. 66, are the spaced arms 403, the rear ends of which are connected by the rod 401 by which the transfer levers 214 are actuated to re-set the transfer mechanism upon the completion of a total-taking operation. The arm 390 is acted upon by a coil spring 397 which tends constantly to maintain the roll 392 in engagement with the cam plate 394.

After the last number of a total is printed, and the crossfooter-actuating master wheel moves into sub-units position, the rock shaft 405 is turned first in a clockwise direction, Figures 74 to 79, to re-set the transfer mechanism, and then is turned back to starting position. The formation of the cam plate 394 is clearly shown in Figures 74 to 78, inclusive, said cam plate having a recess 394a between the two projections 394b. With the above construction, provided that the arm 390 is free to swing downwardly or in a clockwise direction, Figs. 74 to 78, inclusive, during the turning movement of the rock shaft 405 to re-set the transfer mechanism, the arm 390 will be swung downwardly and then back upwardly to its initial position; and during the turning movement of the rock shaft 405 back to its starting position, the arm 390 will again be swung downwardly and then back upwardly to its initial position. Upon each downward movement of the arm 390, the arm 384 is swung downwardly to depress arm 380 of the star key lever 89a to cause the printing of a star.

The transfer re-set mechanism of the crossfooter, of course, is often actuated when no total is taken, and it is then desirable to prevent the star-printing mechanism from acting. To this end, a lever 402 is pivoted at 404 on the framework 388 and is provided with a shoulder 406 arranged to engage beneath a stop plate or blade 408 carried by the lever 390. The lever 402 is acted upon by a coil spring 410 which tends to swing the same in a counterclockwise direction to engage the same with the stop blade 408 and to locate the shoulder 406 beneath the stop blade. The lever 402 is held in position with the shoulder 406 beneath the stop blade 408 except when a total is taken, so that the arm 390 is held from swinging downwardly during each action of the transfer re-set mechanism except after that following the taking of a total. When a total is taken, the lever 402 is swung in a clockwise direction, Figs. 74 to 78, inclusive, prior to the action of the transfer re-set mechanism to carry the shoulder 406 out from underneath the stop blade 408 and to leave the lever 390 free to swing downwardly. The lever 402 is then swung in a clockwise direction by means of the stud 356 carried by the disk 118 of the cam disk assembly which is arranged to engage a rearwardly projecting tail 412 on said lever 402. The contact of the stud 356 with the tail 412 of said lever occurs during the taking of a total so that the lever 390 may be free to swing downwardly when the transfer re-set mechanism acts.

The present machine is provided with mechanism for controlling the movements of the arm 390 by means of a manually adjustable controlling device so that in one adjustment of said device, the arm 390 will swing downwardly and upwardly twice during the complete movement of the transfer re-set mechanism to cause two stars to be printed, and with another adjustment of said device, the arm 390 will swing downwardly and upwardly once to cause a single star to be printed during a complete movement of the transfer re-set mechanism; and with a third adjustment of said adjustable device, the arm 390 will be held from swinging downwardly during the action of the transfer re-set mechanism so that no star will be printed. This mechanism comprises a vertically movable control slide or lever 414 having a slot 416 adjacent its lower end in which engages a stud 418 fixed to the lower end of a manually adjustable lever 420 pivoted at 422 on the framework 388 of the mechanism. The lever 414 is acted upon by a relatively light coil spring 424 which tends to move said lever upwardly and to swing the same about the stud 418 in a clockwise direction. The lever 414 is formed, at its upper end, with a downwardly directed projection 422a which engages in a recess 422b in the stop blade 408. The engagement of the projection 422a in said recess guides the upper end of the lever 414 and the contact of said projection with stop blade 408 limits the swinging movement of said lever under the action of the spring 424. The lever 414 is formed with a shoulder 426 so arranged that, when the parts are in normal positions, said shoulder engages a stud 428 mounted on, and projecting laterally from, the lever 402, the lever having a recess to receive said stud. When the lever 402 is swung in a clockwise direction, Figures 74 to 78, by the stud 356, the stud 428 is carried to the right off the shoulder 426 allowing the lever 414 to be moved upwardly by the spring 424, the stud 418 limiting the upward movement of the latter lever. After the stud 356 passes the tail 412 on the lever 402, said lever is swung back in a counterclockwise direction by the spring 410 which is stronger than the spring 424. The stud 428 is then pressed yieldingly against the right-hand side of the lever 414, and said lever is swung to a slight degree in a counterclockwise direction to carry the same into engagement with the right-hand beveled edge of the stop blade 408. The lever 414 is formed with two notches 430 and 432 arranged to be engaged alternatively by the beveled edge of the stop blade 408. The lever 414 is formed with a recess 428a in which a beveled portion of the stud 428 may be engaged under certain conditions at this time.

The lever 420 is adjustable in any one of three positions to limit, variably, the upward movement of the lever 414 upon the disengagement of the stud 428 from the shoulder 426. The lever 420 is yieldingly held in any one of its adjusted positions by means of a detent lever 434 pivoted at 436 on the framework 388 and acted upon by a coil spring 438 which tends to swing the same toward the axis of the lever 420. The detent lever is provided with three recesses 440 in any one of which a pin 442, carried by the lever 420, may be engaged by a certain adjustment of the lever to hold the lever in adjusted position.

Figure 74 shows the parts of the mechanism for actuating and controlling the star key lever, to print stars after a total, in the positions which said parts assume when said mechanism is idle, except that the stud 356 is shown in engagement with the tail 412 of lever 402. This occurs immediately following the taking of a total. This figure shows the lever 420 adjusted in an intermediate position to cause the printing of a single star following the taking of a total, the stud 418 carried by said lever being located in intermediate position between its upper and lower positions. With the parts in normal positions as shown in Figure 74, the lever 414 is held down against the action of spring 424 by the engagement of the stud 428 with the shoulder 426 and the movement of said lever in a clockwise direction about the stud 418 under the action of said spring is limited by the engagement of the projection 422a on said lever with the stop blade 408. The lever 402 is then held by the spring 410 in engagement with the beveled edge of the stop blade 408 and with the shoulder 406 located below said stop blade. The lever 390 will therefore be held from swinging downwardly during any actuation of the transfer re-set mechanism, prior to the taking of a total, by the engagement of the stop blade 408 with the shoulder 406 on lever 402. During the taking of a total, the stud 356 engages the tail 412 of the lever 402 and swings said lever in a clockwise direction. This movement of said lever carries the stud 428 off the shoulder 426 on the lever 414 and removes the shoulder 406 from beneath the stop blade 408 as shown in Fig. 75. The release of the lever 414 by the stud 428 allows said lever to move upwardly under the action of the spring 424. The upward movement of the lever 414 is limited by the engagement of the pin 418 with the bottom of the slot 416. After the stud 356 has passed the tail 412 of lever 402, said lever is swung back in a counterclockwise direction by the spring 410, the beveled portion of the stud 428 is engaged in the notch 428a in the lever 414 and the latter lever is swung with the lever 402 to engage the same with the beveled edge of the stop blade 408 as shown in Fig. 76, the spring 410 being stronger than the spring 424. Since the lever 420 is adjusted in an intermediate position, the edge of of the stop blade 408 is engaged in the upper notch 430 in the lever 414. Following this positioning of the parts of the mechanism, the transfer re-set mechanism is actuated. During the turning of the rock shaft 405 in a clockwise direction, the arm 390 swings downwardly and then back upwardly to its normal position thereby depressing the arm 380 of the star key lever to cause the printing of a star. During the downward movement of the arm 390, the stop blade 408 forces the lever 414 downwardly until the shoulder 426 is carried below the stud 428, and the lever 402 is then swung slightly in a counterclockwise direction by the spring 410 to engage the stud above said shoulder, the movement of the lever 402 being limited by the engagement of the portion thereof below the shoulder 406 with the beveled edge of the stop blade 408. The stud 428 holds the lever 414 in its lower position and, upon the movement of the arm 390, back to its upper position to carry the blade 408 above the shoulder 406, lever 402 swings slightly further counterclockwise to locate said shoulder beneath said blade. This locates the parts substantially in the positions shown in Figure 77. Then during the turning of the shaft 405 back in a counterclockwise direction, the arm 390 is held from swinging downwardly by the engagement of the blade 408 on said arm with the shoulder 406 and the star key lever is not depressed.

To cause the star-printing mechanism to print two stars after a total, the lever 420 is adjusted in its forward position as shown in Fig. 78, thereby locating the stud 418 in its uppermost position. With this adjustment of the stud 418, the stud 356 engages the tail 412 of the lever 402 during the taking of a total, and swings said lever in a clockwise direction, Figures 74 to 78, to disengage the stud 428 from above the shoulder 426 and thereby allow the lever 414 to move upwardly under the action of the spring 424, until the pin 418 engages the bottom of slot 416, as before. In this instance, however, the lever 414 moves to a higher position, under the action of said spring, this movement of the lever being permitted by the higher position of the pin 418. After the stud 356 releases the tail 412 of the lever 402, said lever is swung back in a counterclockwise direction to engage the stud 428 with the right-hand side of the lever 414, below the notch 428a, and the lever 402 and the lever 414 are then swung back together in said direction by the spring 410 to engage the lever 414 with the stop blade 408 as shown in Fig. 78. In this case, however, the beveled edge of the stop blade engages in the lower notch 432 in said lever. Now when the transfer re-set mechanism is operated, the arm 390 swings downwardly and upwardly during the turning movement of the rock shaft 405 in a clockwise direction, Figures 74 to 78. During the downward movement of said arm, the lever 414 is moved downwardly but not far enough to carry the shoulder 426 below the stud 428, the beveled portion of the stud engaging in the notch 428a at the end of a downward movement of the lever 414 to hold said lever in position. Then, as the arm 390 moves upwardly, the stop blade 408 is engaged in the upper notch 430 in said lever 414. When the arm 390 reaches its uppermost position, the lever 402 is prevented from swinging in a counterclockwise direction to locate the shoulder 406 beneath the stop blade 408 by the engagement of the stud 428 in the notch 428a in the lever 414. The arm 390, therefore, is allowed to swing downwardly during the turning movement of the rock shaft 405 back in a counterclockwise direction to starting position and then is swung back upwardly to its initial position. The downward movement of the arm 390, during the return movement of the transfer re-set mechanism, causes a second depression of the star key lever 372 to print a second star after the total. This downward movement of the arm 390 also moves the lever 414 downwardly to carry the shoulder 426 below the stud 428 allowing the lever 402 to swing in a counterclockwise direction into engagement with the stop blade 408 and, as the lever 390 swings back upwardly and the stop blade 408 is carried above the shoulder 406, said lever 402 is swung slightly further counterclockwise to locate the shoulder beneath the stop blade. The parts are thus restored substantially to the positions shown in Fig. 74 at the end of the latter upward movement of the lever 390.

When it is desirable to print no star after the total, the lever 420 is adjusted in its rearmost position to locate the pin or stud 418 in its lowermost position. With the lever 420 adjusted in this position, upon the swinging of the lever 402 in a clockwise direction, Figures 74 to 78, by the engagement of the stud 356 with the tail 412 on said lever during the taking of a total, the stud 428 is carried to the right beyond the shoulder 426 as before. The position of the pin 418, however, is such that the lever 414 does not then move upwardly under the action of the spring 424 and, upon the release of the lever 402 by the stud 356, said lever is swung back counterclockwise to its normal position again to locate the stud 428 above the shoulder 426 and the shoulder 406 below the stop plate 408. Then, during the subsequent actuation of the transfer re-set mechanism, the arm 390 is prevented from swinging downwardly by the engagement of the stop plate 408 with the shoulder 406 on the lever 402 and the star key lever is not actuated to print a star.

*Negative total taking*

The present machine is provided with a fugitive one mechanism which enters an additional one negatively in the units train of the totalizer of the crossfooter when the highest order wheel of said totalizer is driven in a negative direction from zero to "9" and which enters an additional one positively in the units train of the totalizer when said highest order wheel of the totalizer is driven in a positive direction from "9" to zero.

The present machine is also provided with mechanism by which, when the totalizer of the crossfooter has been operated in a negative direction from zero to "9" thereby setting up a total in complementary form in said totalizer, and this total is analyzed by the feeler mechanism, the type bars are selected to print the true total on the work sheet. When the highest order wheel of the totalizer of the crossfooter is turned in a negative direction from zero to "9," the mechanism for shifting selector levers longitudinally of the code bars to complementary positions is set so as to be operable by the total key upon the next depression thereof. Then, when the total key is depressed and released, the code disk feelers analyze the complementary indications on the code disks but the type bar selector levers select the numeral type bars for the digits making up the complement of the number indicated in the crossfooter. That is, a complement of the complement set up in the crossfooter is printed by the type bars. When the totalizer of the crossfooter is driven from a negative condition in a positive direction from "9" to zero, the selector levers are automatically shifted back longitudinally of the code bars to normal positions.

Fig. 16 of the drawings shows, in dotted lines, the positions of the lower edges of the forwardly projecting arms 106 of the selector levers with relation to the code bars 28. There is one of the selector levers for each of the digits from "1" to "9," inclusive, a lever for "0" and a lever for star printing. The right-hand or normal position and the left-hand or complementary position of each lever are bracketed in Fig. 16, and the digit to which each lever corresponds is placed adjacent the bracket.

The formations of the upper edges of code bars 28 are such that, when a selector lever 96 is in its right-hand position shown in Fig. 16 and the feelers 6 analyze the indication of a certain number on a code disk 12, the selector lever corresponding to this number will be allowed by the code bars to be depressed into operating position and that, when the selector levers are in their left-hand positions shown in this figure, and the feelers analyze the indications of a certain number on a code disk, the selector lever corresponding to the complement of said number will be allowed by the code bars to be depressed into operating position.

In order to locate the parts for taking a complement of a complement, the selector levers 96 are all shifted to the left from their right-hand positions shown in Fig. 16 to the left-hand positions shown in said figure. This is done by shifting the devices for supporting and actuating the levers.

As stated above, the levers 96 are pivotally supported upon the rock shaft 88 and are actuated by said shaft. The forwardly projecting arms 106 of the levers pass, respectively, through slots 230, Fig. 15, respectively, formed in the downturned portions 232 of a slide 234 mounted to slide longitudinally on the angle plate 236 attached to the frame of the type head. The slide 234 is held on the angle plate and guided during its longitudinal movements by means of studs 238 engaging, respectively, in slots 240 in the slide, washers 242 being placed between the heads of the studs and the slide. The rock shaft 88 is mounted for longitudinal movement in its supporting bearings on the brackets 91a. An arm 244, Figs. 15 and 57, projecting rearwardly from the slide 234 engages in a groove or slot 246 in the rock shaft 88 to cause the rock shaft to move longitudinally with the slide.

The mechanism for moving the slide 234 to shift the levers 96 and their actuating mechanism comprises a lever 248, Fig. 15, pivoted at 250 on a bracket 252 adjustably attached to the frame plate 254 of the machine head. The lever 248 is formed with an opening 256 adjacent the upper end thereof in which engages the reduced end of an arm 258 projecting forwardly from the slide 234.

With the above construction, the lever 248 is swung in a counterclockwise direction from the position shown in Fig. 15 to shift the slide 234, the shaft 88, and the selector levers 96 to the left to complementary positions with relation to the code bars 28. The mechanism for swinging said lever comprises a lever 266 pivoted on a stud 268 also carried by bracket 252 on which lever is fixed a pin 264 engaging in a slot 262 formed in a laterally extending arm 260 on the lever 248. The right-hand end of the lever 266, Figure 15, is adjustably connected with the upper end of link or bar 270, the lower end of which is pivotally connected at 272, Fig. 64, with a lever 274 pivoted at 276 on the frame of the machine head. The lever 274 is provided with a recurved arm 278 which is pivotally connected at 280 with a lever 282 suspended by means of a link 284 upon a pin 286. This pin is supported on the rear end of the arm 288 of a U-shaped lever, pivoted on the shaft 290 supported on the frame of the machine head.

The other arm 292 of this U-shaped lever carries, at its rear end, a pawl 294 (see Fig. 64a). The lever 288, 292 is acted upon by a coil spring 294a which tends to swing upwardly, the arms 288 and 292, the pin 286, the link 284, and lever 282 and the upward movement of said parts is limited by the engagement of lever 282 with the shaft 174. The pawl 294 is pivoted on a stud 294a carried by the arm 292 and is acted upon by a coil spring 300 which tends to swing the same in a clockwise direction, Figure 64a. The movement of the pawl 294, under the action of the spring, is limited by the engagement of an arm 302 on the pawl with the underside of the arm 292.

The wheel 198 of the accumulator train of highest order of the register is rotated in a clockwise direction, as indicated by the arrow in Figure 64, during the adding of a number in the said train and is rotated in the opposite or in a counterclockwise direction, during the subtraction of a number in said train. During the rotation of the wheel 198 of said train in a clockwise direction, the pin 306 mounted on the wheel engages the right-hand side of the pawl 294, Fig. 64, and swings the same in a counterclockwise direction about its axis against the tension of the spring 300, the pawl being restored to normal position by the spring when the pin 306 passes the pawl. During the rotation of the wheel 198 in a counterclockwise direction, the pin 306 engages the end of the pawl 294 and, because of the position of the pin with relation to the axis of the pawl, the pin does not swing the pawl about its axis but drives the same downwardly thereby swinging the arm 292 and the arm 288 of the U-shaped lever 288—292 downwardly therewith. This action occurs when the wheel 198 is turned from a zero position in a subtracting direction to a "9" position. The downward movement of the arms of the U-shaped lever causes the lever 282 to swing downwardly about its pivot 280.

The total key lever 172, as stated above, is pivoted on shaft 174 mounted on the frame of the machine head and carries a square stud 312, Fig. 64, which, when the lever 282 is in depressed position, engages a downwardly projecting hook portion 314 on the lever 282 as the key lever is swung downwardly to cause the machine to take a total. The lever 282 is held in its uppermost position by the link 284 and the U-shaped lever 288—292 at all times, except when a complement of a complement is to be taken. With the lever 282 in its uppermost position, the stud 312 will not engage the hook-shaped portion 314 of the lever 282 as the key lever is swung downwardly to cause the machine to take a total. When the number wheel of the accumulator train of highest order of the crossfooter is driven in a subtracting direction from zero position to "9" position, the driving of the U-shaped lever 288—292 downwardly carries the lever 282 downwardly to position the hook-shaped portion 314 in the path of the stud 312. With the lever 282 in this position, as the key lever is pressed downwardly, the stud 312 engages the projection 314 on lever 282 during the downward movement of the key lever and the lever 282 is moved rearwardly, thereby swinging the lever 274 in a clockwise direction, Fig. 64, about the stud 276 and moving the bar or link 270 downwardly thereby shifting the levers 96 and their actuating mechanism across the machine into positions to take a complement from the code disks of the register.

The lever 274 is held in complement-taking position by means of a latch 316 pivoted at 318 on the frame of the machine head and having a shoulder 320 arranged to engage a pin 322 mounted on the lever 274. The latch 316 is acted upon by a coil spring 324 which tends to swing the same in a counterclockwise direction, Figure 64, into acting position.

The latch 316 is swung in a clockwise direction to release the lever 274 upon the automatic actuation of the transfer restoring mechanism of the crossfooter. To this end, a link 326 is pivoted at its lower end at 328 to the latch 316 and adjacent its upper end is formed with a curved slot 330, in which engages a pin 332 carried by an arm 334 attached to the rock shaft 405 of the transfer-restoring mechanism. As the rock shaft 405 is actuated to restore the transfer mechanism of the crossfooter, the arm 334 and the pin 332 are swung upwardly in the slot 330. During the greater part of the upward movement of the pin 332, the pin moves in the slot 330 in the link 326 and therefore does not move the link. As the pin approaches the end of its upward movement, it engages the upper end wall of the slot 330 and lifts the link 326, thereby actuating the latch 316 to disengage the pin 322 on the lever 274 and release said lever. Upon the release of said lever, the parts are moved back to their normal positions by the action of a suitable spring-actuated mechanism and the link or bar 270 is lifted to restore the levers 96 and their actuating mechanism to their normal right-hand positions, shown in Figure 15.

The spring-actuated mechanism for restoring the link or bar 270 (see Fig. 15) comprises a bell crank lever 334a pivoted at 335a on the frame of the type head and a link 336a connecting the downwardly extending arm of said lever with the lever 248. The horizontally extending arm of the lever 334a is connected with the upper end of a vertically movable link 338a by means of a pin 340a fixed in said arm and engaging in a slot 342a in the link. The link 338a is yieldingly held in its uppermost position with the pin 340a in engagement with the lower end wall of the slot 342a by means of a coiled spring 344a suspended from the forward end of an arm 346a fixed to the frame plate 234, said spring being connected to the upper end of the link.

With this construction, as the link or bar 270 is moved downwardly, the bell crank lever 334a is swung in a counterclockwise direction, Fig. 15, and the spring 344a is stretched. Upon the release of the lever 274 by the latch 316, the bell crank lever 334a is swung back in a clockwise direction by the upward movement of the link 338a under the action of the spring 344a and the lever 248 is swung in a clockwise direction to restore the selector levers 96 to their normal right-hand positions. At the same time, through the action of the spring 344a, the lever 266 is swung in a counterclockwise direction to lift the link 270 and restore the levers 274 and 282 to their normal positions.

*Fugitive one mechanism*

(See Figs. 66 to 69, inclusive, and 82)

The accumulator trains of the totalizer mechanism of the crossfooter and the transfer mechanisms for transferring units from each of said trains below the train of highest order to a train of higher order have substantially the same construction and mode of operation as the corresponding mechanisms illustrated and described in the patents to Footherap, Nos. 2,032,691 and 2,145,254 and have been briefly described above.

In addition to the regular transfer mechanisms, the crossfooter is provided with an "extra transfer mechanism A" arranged to be actuated by the accumulator train of highest order and with an "extra transfer mechanism B" arranged to actuate the train of lowest order and controlled by the "extra transfer mechanism A." These extra transfer mechanisms have substantially the same construction and mode of operation as the regular transfer mechanism except as hereinafter described.

The "extra transfer mechanism A" (see Fig. 68) comprises a transfer head 204a mounted to rock on shaft 206 and having a trip member 226a arranged to be engaged by a wide tooth 206a on the denominational wheel 198 of the accumulator train of highest order when said train is driven from "9" to zero in a positive direction or from zero to "9" in a negative direction to rock said head. There are no combined carrying fingers and locking dogs pivoted on the head 204a. The "extra transfer mechanism A" further comprises a bell crank actuator lever 214a, a spring 218a, acting on said lever, a link 208a, a detent 220a, a spring 222a and a roller 224a all having substantially the same construction as in each regular transfer mechanism. The "extra transfer mechanism B" (see Figures 66, 67, and 69) comprises a transfer head 204b mounted on rock shaft 206 and having two carrying fingers and locking dogs 228b pivoted on said head and tensioned by springs 210b for engaging the denominational wheel 198 of the train of lowest denomination, but the head is provided with no trip member. The "extra transfer mechanism B" further comprises a bell crank actuator lever 214b, a spring 218b acting on said lever, a link 208b, a detent 220b, a spring 222b, and a roller 224b all having substantially the same construction as in each regular transfer mechanism.

The trip member 226a of the transfer mechanism A is engaged by a wide tooth on the denominational wheel 198 of the accumulator train of highest order when said train is driven from "9" to "0" in a positive direction or from "0" to "9" in a negative direction to break the toggle of said transfer mechanism.

The transfer head 204a is connected by a link 446 with an arm 448 fixed to a rock shaft 450 mounted in bearings in the crossfooter frame. The arm 448 is attached to the end portion of the rock shaft 450 adjacent the transfer mechanism A, which shaft extends entirely across the crossfooter and adjacent the opposite end of the shaft is fixed an arm 452, the lower end of which is pivotally connected at 454 to the forward end of a control slide or bar 456, the rear end of which is formed with a slot 458 in which slidably engages a screw stud 460 threaded into the frame of the crossfooter to support said bar. The bar 456 is formed with a second slot 462 which receives a roll 464 mounted on the transfer head 204b below the pivot 206. The bar 456 and the transfer head 204b are normally located and held in positions such that the roll 464 is located centrally in the slot 462 as shown in Fig. 66. The slot 462 is considerably wider than the diameter of the roll 464 allowing the transfer head to rock to a predetermined position before the roll engages an end wall of the slot. The longitudinal position of the bar 456 is controlled from the transfer head 204a of the transfer mechanism A through the link 446, arm 448, rock shaft 450 and arm 452.

The movement of the rock shaft 450, under certain conditions, is limited by a latch mechanism comprising a sector plate 466 fixed to the rock shaft and a bell crank lever 468 pivoted at 470 on the frame of the crossfooter, one arm of which is formed with a laterally bent end 472 constituting a latch arranged to engage the edge of said sector plate.

The lever 468 is acted upon by a coiled spring 474 which tends constantly to swing the same downwardly and to maintain the latch portion 472 in engagement with the outer edge of the sector plate. The outer edge of said plate is formed with a central arcuate portion 476, with shoulders 478, and 480 at the opposite ends of said arcuate portion and with arcuate portions 482 outside the arcuate portion 476 and having slightly greater radii than the portion 476.

Normally the parts of the transfer mechanism A are located in positions such that the toggle formed by the head 204a and the link 208a is in a straightened condition and the latch portion 472 of lever 468 engages the central portion of the arcuate edge 476 of the sector plate 466 as shown in Fig. 66. When the transfer head 204a is rocked by the engagement of a wide tooth on the number wheel 198 of the accumulator train of the highest order, the rock shaft 450 and the sector plate 466 are turned in one direction or the other by the movement of said head and the breaking of the toggle is limited by the engagement of the latch 472 on the lever 468 with one of the shoulders 478—480 on the sector plate 466 (see Figs. 67 and 68) which limits the rocking of sector plate 466, rock shaft 450 and arm 448 and thereby, through the link 446, limiting the rocking of the transfer head.

The lever 468 is actuated to lift the latch 472 and release the sector plate 466 by mechanism comprising a link 482c pivotally connected at its lower end as at 484 with an arm on the lever 468 and a bell crank lever 486—486c (Figs. 1 and 66) pivoted at 488 on the crossfooter frame and having an arm 486 arranged to engage in a slot 490 in the link 482c. The bell crank lever 486—486c is formed with a second arm 486c arranged to be engaged by the master wheel carriage 469 as said carriage is moved to carry the master wheel into sub-units position. The movement of the bell crank lever 486—486c thus imparted by the master wheel carriage at this time lifts the link 482c and the lever 468 to release the segment plate 466. Upon the release of the segment plate, the toggle of the A transfer mechanism is completely broken by the action of the spring 218a.

The above described mechanism has the following mode of operation, starting with the parts in the normal positions, as shown in Fig. 66.

When the accumulator train of highest order is turned from a positive condition in a negative direction from "0" to "9," the transfer head 204a is rocked by the engagement of a wide tooth on the denominational wheel 198 of the accumulator train of the highest order, substantially into the position shown in Fig. 68. During this movement of the transfer head, the rock shaft 450 and the sector plate 466 are rocked in a clockwise direction, Fig. 68, until the movement of the sector plate is limited by the engagement of the shoulder 478 on said plate with the latch 472 on the lever 468. The engagement of the latch with this shoulder limits the breaking movement of the toggle formed by the head 204a and the link 208a. The turning movement of the rock shaft 450 moves the bar 456 forwardly until the rear face of the slot 462 is substantially in engagement with the roll 464 on the transfer head 204b which has remained in the position shown in Figs. 66 and 67. The parts remain in this condition during the passage of the master wheel along the accumulator trains of the several denominations of the crossfooter until said wheel passes from the train of lowest order to a position below said train. As the master wheel moves from the train of lowest order to a position below said train, the bell crank lever 486, 486c is actuated by the master wheel carriage to lift the lever 468 and thereby release the sector plate 466. Upon the release of the sector plate, the spring 218a completes the breaking of the toggle 204a—208a and during this final breaking movement of the toggle, the rock shaft 450 is turned farther in a clockwise direction and the bar 456 is moved farther forwardly thereby, through the engagement of the rear face of the slot 462 with the roll 464, rocking the transfer head 204b of the transfer mechanism B and breaking the toggle formed by said head and the link 208b. Upon the breaking of said toggle the spring 218b brings the parts of the transfer mechanism B finally to the positions shown in Fig. 69. During this movement of the transfer mechanism B, the left-hand dog 228b engages a tooth of the number wheel 198 of the accumulator train of lowest order and turns said wheel a distance of one unit in a negative direction. The action of the transfer restoring mechanism resets, in normal position, the parts of the transfer mechanisms A and B and also the sector plate 466 and the control bar or slide 456. As the master wheel carriage is returned to its normal left-hand position, the bell crank lever 486—486c is released by the master wheel carriage and the spring 474 depresses the lever 468 to engage the latch portion 472 of said lever with the arcuate edge 476 of the sector plate.

In turning the accumulator train of highest order from a negative condition in a positive direction from "9" to "0," the "fugitive one mechanism" shown in Figs. 66 to 69, inclusive, has a mode of operation similar to that described above. In this case, the transfer head 204a of the transfer mechanism A is rocked in the opposite direction by the engagement of a wide tooth on the denominational wheel 198 of the accumulator train of highest order with the trip finger 226a and the toggle of said transfer mechanism is broken in the opposite direction. The rocking of the transfer head 204a turns the rock shaft 450 and the sector plate 466 in a counterclockwise direction, Figs. 66 to 69, inclusive, and the breaking movement of the toggle is arrested by the engagement of the shoulder 480 on said sector plate with the latch portion 472 of lever 468. The counterclockwise movement of the rock shaft 450 moves the control bar 456 rearwardly until the rear face of the slot 462 is substantially engaged with the roll 464. The toggle of the transfer mechanism B, however, remains in an unbroken condition until after the completion of the entering of numbers in the crossfooter. Upon the passage of the master wheel from the accumulator train of lowest order of the crossfooter to a position below said train, the bell crank lever 486—486c is actuated by the master wheel carriage to lift the lever 468 and thereby releases the sector plate 466. When the sector plate is released, the toggle of the transfer mechanism A is completely broken by the action of the spring 218a, the transfer head 204b is rocked in a counterclockwise direction by the further rearward movement of the bar 456 and the toggle of the transfer mechanism B is initially broken in a direction opposite to that in which it was broken in the operation previously described. The latter toggle is then completely broken by the action of the spring 218b. During this movement of the toggle, the right-hand carrying and locking dog 228b, Figs. 66 to 69, inclusive, engages a tooth of the denominational wheel 198 of units order and turns said wheel in a positive direction on a distance of one unit.

*Mechanism for controlling printing of "0's," "9's," and characters such as stars in printing a total*

(See Figs. 15, 16, 19, 20, 21, 28 to 33, inclusive, 35, 38 and 39)

In addition to the code bars 28, the machine is provided with a longitudinally movable bar 492 mounted substantially parallel with the code bars. This bar also is engaged by the lower edges of the forwardly projecting arms 106 on certain of the selector levers 96 and its upper edge is formed with elevations and depressions similar to those on the bars 28 to control the selector levers engaged thereby. The formation of the upper edge of the bar 492 and its relation to the selector levers 96 engaged thereby are clearly shown in Figs. 15, 16, 19, 20, and 28 to 33, inclusive. The bar 492 is formed with elevations and depressions for controlling the two right-hand selector levers 96 which control the type-bar mechanisms respectively for printing the number "0" and the star signal. The positions of these levers are indicated in Fig. 16.

The bar 492 is mounted to slide laterally of the machine in slots in the studs 110 and its left-hand end, Fig. 15, is yieldingly held in elevated position by a coiled spring 494 connecting the same with one of the arms 108a on the stationary plate 110a attached by screws 112a to the frame of the type carriage.

The right-hand end of the bar 492 is supported on the upwardly extending arm of a bell crank lever 16a, pivoted on one of the screw studs 26c. The bar 492 has elevations and depressions engaged respectively by the forwardly extending arms 106 of the selector levers 96 respectively for the type-bar mechanisms for the numerals "9" and "0" and for the star signal. The selector lever 96 for the star signal type-bar mechanism is the lever at the extreme right of the series of selector lever in the present construction, and the levers 96 for the "0" is the next lever toward the left from the star signal selector lever in said series.

The selector lever control bar 492 is normally located in its right-hand position shown in Figs. 15, 16, 19, 28, 29 and 31. The bar is yieldingly held either in this position or in its left-hand position shown in Figs. 20, 30, 32 and 33 by means of a pin 504 fixed to and projecting forwardly from the frame of the type carriage and arranged to engage in a recess 506 between two uprights 508 formed in the control bar 492. The bar 492 at the base of the recess 506 is formed with an inverted V-shaped edge 508a for engagement with the pin 504, this edge being held in engagement with the pin by the spring 494.

When the bar 492 is moved from its right-hand position toward the left or from its left-hand position toward the right sufficiently far to carry the apex of the V-shaped edge 508a beyond the pin 504, the coaction of said edge with the pin will cause the bar to move respectively to its limiting left-hand or right-hand position in which the pin is engaged respectively with the left or the right-hand upright 508 as shown in Figs. 19 and 20.

With the selector levers in normal or positive total positions as shown in Fig. 15 and the control bar 492 in its normal right-hand position as shown in Figs. 29 and 31, when a value wheel in the crossfooter showing a "0" is analyzed by the feelers, the "0" selector lever is held in elevated or inactive position by a projection on the upper edge of the bar 492, thereby preventing the printing of a "0" although all the code bars 28 are in positions for zero printing. It will be seen, however, from Fig. 16, that recesses respectively in the upper edges of all the code bars 28 and in the upper edge of control bar 492 are in opposed or aligned relation to the lower edge of the arm 106 on the selector lever for the star signal so that a star will be printed.

With the selector levers in positive total-taking positions and the control bar 492 in its left-hand position as shown in Figs. 30 and 32, when a value wheel in the cross-footer showing a "0" is analyzed, the star signal selector lever will be held from being depressed into operative position by an elevated portion on bar 492. In this position of the parts, however, recesses in the code bars 28 and a recess in the control bar 492 will be in opposed relation to the lower edge of arm 106 on the selector lever for the "0" type-bar mechanism so that a "0" will be printed.

With the selector levers 96 in negative total or credit balance positions and the control bar 492 in its right-hand position as shown in Fig. 28, when a value wheel in the crossfooter showing a "9" is sensed by the feelers, the "0" (complement of "9") selector lever is blocked out of operation by a projection on the bar 492. In this case, recesses in all the code bars 28 and in the control bar 492 will be located in opposed relation to the lower edge of the arm 106 on selector lever 96 for the star signal type-bar mechanism so that said mechanism will be rendered operative to print a star signal.

When the selector levers are in negative total positions and the control bar 492 is in its left-hand position as shown in Fig. 33, and a value wheel in the crossfooter showing a "9" is analyzed by the feeler mechanism, the star signal selector lever is blocked out of operation by a projection on the control bar 492. In this case, a series of recesses on the code bars 28 and a recess on control bar 492 lie in opposed relation to the lower edge of the arm 106 on selector lever 96 for the "0" type mechanism so that said mechanism will be actuated to print a "0."

With the parts in the positions shown respectively in Figs. 28 and 33, when a value wheel on the crossfooter showing a "0" is analyzed, a complemental "9" will be printed in a manner which will be readily understood from the above explanation.

With the parts in position for taking a positive or debit balance as shown in Figs. 31 and 32, when a value wheel in the crossfooter showing a "0" is analyzed, the control bar 492 is maintained in its right-hand position. When any number from "1" to "8," inclusive, is analyzed in the crossfooter, the bar 492 is moved to its left-hand position by the movement of any one of the three bars 22 back of the forward bar 22. Each of these three bars is formed with an extension 510 arranged to engage a contact plate 512 formed on the bar 492 and extending forwardly therefrom beneath the code bars 28. The forward bar 22 is not provided with such an extension. In order that that control bar 492 may be moved to its left-hand position when a "9" in the crossfooter is analyzed by the feelers, a lever or slide 514 (Figs. 15, 17, 18, 29 and 30) is mounted to slide longitudinally on the lever 266 by means of guide studs 516 secured in the lever 266 and engaging in slots 518 formed on the lever 514. Thus the slide 514 is mounted to pivot with the lever 266 and to slide independently of said lever laterally of the machine. The slide 514 is formed with a portion 520 extending upwardly from the body of the slide and provided with a rearwardly bent portion 522 forming an interponent normally located between the left-hand end of the forward bar 22 and the contact plate 512 on the control bar 492 as shown in Fig. 29.

When the lever 266 is in normal position for the printing of a positive total, the slide 514 is located so that the interponent 522 is located between the left-hand end of the forward bar 22 and the contact plate 512 (see Fig. 38). With the parts in this condition, upon the analysis of a value wheel in the crossfooter showing a "9," the interponent 522 will be engaged by the bar 22 and moved to the left with said bar and, through the contact of the interponent with contact plate 512, the bar 492 will be moved to its left-hand position.

When the parts of the machine are located in positions for taking a negative or credit balance, the swinging movement of the lever 266 in a clockwise direction and of the slide 514 therewith depresses the interponent 522 below the left-hand end of the forward bar 22 so that the interponent will not be engaged by bar 22 as a "9" in the crossfooter is analyzed (see Fig. 39). Under these conditions the bar 492 will not be moved to its left-hand position.

Means is also provided, in the present machine, which will operate, when the parts are in credit balance positions as shown in Fig. 28, and a value wheel in the crossfooter showing a "0" is analyzed, thereby causing the printing of a "9," the bar 492 will be moved into its left-hand position. Then when a value wheel in the crossfooter showing a "9," following the said value wheel showing a "0," is analyzed, a projection on the bar 492 will block the star selector lever and the "0" selector lever will be rendered operative to cause the printing of a "0."

The mechanism for moving the control bar 492 into its left-hand position under these conditions comprises a bell crank lever 524—524a (Figs. 30, 36, and 37) pivoted at 526 on the frame of the type carriage and having an arm 524a arranged to engage a projection 528 extending upwardly from the body of the slide 514. The other arm 524 of the bell crank lever is arranged to be engaged by the upwardly extending arm 102 on the "9" key lever as said lever is actuated by the corresponding selector lever to render operative the "9" type-bar mechanism. The engagement of said arm of the "9" key lever with the bell crank will swing the bell crank from the position shown in Fig. 36 to the position shown in Fig. 37 and, through the engagement of the forwardly extending arm of the bell crank with the projection 528, the movement of the bell crank will shift the slide 514 to the left and the slide will move the bar 492 to its left-hand position.

The bar 492, after having been moved into its left-hand position, is moved back to its normal right-hand position after the completion of the printing of a total by mechanism actuated and controlled by the transfer resetting mechanism. To this end the bell crank lever 16a which supports the right-hand end of the bar 492 carries a pin 530, Figs. 21 and 35, fixed in the horizontally extending arm thereof and this pin is engaged by a contact plate 532 fixed to the upper end of and preferably formed integral with a vertically movable slide 534 mounted on studs 536 fixed to the frame of the type carriage and engaging in slots 538 formed in the slide. The slide is formed as shown in Fig. 35 and, at its lower end, is provided with an arm 540 which is arranged to be engaged by a roller 542 carried by the pin 332 fixed to the arm 334 as said arm approaches the end of its upward movement. By the upward movement of the slide 534 imparted thereto by the arm 334, the bell crank lever 16a is actuated to move the bar 492 back to the right to its normal position.

When the slide 514 is in its normal position, the projection 528 is located below the bell crank lever 524—524a and is not engaged by said lever upon the actuation of the "9" key lever.

In order to move the lever or slide 514 back to the right to its normal position after each analyzing cycle of the feeler mechanism if said slide has been displaced to the left, a bar 544a is attached by screws 546a to the forward code bar 28 and the right-hand end of said bar 544a is arranged to engage the interponent 522 on the slide 514 as shown in Fig. 15. With this construction, as the forward code bar 28 is moved to the right at the end of each analyzing cycle, if the slide 514 has been displaced to the left, the bar 544a engages the interponent 522 and moves the slide to the right with said code bar. To enable the bar 544a to be adjusted longitudinally of the forward code bar, said bar 544a is formed with slots 548a in which the screws 546a engage.

The action of the control bar 492 and the mechanism for positioning said bar to control certain of the type bar mechanism in printing totals will now be explained, referring to certain totals that are to be printed. Before the taking of a total, the control bar always occupies its normal right-hand position as shown in Figures 15, 16, 29, and 31. In certain instances, the control bar is moved to its left-hand position shown in Figures 30 and 32 during a total-taking operation and the control bar then remains in its left-hand position until the completion of the taking of the total.

*Printing positive totals*

Assume that the positive total 003528 34 appears in the numeral indicating wheels of the crossfooter. Upon analyzing the code discs 12 of the digital representing wheels showing the first two "0's" of this total, the "0" selector lever is blocked out in each case by a projection on the control bar 492 which is then in its right-hand position (see Figures 15 and 16, 29 and 31). The control bar and the code bars, however, allow the star selector lever to be depressed into operating position so that stars are printed. The code disc 12 of the digital representing wheels showing the remaining digits of the total are analyzed by the feeler mechanism, the type bar mechanisms corresponding to these digits are selected and the digits are printed in the manner fully set forth in the preceding description. Therefore, the total when printed will read **3528 34.

Assume that the crossfooter contains a positive total of 042075 81 showing on the indicating wheels. Upon analyzing the code disc 12 of the wheel showing a "0" at the left of the first significant figure of the total, a star is printed for the reason given in the first example. Upon the analysis of the code disc of the digital representing wheel showing a "4" digit following the "0," the control bar 492 is moved to its left-hand position shown in Fig. 32 by the engagement of a projection on one of the bars 22 connected with a code bar with the contact plate 512 on the control bar. The digital wheels showing the digits "4" and "2" of the total are analyzed and the digits are printed in the regular manner described above. Upon analyzing the digital wheel showing a "0" following the "2" digit, a significant figure, the star selector lever is blocked out by a projetcion on the control bar 492. The control bar and the several code bars, however, are then located in positions to release a selector lever corresponding to the "0" type bar mechanism as shown in Fig. 32 and a "0" will therefore be printed. The digital wheels showing respectively the remaining digits of the total are analyzed, the corresponding type bar mechanisms are selected, and the digits are printed by said mechanisms in the regular manner as above described. Thus, the total will be printed *42075 81.

Assume that a positive total 906432 85 is showing upon the value or indicator wheels of the totalizer mechanism of the crossfooter. Upon analyzing the digital wheel showing the first digit "9" of the total, the forward code bar 28 is shifted to the left from its normal position. The code bars and control bar 492 are then located in positions to block the star and "0" selector levers from depression into operating position and to allow the "9" selector lever to be depressed. The "9" type bar mechanism will therefore be selected and a "9" digit will be printed. By the movement of the forward bar 22 to the left upon the analyzis of the digital wheel of the totalizer showing the "9," the lever 514 is moved longitudinally to the left by the engagement of the forward bar 22 with the rearwardly bent portion 522 on said lever which is then located in its upper position between said bar and the contact plate 572 as shown in Fig. 38. During this longitudinal movement of said lever, the control bar 492 is moved to its left-hand position shown in Fig. 32 by the engagement of the portion 522 with the contact plate 512. When the digital wheel showing the "0" is analyzed, the code bars and the control bar 492 are in positions to allow the "0" selector lever to be depressed to select the "0" type bar mechanism as shown in Figure 32 and a "0" will therefore be printed.

The digital wheels showing respectively the remaining digits of the total will be analyzed by the feeler mechanism and the digits will be printed by the type bar mechanisms under control of the feeler mechanism in the regular manner. The total, as printed, will read as above, 906432 85.

Printing true negative totals

Figure 28 shows the control bar 492, the code bars and the selector levers in the relative positions assumed by the same for the taking of complements. The code bars, in this figure, occupy the positions assumed by the same before the action of the feeler mechanism in analyzing a total. Figure 16 also indicates these relative positions of the bar 492, the code bars and the selector levers.

Assume that the negative quantity 994167 25 is showing upon the indicator wheels of the totalizer of the crossfooter. This negative quantity may be termed, for convenience, a complementary total since it consists of the complement of the true negative or algebraic total. The control bar 492 is located in its right-hand position and upon analyzing the digital representing wheels showing each of the first two "9's" of the total, the "0" selector lever, which normally would be depressed into operative position, is blocked against depression by a projection on the control bar 492. The control bar and the several code bars, however, are located so as to allow the star selector lever to be depressed into operative position as shown in Fig. 28 and a star will be printed for each of these "9's". This will be clear from a consideration of Figure 16. In analyzing a "9," the forward bar 28 is shifted to the left from the position shown in this figure. Upon analyzing the code disc of the digital representing wheel showing the digit "4" of the total, the control bar and the code bars will be located to allow the "5" selector lever to be depressed into operative position as shown in Fig. 26 and a "5" will be printed. Then upon analyzing the digital wheel showing the digit "1" in the next lower denomination, the control bar and the code bars will be located to allow the "8" selector lever to be depressed into operative position as shown in Fig. 27 and an "8" will be printed by the corresponding type bar mechanism. The remaining digital wheels showing the several digits of the complementary total appearing in the crossfooter will be analyzed and the digits constituting the complements of the first digits respectively will be printed in the same manner. The true negative total printed upon the work sheet will be **5832 74.

Assume that the complementary total 923945 61 is showing on the indicating wheels of the totalizer of the crossfooter. In analyzing the code disc 12 of the first digital representing wheel showing the first "9" which lies to the left of the first significant figure, the code bars and bar 492 are positioned to allow the star selector lever to be depressed into operative position and a star is printed as in the last example given above. The digital wheels showing the next two digits of the complementary total are analyzed, the type bar mechanisms for the digits respectively constituting the complements of said first digits are selected by the selector mechanism and the complements are printed upon the worksheet in the regular way. Upon analyzing the digital wheel showing the digit "2," the control bar 492 is moved to its left-hand position shown in Fig. 33 by the engagement of the extension on the corresponding code bar 22 with the contact plate 512 on the control bar. Therefore, upon analyzing the digital wheel showing the next "9" digit of the complementary total, which follows a significant figure, the star selector lever is blocked out of operative position by a projection on the control bar 492. The said control bar and the several code bars, however, are then positioned so that the "0" selector lever is depressed into operating position and a "0" is printed. This will be clear from Figure 33, assuming that the forward bar 28 is shifted to the left from the position shown in this figure upon the analysis of the "9" in the complementary total. The digital wheels showing respectively the remaining digits of the complementary total are analyzed, the type bar mechanisms are selected and the digits are printed in the regular way. The total, when printed, will read *76054 38.

Assume that the complementary total 932095 34 appears on the indicating wheels of the totalizer of the crossfooter. In analyzing the digital wheel showing the first "9" of this total which occurs before a significant figure, a star type lever is selected and a star is printed as in the last two previous examples. The digital wheels showing the next two digits of the complementary total are analyzed, the type bar mechanisms corresponding respectively to the complements of these digits are selected and the complements are printed in the regular way. When the digital wheel showing the first digit "3" is analyzed, the control bar 492 is moved to its left-hand position shown in Fig. 33 by the engagement of an extension on one of the bars 22 with the contact plate 152. Then when the digital wheel showing the "0" in the complementary total is analyzed, the bar 492 and the code bars are positioned to select the "9" type bar mechanism as shown in Fig. 33 and a "9" is printed upon the worksheet. The digital wheels showing the remaining digits of the complementary total appearing in the crossfooter are analyzed, the type bar mechanisms corresponding to the complements of said digits are selected, and the complements are printed in the regular way. The total printed will read *67904 65.

When the parts are shifted to credit balance taking positions upon the depression of the total key, the rearwardly bent portion 522 on the lever 514 is depressed by the pivotal movement of said lever, below the adjacent end of the forward bar 22 connected with the forward code bar 28. Therefore, when a digital wheel showing a "9" in the crossfooter is analyzed and the forward bar 22 and the forward code bar 28 are shifted to the left, the bar 492 is not shifted into its left-hand position by the forward bar 22.

Assume that the complementary total 999990 99 appears in the indicating wheels of the totalizer of the crossfooter. Upon the analysis of the digital wheels showing the first five "9's", the bar 492 and the code bars are positioned in each instance to allow the star selector lever to be depressed into operating position (the bar 492 then being located in its normal right-hand position), the star type bar mechanism is selected and a series of stars are printed, one for each of these "9's". In analyzing the number wheel showing the "0" in the crossfooter, the code bars and the bar 492 are set for the printing of a "9," the bar 492 then being in its right-hand position, and a "9" is printed. Upon the printing of the "9," however, the "9" key lever operates the bell crank lever 524—524a to move the control bar 492 to its left-hand position as shown in Figs. 36 and 37. Then upon analyzing the digital wheels showing respectively the next two "9's" in the total in the cross-footer, the bar 492 and the code bars 28 are positioned to allow the "0" selector lever to be depressed into operative position, the "0" type bar mechanism is selected and "0's" are printed by said mechanism. This will be clear from Fig. 33. The total as printed upon the worksheet is *****9 00.

The present machine is provided with mechanism by which, when a credit balance or negative total is taken, the total will be printed in distinctive type different from that employed in printing a positive total. Each of the type heads carried by the respective numeral type levers is provided with two different kinds of type and, when the total key is depressed to print a credit balance total, a case-shifting mechanism is rendered operative to shift case from the type used in printing a positive total to type of a different character.

Each of the type heads 544, mounted on the numeral type levers 19, is pivoted at 546 on the lever and carries two types 548 and 550 located thereon substantially as shown in Figure 3. The case-shift mechanism comprises a trip ring and mechanism for shiftably supporting and controlling the ring having substantially the same construction, arrangement, and mode of operation as the corresponding mechanism illustrated and described in the Patent No. 2,334,464 to Elmer L. Wise dated November 16, 1943. The type head 544 is normally held in position on said type lever 19 so that the type 550 is located in position to engage the worksheet. This type is of the ordinary character and is used in printing positive totals. The type head is held in normal position on the type lever by means of a leaf spring 552.

When the total key is depressed to cause the printing of a credit balance total, the type head 544 is adjusted in a clockwise direction above the axis 546 to bring the type 548 into position for printing. This type is of a distinctive character.

The mechanism for thus shifting the type head comprises a trigger or lever 554 pivoted on said head and a trip ring 556 arranged to be engaged by the outer end or tail on said lever during the downward or type impression stroke of the numeral type bar. The type head retaining spring 552, and lever 554 have substantially the same construction as the corresponding parts illustrated and described in the patent to Foothorap No. 1,119,149 dated December 1, 1914. The trip ring 556 is pivotally supported at 558 on the spaced arms 560 fixed to a rock shaft 562 mounted to turn in suitable bearings on the frame of the type head of the machine. The trip ring is provided with upwardly extending arms 562a connected with the forward ends of the arms 560 by pin and slot connections which limit the swinging movement of the trip ring with relation to the arms 560. The forward portion of the trip ring normally engages a stop plate 564 formed by a part of the casing of the type head of the machine. During the downward movement of the arms 560 the forward portion of the trip ring engages a stop plate 566 formed on a bracket attached to said casing and this causes the trip ring to swing in a clockwise direction about the pivots 558 to depress the rear portion of the ring into position to be engaged by the tail of lever 554 on the type head. When the arms 92 swing back upwardly to normal position, the forward portion of the trip ring engages the stop plate 564 and this swings the trip ring back in a counterclockwise direction about the pivots 558 to raise the rear portion of the ring out of the path of the tail of the lever 554. The rock shaft 562 is acted upon by a coil spring 568 connected to an arm 570 fixed to the rock shaft which normally holds the arms 560 and the trip ring in elevated position.

As stated in the previous description, when the register of the crossfooter is in a negative condition and the total key is depressed, the lever 274 is swung in a clockwise direction, Fig. 64, about its pivot 276. A connection is provided between the rock shaft 562 and said lever by which the rock shaft is then swung in a counterclockwise direction, Figs. 3 and 64. To this end, an arm 570 (see Figure 64) is fixed to the rock shaft 562 and the forward end of said arm is arranged to be engaged by a projection 572 extending rearwardly from the lever 274.

With this construction, as the lever 274 is swung in a clockwise direction, Fig. 64, upon the depression of the total key, the projection 572 of said lever swings the arm 570 downwardly thereby depressing the trip ring into operating position. Upon the restoration of the lever 274 to normal position after the completion of a total-taking operation, the trip ring is restored to normal position by the restoring spring 568.

The printing of a total when the key of the subtraction lever 573a (see Fig. 3a) is depressed will result in a misoperation. The machine is therefore provided with mechanism for locking the total key from depression when the subtraction key is depressed. This mechanism comprises a locking lever 574 (see Figs. 64 and 65) pivoted at 576 on the frame of the type carriage and having a forwardly projecting arm 578 which rests on the upper side of the arm 570 attached to the rock shaft 562. The locking lever 574 is acted upon by a coil spring 578a which tends to swing the lever in a counterclockwise direction about its axis. The lever 574 is formed with an upwardly extending locking projection 580 arranged to be engaged by a stud 582 fixed to and extending laterally from the total key lever 172. The arm 578 on the locking lever 574 is normally supported in a position such that the locking projection 580 on said lever is located to the rear of the stud 582, as shown in dotted lines in Figure 65. With said projection located in this position, the locking lever does not interfere with the depression of the total lever. When the key of the subtraction lever 573a is depressed, the rock shaft 562 is swung in a counterclockwise direction, Figure 3, by means of a roll 584 mounted on the subtract lever 573a and arranged to engage a cam face 586 on an arm 588 secured to said rock shaft, all as shown and described in said Patent No. 2,334,464 referred to above. The turning of the rock shaft causes the depression of the arm 578 on the locking lever 574 and the movement of said lever then brings the locking projection 580 into a position beneath the stud 582 on the total key lever, as shown in full lines in Figure 65, thereby locking the latter lever from depression.

The depression of the total key to initiate the taking of a total when the master wheel of the crossfooter is located in any denomination below the highest denomination of the crossfooter, may result in a misoperation. The present machine is therefore provided with mechanism for locking the total key at all times except when the master wheel of the crossfooter is located in the highest denomination thereof.

This locking mechanism (see Figs. 59, 70, 71 and 72) comprises a slide 590 mounted to slide longitudinally in suitable guides formed in the spaced frame plates 377 of the right-hand crossfooter. This slide is acted upon by a coil spring 596 which tends to move the same to the right, Figs. 70 to 73, inclusive, and the movement of the slide under the influence of the spring is limited by the engagement of a pin 598 carried by the slide with the right-hand frame plate 377. The lower edge of the slide 590 normally lies above the rearwardly projecting portion or tail 600a formed on the total lever 172 so as to lock the lever against depression. The slide, however, is formed with a slot 602 arranged to receive the tail 600a on the lever when the master wheel of the crossfooter is in the highest denomination of the crossfooter.

The longitudinal position of the locking slide 590 is controlled from the arm 475 on the rock shaft 473 which moves with the master wheel carriage. To this end the locking slide is formed with a projection 604 arranged to be engaged by said arm 475 as shown in Figures 59 and 70.

The position of the projection 604 on the locking slide is such that, when the master wheel carriage is in position to locate the master wheel out of operative position above the highest denomination of the crossfooter, the slide will be located substantially in the position shown in Figs. 59 and 70. In this position of the slide, the lower edge thereof is located above the tail 600a of the total lever and the lever will be locked from depression. As the master wheel carriage moves into position to locate the master wheel in the highest denomination of the crossfooter, the movement of the arm 475 allows the locking slide 590 to move under the influence of the spring 596 to the position shown in Figure 71, in which the slot 602 is opposite the tail 600a on the total lever in position to receive said tail. With the locking slide in this position, the total lever is unlocked and may be freely depressed. As the master wheel carriage moves to the next denomination below the highest denomination of the crossfooter, the locking slide 590 is moved to the right, Figs. 70 to 72, inclusive, by the spring 596 substantially into the position shown in Figure 72. When the locking slide is in this position its lower edge lies above the tail 600a on the locking lever and the locking lever is locked against depression. The pin 598 is located in the locking slide to engage the right-hand frame plate 377 when the slide reaches the position shown in Fig. 72 and prevents further movement of the slide to the right under the influence of the spring 596. The locking slide continues in the position shown in Figure 72, to lock the total lever from depression, throughout the movement of the master wheel carriage through the different denominations of the crossfooter below the highest denomination. The total lever is therefore locked against depression at all times except when the master wheel carriage is located to position the master wheel in the highest denomination of the crossfooter.

The machine is provided with means for controlling the locking slide 590 to lock the total lever at all times when the state control lever 315 is adjusted to condition the machine for writing. The mechanism for thus controlling the locking slide comprises a locking bail 606 bent substantially in the form shown in Figure 59.

This bail is provided with a pivot portion 608 pivotally attached by plates 610 to the frame of the type head and is formed with an arm 612 extending at substantially right angles to the pivot portion and arranged to be located opposite the left-hand end of the locking slide 590, Figure 59, to hold the said slide from leftward movement. The bail is further provided with an arm 614 located substantially parallel with the arm 606 and an extension 616 substantially parallel with the pivot portion of the bail and arranged to be engaged by the rear side of the decimal trip lever 335. The right-hand attaching plate 610 is formed with stops 618 and 620 arranged to be engaged by the arm 612 to limit respectively the forward and rearward movement of the arm.

The lever 315 controls the axial position of the rock shaft 337 and of the decimal trip lever 335 as well as the angular position of the rock shaft 259. The lever 315 is shown in full lines in Figure 5 in the position in which it is adjusted to condition the machine for the actuation of the totalizer mechanism and for the operation of the decimal space mechanism when the type carriage is in a register zone. This figure also shows, in dotted lines, two other positions of the lever 315 indicated respectively at A and B, the full line position of the lever being indicated at C. With the lever 315 adjusted in the position A, the rock shaft 259 is positioned to locate the interposer 253 in a position such that the actuator mechanism for the totalizers of a register will not be thrown into operation and the decimal trip lever 335 is located axially out of position to engage the cam 351 when the carriage is in the zone of a register. The position A is the position in which the lever 315 is adjusted for writing only. With the lever 315 in the position B, the machine is conditioned for the typing of totals by manual actuation of the key levers without computing when the carriage is in the zone of a register. When the lever is shifted from the position A to the position B, the lever 303 is actuated to allow the decimal trip lever 335 to be moved rearwardly to operative position by the action of the spring 367 but the lever 295 remains stationary, the pin and slot connection between the lever 295 and the lever 303 allowing this movement of the latter lever independently of the lever 295. With the lever 305 in the position C shown in Figure 5, the machine is conditioned for the actuation of the totalizer mechanism of a register when the carriage is in a register zone as stated above. Upon the shifting of the lever 315 from the position B to the position C, the lever 295 is actuated to turn the rock shaft 259 to locate the interposer 253 in the position shown in Figure 6 so that the actuating mechanism for the totalizer will be thrown into operation upon the depression of a numeral key when the type carriage is in the zone of a register. During this shift of the lever 315, the link 361 and the connections between the same and the decimal trip lever remain stationary, the relative movement between the lever 303 and the link being permitted by the lost motion connection between these two parts.

The reverse operations take place upon shifting the lever 315 from the position C to the position B and from the position B to the position A shown in Figure 5 as will be readily understood by those skilled in the art.

The decimal space mechanism and the mechanism for enabling and disabling the differential actuator mechanism above described have substantially the same construction, arrangement, and mode of operation as the corresponding mechanisms illustrated and described in applicant's copending application Serial No. 281,772, referred to above.

When a credit balance total is taken from the crossfooter, the indicator wheels of the crossfooter will all show "9's." If, in the next operation, a number is entered positively or is added in the crossfooter, the "fugitive one" mechanism inserts an additional one in a positive direction at the end of the operation to correct the total. If, in the next operation, a number is entered negatively or subtracted in the crossfooter, a proper negative or complementary total is set up in the number wheels.

In the present machine, a subtotal may be automatically printed at any time if desired. To print a subtotal, the state control lever 315 is set in "total" position indicated at B and the type head or carriage is positioned to locate the master wheel 169 in the highest denomination of any one of the registers. With the parts thus adjusted, the total key 172 is depressed to set in operation the total sensing and printing mechanisms and the total in the crossfooter will be printed and, at the same time, the several trains of the totalizer of the crossfooter will not be disturbed so that the total will be left in the indicating wheels after the total printing operation.

Having explained the nature and object of the invention and having specifically described a machine embodying the various features of the invention, in their preferred forms, what is claimed is:

1. A typewriting and accounting machine having, in combination, power means, a substantially flat platen, type-bar mechanisms for successively typing characters on a work sheet supported on the platen, a type carriage on which said type-bar mechanisms are mounted for movement across the platen, mechanism driven by the power means for actuating the type bars, a totalizer including a plurality of digital representing wheels, a differential actuator mechanism for the totalizer for successively rotating the digital representing wheels thereof to enter numbers, digit by digit, therein, in response to operations of said type bar mechanisms, a feeler mechanism comprising a plurality of sensing members less in number than the number of discrete digital positions of said digital representing wheels, a control member connected to each of said sensing members, said sensing members being movable relatively to said totalizer and thereafter simultaneously engageable with the successively associated digital wheels of the totalizer, and means controlled jointly by all of said control members to select one of said type bar mechanisms and to engage the selected one of said type bar mechanisms with said mechanism driven by the power means to print a figure corresponding to the position of the sensed digit representing wheel.

2. A typewriting and accounting machine having, in combination, power means, a substantially flat platen, type-bar mechanisms for successively typing characters on a work sheet supported on the platen, a type carriage on which said type-bar mechanisms are mounted for movement across the platen, mechanism driven by the power means for actuating the type bars, a totalizer including a plurality of digital representing wheels, a differential actuator mechanism for the totalizer for successively rotating the digital wheels thereof to enter numbers, digit by digit, therein in response to operations of said type bar mechanisms, a feeler mechanism comprising a plurality of sensing members less in number than the number of discrete digital positions of said digital representing wheels, a control member connected to each of said sensing members, said sensing members being movable relatively to said totalizer and thereafter simultaneously engageable with the successively associated digital wheels of the totalizer, means controlled jointly by all of said control members to select one of said type-bar mechanisms and to engage the selected one of said type-bar mechanisms with said mechanism driven by the power means to print a figure corresponding to the position of the sensed digit representing wheel and manual means to render operative said feeler mechanism and said controlled means.

3. A typewriting and accounting machine having, in combination, power means, a substantially flat platen, type-bar mechanisms for successively typing characters on a work sheet supported on the platen, arranged to project the type into engagement with the work sheet at the end of a downstroke thereof, a type carriage on which said type-bar mechanisms are mounted for movement across the platen, mechanism driven by the power means for actuating the type bars, a totalizer including a plurality of digit representing wheels, a differential actuator mechanism for the totalizer for successively rotating the digital wheels thereof to enter numbers, digit by digit, therein in response to operations of said type bar mechanisms, a feeler mechanism comprising a plurality of sensing members simultaneously engageable with an associated digital representing wheel and movable relatively to said totalizer into seriatim association with said digital wheels for successively feeling the rotary positions of said wheels, said sensing members being less in number than the number of discrete digital positions of said digit representing wheels, a plurality of operating elements, one for each of a plurality of type-bar mechanisms, each operating element effective when released to engage an associated type-bar mechanism with said power driven mechanism and means controlled by said feeler mechanism to release one of said operating elements.

4. A typewriting and accounting machine having, in combination, power means, a platen, type-bar mechanisms for successively typing characters on a work sheet supported on the platen, means for connecting the type-bar mechanisms with the power means to actuate selectively the same, a totalizer, a frame on which said type-bar mechanisms, said connecting means and said totalizer are mounted, differential actuator mechanisms for the totalizer for entering numbers, digit by digit, therein, a feeler mechanism for successively feeling the rotary positions of the digital representing wheels of the totalizer comprising a carriage on said frame, feelers carried by said carriage, means for shifting the carriage to carry the feelers from one denomination to another of the totalizer, mechanism for moving the feelers away from the wheels before the shifting of the carriage and for moving the feelers toward the wheels after the carriage is shifted to the next denominational order of the totalizer, control members mounted on said frame and positionable by said feelers, and selector means on said frame controlled by said control members in accordance with the combinational position of all of said control members when positioned by said feelers to select and operate one of said type bar mechanism connecting means to thereby cause printing of a character corresponding to the position of said sensed digital representing wheel.

5. A typewriting and accounting machine having, in combination, power means, a platen, type-bar mechanisms normally disconnected from the power means for successively typing characters on a work sheet supported on a platen, means for selectively connecting the type bars with the power means, a totalizer, differential actuator mechanisms for the totalizer for entering numbers, digit by digit, therein, a frame on which said type-bar mechanisms, said selective connecting means, said totalizer and said differential actuator mechanisms are mounted, a master wheel driven respectively by said actuator mechanisms and arranged to drive the digital representing wheels of the totalizer, a carriage for said master wheel shiftable relatively to said totalizer and said frame to shift the master wheel from denomination to denomination of the totalizer, feeler mechanism for successively feeling the rotary positions of the digital representing wheels of the totalizer comprising feelers carried by said carriage, means for shifting said carriage to shift the master wheel and to carry the feelers from denomination to denomination of the totalizer, mechanism for moving the feelers away from each digital representing wheel before shifting the carriage and for moving said feelers toward the next digital representing wheel after the master wheel carriage is shifted to the next denominational order of the totalizer, control members mounted on said frame and positionable by said feelers, and selector means on said frame controlled by said control members in accordance with the combinational position of all of said control members when positioned by said feelers to select and operate one of said type bar mechanism connecting means to thereby cause printing of a character corresponding to the position of the sensed digital representing wheel.

6. A typewriting and accounting machine having, in combination, power means, a platen, type-bar mechanisms normally disconnected from the power means for successively typing characters on a work sheet supported on the platen, means for connecting the type bars selectively with the power means, a totalizer, differential actuator mechanisms for the totalizer for entering numbers, digit by digit, therein, a frame on which said type-bar mechanisms, said selective connecting means, said totalizer and said differential actuator mechanisms are mounted, a master wheel driven respectively by said actuators and arranged to drive the digital representing wheels of the totalizer, a master wheel carriage shiftable on said frame, means for shifting said carriage in each cycle of operations to shift the master wheel from denomination to denomination of the totalizer, feeler mechanism for successively feeling the rotary positions of the digital representing wheels of the totalizer, comprising feelers carried by said carriage and shifted from denomination to denomination of the totalizer by the movement of the carriage, mechanism controlled by the type-bar mechanisms for moving the feelers away from a digital representing wheel before the carriage is shifted in each cycle and for moving said feelers toward the next digital representing wheel after the master wheel carriage is shifted to the next denominational order of the totalizer, control members mounted on said frame and positionable by said feelers, and selector means on said frame controlled by said control members in accordance with the combinational position of all of said control members when positioned by said feelers to select and operate one of said type bar mechanism connecting means to thereby cause printing of a character corresponding to the position of the sensed digital representing wheel.

7. A typewriting and accounting machine having, in combination, power means, a platen, type-bar mechanisms for successively typing characters on a work sheet supported on the platen, a totalizer, differential actuator mechanisms for the totalizer for entering numbers, digit by digit, therein, a feeler mechanism for successively feeling the rotary positions of the digit representing wheels of the totalizer and means controlled by said feeler mechanism for successively rendering selectively the type-bar mechanisms operable by the power means to print the total entered in the totalizer comprising a series of longitudinally movable permutation bars, feelers connected respectively with said bars for shifting the bars in different combinations corresponding to the different rotary positions of the digit representing wheels, said bars and feelers being less in number than the number of discrete rotary positions of said digit representing wheels, and means controlled by the combined longitudinal positions of all of the bars for selectively connecting the type-bar mechanisms with the power means.

8. A typewriting and accounting machine having, in combination, power means, a platen, type-bar mechanisms for successively typing characters on a work sheet supported on the platen, a rotary toothed driver driven by said power means, pawls for engaging said driver, members on which said pawls are respectively mounted movable to shift the pawls into and out of operative connection with the toothed driver, connections respectively between said pawl-carrying members and said type-bar mechanisms for driving the type-bar mechanisms, a totalizer including digit representing wheels, mechanism for entering numbers, digit by digit, in the totalizer, mechanism for sensing the digit representing wheels of the totalizer, a series of longitudinally movable code bars controlled by said sensing mechanism and devices engaging said code bars for selectively actuating said members to engage the pawls carried thereby respectively with said rotary driver.

9. A typewriting and accounting machine having, in combination, power means, a platen, type-bar mechanisms for successively typing characters on a work sheet supported on the platen, a rotary toothed driver driven by said power means, pawls for engaging said driver, members on which said pawls are respectively mounted movable to shift the pawls into and out of operative connections with the toothed driver, connections respectively between said pawl-carrying members and said type-bar mechanisms for driving the type-bar mechanisms, a totalizer including digit representing wheels, mechanism for entering numbers, digit by digit, in the totalizer, mechanism for sensing the digit representing wheels of the totalizer, a series of longitudinally movable parallel code bars controlled by said sensing mechanism and having edges formed with projections and recesses, devices for selectively shifting said pawl-carrying members having portions engaging the edges of the code bars to control the positions of said devices, means for actuating said devices and mechanism between said devices and said members for actuating said members.

10. A typewriting and accounting machine having, in combination, power means, a platen, type-bar mechanisms for successively typing characters on a work sheet supported on the platen, a rotary toothed driver driven by said power means, pawls for engaging said driver, members on which said pawls are respectively mounted movable to shift the pawls into and out of operative connection with the toothed driver, connections respectively between said pawl-carrying members and said type-bar mechanisms for driving the type-bar mechanisms, a totalizer including digit representing wheels, mechanism for entering numbers, digit by digit, in the totalizer, mechanism for sensing the digit representing wheels of the totalizer, a series of longitudinally movable code bars controlled by said sensing mechanism, devices engaging the code bars for selectively actuating said pawl-carrying members to engage the pawls respectively with the rotary driver and negative total means for relatively shifting said devices and the code bars from normal position to a second position wherein for the same positions of the code bars a different code bar engaging device is controlled to actuate its associated pawl carrying member.

11. A typewriting and accounting machine having, in combination, power means, a platen, type-bar mechanisms for successively typing characters on a work sheet supported on the platen, a rotary toothed driver driven by said power means, pawls for engaging said driver, members on which said pawls are respectively mounted movable to shift the pawls into and out of operative connection with the toothed driver, connections respectively between said pawl-carrying members and said type-bar mechanisms for driving the type-bar mechanisms, a totalizer including digit representing wheels, mechanism for entering numbers, digit by digit, in the totalizer, mechanism for sensing the digit representing wheels of the totalizer, a series of longitudinally movable code bars controlled by said sensing mechanism, devices engaging the code bars for selectively actuating said pawl-carrying members to engage the pawls respectively with the rotary driver and means, manually operated for relatively shifting said devices and the code bars longitudinally of said bars from normal position to a second position wherein for the same positions of the code bars a different code bar engaging device is controlled to actuate its associated pawl carrying member.

12. A typewriting and accounting machine having, in combination, power means, a platen, type-bar mechanisms for successively typing characters on a work sheet supported on the platen, a rotary toothed driver driven by said power means, pawls for engaging said driver, members on which said pawls are respectively mounted, movable to shift the pawls into and out of operative connection with the toothed driver, connections respectively between said pawl-carrying members and said type-bar mechanisms for driving the type-bar mechanisms, a totalizer including digit representing wheels, mechanism for entering numbers, digit by digit, in the totalizer, mechanism for sensing the digit representing wheels of the totalizer, a series of longitudinally movable code bars controlled by said sensing mechanism, devices engaging the code bars for moving selectively said pawl-carrying members to engage the pawls respectively into engagement with the rotary driver, means automatically set for shifting said code bars and said devices relatively from normal to complementary positions when an amount is subtracted in the totalizer greater than the amount standing therein and mechanism for actuating the latter means to shift relatively said devices and the code bars to complementary positions preparatory to taking a total.

13. A typewriting and accounting machine having, in combination, power means, a platen, type-bar mechanisms for successively typing characters on a work sheet supported on the platen, a rotary toothed driver driven by said power means, pawls for engaging said driver, members on which said pawls are respectively mounted movable to shift the pawls into and out of operative connection with the toothed driver, connections respectively between said pawl-carrying members and said type-bar mechanisms for driving the type-bar mechanisms, a totalizer including digit representing wheels, mechanism for entering numbers, digit by digit, in the totalizer, mechanism for sensing the digit representing wheels of the totalizer, a series of longitudinally movable code bars controlled by said sensing mechanism, devices engaging the code bars for moving selectively said pawl-carrying members to engage the pawls respectively with the rotary driver, means automatically set for shifting said code bars and said devices relatively from normal to complementary positions when an amount is subtracted in the totalizer greater than the amount standing therein, a total key lever, and mechanism operated by said key lever to actuate the latter means to shift relatively said devices and the code bars to complementary positions.

14. A typewriting and accounting machine having, in combination, power means, a platen, type-bar mechanisms for successively typing characters on a work sheet supported on the platen, a rotary toothed driver driven by said power means, pawls for engaging said driver, members on which said pawls are respectively mounted movable to shift the pawls into and out of operative connection with the toothed driver, connections respectively between said pawl-carrying members and said type-bar mechanisms for driving the type-bar mechanisms, a totalizer including digit representing wheels, mechanism for entering numbers, digit by digit, in the totalizer, mechanism for sensing the digit representing wheels of the totalizer, a series of longitudinally movable code bars controlled by said sensing mechanism, devices engaging the code bars for actuating selectively said pawl-carrying members to engage the pawls respectively with the rotary driver, negative total means for relatively shifting said devices and the code bars from normal position to a second position wherein for the same positions of the code bars a different code bar engaging device is controlled to actuate its associated pawl carrying member and means for inserting a "fugitive one" in the totalizer.

15. A typewriting and accounting machine having, in combination, power means, a platen, type-bar mechanisms for successively typing characters on a work sheet supported on the platen, a rotary toothed driver driven by said power means, pawls for engaging said driver, members on which said pawls are respectively mounted movable to shift the pawls into and out of operative connection with the toothed driver, connections respectively between said pawl-carrying members and said type-bar mechanisms for driving the type-bar mechanisms, a totalizer including digit representing wheels, mechanism for entering numbers, digit by digit, in the totalizer, mechanism for sensing the digit representing wheels of the totalizer, a series of longitudinally movable code bars controlled by said sensing mechanism, devices engaging the code bars for causing the actuation of said pawl-carrying members selectively to engage the respective pawls with the rotary driver, means manually operated for relatively shifting said devices and the code bars longitudinally of said bars from normal position to a second position wherein for the same combinational position of the code bars, a different code bar engaging device is controlled to cause actuation of its associated pawl carrying member, automatically operated means to restore said code bars and devices to their normal relative position and means for inserting a "fugitive one" in the totalizer.

16. A typewriting and accounting machine having, in combination, power means, a platen, type-bar mechanisms for successively typing characters on a work sheet supported on the platen, means for selectively connecting the type bars with the power means to operate said bars, a totalizer including digital representing wheels, differential actuator mechanisms for the totalizer for entering numbers, digit by digit, therein, a feeler mechanism for successively feeling the rotary positions of the digital representing wheels of the totalizer, comprising a series of feelers, mechanism controlled from the type-bar mechanisms respectively for shifting the feelers toward and from the totalizer wheels in timed relation to the action of the type-bar mechanisms, selectors for selecting the type bars to be actuated by the power means, means comprising cams for causing the actuation of the selectors in timed relation to the operation of the feelers, a carriage upon which the feelers are mounted and means for shifting the carriage to shift the feelers from denomination to denomination of the totalizer in timed relation to the actuation of the type bars.

17. A typewriting and accounting machine having, in combination, power means, a platen, type-bar mechanisms for successively typing characters on a work sheet supported on the platen, devices for rendering the type bars selectively operable by said power means, a totalizer including digital representing wheels, means for entering numbers, digit by digit, in the totalizer, mechanism comprising a series of feelers for successively feeling the rotary positions of the digit representing wheels of the totalizer, selector mechanism controlled by the feelers for operating said devices to render the type-bar mechanisms operable selectively by the power means to print the total entered in the totalizer, means controlled by the type-bar mechanisms for shifting the feelers from one denomination to another of the totalizer wheels during each cycle, means comprising cams for moving the feelers toward and from a digital representing wheel during each cycle, mechanism comprising cams for operating the selecting devices during each cycle, a total key and means controlled from the key for controlling the actuation of said cams.

18. A typewriting and accounting machine having, in combination, power means, a platen, type-bar mechanisms for successively typing characters on a work sheet supported on the platen, devices for rendering the type bars operable selectively by the power means, a register including digital representing wheels, means for entering numbers, digit by digit, in the register, mechanism comprising a series of feelers for successively feeling the rotary positions of the digit representing wheels of the register, means including a set of rotary cycle cams for shifting the feelers toward and from the wheels, means including a set of rotary cycle cams for operating said devices selectively to cause the actuation of the type bars selectively by the power means, mechanism controlled from the type bars and rotary cycle cams engaging the latter mechanism for controlling the rotation of said first two sets of cycle cams.

19. A typewriting and accounting machine having, in combination, power means, a platen, type-bar mechanisms for successively typing characters on a work sheet supported on the platen, means for operatively connecting selectively the type-bar mechanisms with the power means, a totalizer including digital means for entering numbers, digit by digit, in the totalizer, feeler mechanism comprising a series of feelers for successively feeling the rotary positions of the wheels of the totalizer, said feelers being less in number than the number of different digital positions of said wheels and settable by said wheels in different combinations of positions corresponding to the different rotary positions of said wheels, a series of code bars each bar controlled by one of the feelers, means controlled jointly by all of said code bars to select and operate one of said power connecting means for the type bars, means for shifting the feelers successively from denomination to denomination of the totalizer, and means controlled by said type bars for moving said feelers toward and from the digital representing wheels in timed relation to the successive shifting of the feelers.

20. A typewriting and accounting machine comprising power means, a platen, type-bar mechanisms for successively typing characters on a work sheet supported on the platen, a totalizer including digital representing wheels, mechanism for entering numbers, digit by digit, in the wheels of the totalizer, mechanism for sensing, denomination by denomination, the total representing position of the wheels of the totalizer, a series of cams for controlling said sensing mechanism, a spring for driving the cams, means for winding the spring and mechanism controlled by said sensing mechanism for operatively connecting selectively the type-bar mechanisms with the power means to print the total entered in the wheels of the totalizer.

21. A typewriting and accounting machine comprising power means, a platen, type-bar mechanisms for successively typing characters on a work sheet supported on the platen, a totalizer including digital representing wheels, mechanism for entering numbers, digit by digit, in the wheels of the totalizer, mechanism for sensing, denomination by denomination, the total representing position of the wheels of the totalizer, a series of cams for controlling said sensing mechanism, a spring for driving the cams, a total key, means controlled by the key for winding the spring and mechanism controlled by said sensing mechanism for operatively connecting selectively the type-bar mechanisms with the power means to print the total entered in the totalizer wheels.

22. A typewriting and accounting machine comprising power means, a platen, type-bar mechanisms for successively typing characters on a work sheet supported on the platen, a totalizer including digital representing wheels, mechanism for entering numbers, digit by digit, in the wheels of the totalizer, mechanism for sensing, denomination by denomination, the total representing position of said wheels, a series of cams for controlling said sensing mechanism, a spring for driving the cams, means for automatically winding the spring to a predetermined tension and mechanism controlled by said sensing mechanism for operatively connecting selectively the type-bar mechanisms with the power means to print the total entered in said totalizer wheels.

23. A typewriting and accounting machine comprising power means, a platen, type-bar mechanisms for successively typing characters on a work sheet supported on the platen, a totalizer including digital representing wheels, mechanism for entering numbers, digit by digit, in the wheels of the totalizer, mechanism for sensing said digital representing wheels, denomination by denomination, to analyze the total entered in said wheels of the totalizer, a series of cams for controlling said sensing mechanism, a spring for driving the cams, means for normally holding the cams from rotation, a key, means controlled by the key for releasing the cams to the action of the spring and mechanism controlled by said sensing mechanism for operatively connecting selectively the type-bar mechanisms with the power means to print the total entered in the wheels of the totalizer.

24. A typewriting and accounting machine comprising power means, a platen, type-bar mechanisms for successively typing characters on a work sheet supported on the platen, a totalizer including digital representing wheels, mechanism for entering numbers, digit by digit, in the totalizer wheels, mechanism for sensing said digital representing wheels, denomination by denomination, to analyze the total entered in said totalizer wheels, a series of cams for controlling said sensing mechanism, a spring for driving the cams, means for automatically winding the spring, a key, means controlled by the key for rendering the spring-winding means active when the spring has less than a predetermined tension and mechanism controlled by said sensing mechanism for operatively connecting selectively the type-bar mechanisms with the power means to print the total entered in said wheels of the totalizer.

25. A typewriting and accounting machine comprising power means, a platen, type-bar mechanisms for successively typing characters on a work sheet supported on the platen, a totalizer including digital representing wheels, mechanism for entering numbers, digit by digit, in the totalizer wheels, mechanism for sensing said wheels, denomination by denomination, to analyze the total entered in said totalizer wheels, a series of cams for controlling said sensing mechanism, a spring for driving the cams, means for normally holding the cams from rotation, means for automatically winding the spring, a key, mechanisms controlled by the key for releasing the cams to the action of the spring and for rendering the spring-winding means active when the spring has less than a predetermined tension and mechanism controlled by said sensing mechanism for operatively connecting selectively the type-bar mechanisms with the power means to print the total entered in the said totalizer wheels.

26. A typewriting and accounting machine comprising power means, a platen, type-bar mechanisms respectively for typing successively characters on a work sheet supported on the platen, a totalizer, means for entering numbers, digit by digit, in the totalizer, means for automatically taking a total from said totalizer, machine actuated and controlled mechanism for automatically printing one or more special characters after the total to indicate the total and adjustable means to control the number of special characters printed.

27. A typewriting and accounting machine comprising power means, a platen, type-bar mechanisms respectively for typing successively characters on a work sheet supported on the platen, a totalizer, means for entering numbers, digit by digit, in the totalizer, means for automatically taking a total from said totalizer, machine actuated and controlled mechanism for automatically printing one or more special characters after the total to indicate the total and adjustable means to cause the special character-printing means to print one or more of said characters or to render the special character-printing means inoperative to print after the total.

28. A typewriting and accounting machine comprising power means, a platen, type-bar mechanisms respectively for typing successively characters on a work sheet supported on the platen, a totalizer, means for entering numbers, digit by digit, in the totalizer, means for automatically printing, digit by digit, the total from said totalizer, machine actuated and controlled mechanism for automatically operating a special type-bar mechanism one or more times to print one or more special characters after the total to indicate the total and adjustable means to cause the special character-printing means to print a single special character or a plurality of special characters after the total or to render the special character-printing mechanism inoperative to print after the total.

29. A typewriting and accounting machine comprising power means, a platen, type-bar mechanisms for successively typing characters on a work sheet supported on the platen, a totalizer including digital representing wheels, means for entering numbers, digit by digit, in the totalizer, means including feelers less in number than the number of different digital positions to be determined for automatically sensing the digital representing wheels of the totalizer, selector mechanism controlled by said sensing mechanism for selectively rendering the type bars operable by the power means to print the total entered in the register, manipulative means to render operative the sensing and selector mechanisms to cause the printing of the total, devices operable to alter the points of engagement of the sensing mechanism and the selecting mechanism to cause the selecting mechanism to select type bars to print a complement of the number set up on the wheels of the register, and mechanism for automatically setting said devices for operation by said manipulative member when the register is actuated in a subtractive direction through or from zero to a negative total condition.

30. A typewriting and accounting machine comprising power means, a platen, type-bar mechanisms for successively typing characters on a work sheet supported on a platen, a totalizer including digital representing wheels, means for entering numbers, digit by digit, in the totalizer, mechanism including a plurality of control members for automatically sensing the digital representing wheels of the totalizer, denomination by denomination, selector mechanisms controlled by said sensing mechanism to select denomination by denomination type-bar mechanisms and for connecting the same with the power means to print a number corresponding to the positions of the wheels of the totalizer, said control members being less in number than the type bar selector mechanisms controlled thereby, and means for shifting the connections between the sensing mechanism and the selector mechanisms to cause the selector mechanisms to select type-bar mechanisms to print a complement of the number present in the wheels of the register.

31. A typewriting and accounting machine comprising power means, a platen, type-bar mechanisms for successively typing characters on a work sheet supported on the platen, a totalizer including digital representing wheels, means for entering numbers, digit by digit, in the totalizer, means comprising a series of feelers for sensing the digital representing wheels of the register, digit by digit, selector mechanism controlled by said feelers for selecting type-bar mechanisms for connection to the power means to print the total set up in the register comprising permutation bars, selector levers controlled by said permutation bars, control mechanism for rendering operative said sensing means and selector mechanism, means for relatively shifting the permutation bars and selector levers to cause the selector levers to select type-bar mechanisms to print a complement of the number entered in the register and mechanism for rendering said shifting means operative by said control mechanism when the register is turned through zero in a negative direction.

32. A typewriting and accounting machine, having in combination, power means, a platen, type-bar mechanisms for successively typing characters on a work sheet supported on the platen, mechanism driven by the power means for actuating the type bars, a reversible algebraic totalizer, mechanism for entering numbers, digit by digit, in the totalizer, automatic mechanism controlled by the totalizer for operating the type bars selectively to print, as a total, the number indicated in the totalizer or the complement of such number, totalizer controlled means to determine whether such number or its complement shall be printed, and means for automatically printing special characters respectively in denominations to the left of the first significant figure appearing in the printed total.

33. A typewriting and accounting machine, having in combination, power means, a platen, type-bar mechanisms for successively typing characters on a work sheet supported on the platen, mechanism driven by the power means for actuating the type bars, a reversible algebraic totalizer, mechanism for entering numbers, digit by digit, in the totalizer, automatic mechanism controlled by the totalizer for operating the type bars selectively to print, as a total, the complement of the number indicated in the totalizer and automatic means for printing, in the printed total, to the left of the first significant figure, a special character for each "9" appearing in the number indicated in the totalizer to the left of the first significant figure therein.

34. A typewriting and accounting machine, having in combination, power means, a platen, type-bar mechanisms for successively typing characters on a work sheet supported on the platen, a totalizer including a plurality of digit representing wheels, mechanism driven by the power means for actuating the type bars, differential actuating mechanism for the totalizer for driving said wheels to enter numbers, digit by digit, therein, sensing mechanism including a series of code bars, for sensing said wheels of said totalizer, denomination by denomination, selector mechanism controlled by the sensing mechanism for selecting type-bar mechanisms to cause printing of the total represented by the positions of the wheels of said totalizer and a code bar normally operative to cause said selector mechanism to select a special character type-bar mechanism for each digital wheel representing a "0" in the total when said "0" representing wheel is to the left of a digit wheel representing a significant figure.

35. A typewriting and accounting machine, having in combination, power means, a platen, type-bar mechanisms for successively typing characters on a work sheet supported on the platen, a totalizer including a plurality of digital representing wheels, mechanism driven by the power means for actuating the type-bar mechanisms, differential actuating mechanism for the totalizer for driving said wheels to enter numbers, digit by digit, therein, sensing mechanism, for sensing said wheels of said totalizer, denomination by denomination, selector mechanism, including a series of code bars, controlled by the sensing mechanism for selecting type-bar mechanisms to cause printing of the total represented by the positions of said wheels of said totalizer, a code bar normally operative to cause said selector mechanism to select a special character type-bar mechanism for each digital wheel representing a "0" in the total when said "0" representing wheel is to the left of a digital wheel representing a significant figure, and means operated by said sensing mechanism when a wheel representing a significant digit of the total is sensed for moving the latter code bar to another position wherein it is operative to cause said selector mechanism to thereafter select the "0" type bar mechanism when a wheel representing a "0" is sensed in the totalizer.

36. A typewriting and accounting machine comprising type bar mechanisms, power means for operating said mechanisms, a direct subtraction register including digital representing wheels, differential mechanisms arranged to be operated by the power means for actuating the digital representing wheels of the register to enter numbers therein, connections between certain of the type bar mechanisms and said differential mechanisms for selectively rendering active said differential mechanisms successively to enter numbers, digit by digit, in the register, analyzing mechanism for analyzing, denomination by denomination, the several denominations of the register, means controlled by said analyzing mechanism for selecting successively the type bar mechanisms for operation to print, digit by digit, the number indicated in the register, a total key for rendering said analyzing means and said selecting means effective, means connectible to the total key to relatively shift said analyzing mechanism and said type bar selecting means to cause said selecting means to select bars corresponding to the complement of said number and means automatically controlled by the shift of the register from a positive to a negative condition or from a negative to a positive condition for controlling, respectively, the connection and disconnection of the total key and said total key operable means.

37. A typewriting and accounting machine, having in combination, a platen, power means, type bar mechanisms for successively typing characters on a work sheet supported on the platen, mechanism driven by the power means for actuating the type bar mechanisms, a totalizer including digital representing wheels, mechanism for entering numbers, digit by digit, in the totalizer, as they are typed, sensing mechanism including a plurality of control bars, each control bar having a plurality of sets of notches therein, for sensing the digital representing wheels of the totalizer, denomination by denomination, selector mechanism controlled by one set of notches of said control bars of said sensing mechanism to render certain of said type bar mechanisms operable by said actuating mechanism to print, digit by digit, the number set up in the totalizer and means controlled automatically by the totalizer for shifting said selector mechanism to a position wherein it is controlled by a second set of notches in said control bars whereby the complement of said number is printed.

38. A typewriting and accounting machine, having in combination, power means, a platen, type bar mechanisms for successively typing characters on a work sheet supported on the platen, mechanism driven by the power means for actuating the type bar mechanisms, a totalizer including digital representing wheels, mechanism for successively entering the digits of numbers in the totalizer, as they are typed, sensing mechanism including a plurality of feelers and control bars less in number than the number of differential digital positions of the number wheels of said totalizer for sensing the digital representing wheels of the totalizer, denomination by denomination, selector mechanism controlled by the joint positions of all of said bars of said sensing mechanism to select type bar mechanisms for operation by said actuating mechanism to print seriatim the digits either of the number or of the complement of the number set up in the totalizer and means controlled by the digital representing wheel of highest denomination of the totalizer for determining whether the digits of the number or the complement of the number shall be printed.

39. A typewriting and accounting machine having, in combination, power means, a platen, type-bar mechanisms for successively typing characters on a work sheet supported on the platen, means for connecting the type bars with the power means, a totalizer including digital representing wheels therein, a differential actuator mechanism for the totalizer for entering numbers, digit by digit, therein, means for analyzing the rotary positions of the digital representing wheels of the totalizer and selectively operating the means for connecting the type bars with the power means to type, digit by digit, the total entered in the totalizer, a normally untensioned spring and a rotary cycling mechanism connected to said spring for operating said analyzing means, a total key and means controlled by said total key and connected to said power means to tension said spring and thereby cause rotation of said cycling mechanism.

40. A typewriting and accounting machine having, in combination, power means, a platen, type-bar mechanisms for successively typing characters on a work sheet supported on the platen, means for connecting the type bars with the power means, a totalizer including digital representing wheels therein, a differential actuator mechanism for the totalizer for entering numbers, digit by digit, therein, means for analyzing the rotary positions of the digital representing wheels of the totalizer and selectively operating the means for connecting the type bars with the power means to type, digit by digit, the total entered in the totalizer, a normally unwound torsion spring, a rotary cycling mechanism connected to said spring and comprising a series of rotary cams for operating said analyzing means, a total key, means controlled by said total key and connected to said power means to wind up said torsion spring and thereby tend to cause rotation of said series of cams, and means common to said type bar mechanisms to control rotation of said rotary cycling mechanism.

41. A typewriting and accounting machine comprising power means, a platen, type-bar mechanisms for successively typing numeral characters on a work sheet supported by said platen, a totalizer including digital representing wheels, means for entering values, denomination by denomination, into said totalizer, a plurality of feelers engageable with said digital representing wheels and denominationally shiftable with respect to said wheels, a like plurality of code bars positionable by said feelers to positions representing the digital value of the sensed wheel and the value complemental thereto, selector mechanism engaging said code bars and normally controlled thereby to select and connect to said power means the type-bar mechanism representing the digital value, means supporting said selector mechanism and said code bars for relative movement to a position wherein said selector mechanism is controlled to connect the type bar mechanism for the complemental value to said power means, and a manipulative member to relatively shift said selector mechanism and said code bars.

42. A typewriting and accounting machine as claimed in claim 41 including a total key, means controlled by the highest denominational order of said totalizer to engage said manipulative member with said total key for operation thereby, a latch to hold said manipulative member in operated position and automatically operated means to release said latch.

43. A typewriting and accounting machine comprising power means, a platen, type-bar mechanisms for successively typing characters on a work sheet supported on said platen, a totalizer including digital representing wheels, a sensing mechanism to sense denomination by denomination, the wheels of said totalizer, selector means controlled by said sensing mechanism to select the type-bar mechanism corresponding to the value on the digital representing wheel sensed and to connect said selected type-bar mechanism with said power means, said sensing mechanism when a "0" is sensed in a digital representing wheel selecting both the "0" type-bar mechanism and a special character type-bar mechanism, a blocking member normally operative to prevent selection of the "0" type-bar mechanism by said sensing means, and means connecting said blocking member to said sensing mechanism to shift said blocking member to a special character type-bar selection preventing position upon the sensing of a significant digit in said digital representing wheels.

OSCAR J. SUNDSTRAND.

REFERENCES CITED

The following references are of record in the file of this patent:

UNITED STATES PATENTS

| Number | Name | Date |
|---|---|---|
| 1,266,660 | Bricken | May 21, 1918 |
| 1,403,130 | Marshall | Jan. 10, 1922 |
| 1,792,047 | Smith | Feb. 10, 1931 |
| 2,057,400 | Sundstrand | Oct. 13, 1936 |
| 2,132,192 | Schluns | Oct. 4, 1938 |
| 2,139,718 | Breitling | Dec. 13, 1938 |
| 2,192,365 | Pitman | Mar. 5, 1940 |
| 2,254,694 | Foothorap | Sept. 2, 1941 |
| 2,288,846 | Schremp | July 7, 1942 |
| 2,302,422 | Crouse | Nov. 17, 1942 |
| 2,308,924 | Kammel | Jan. 19, 1943 |
| 2,364,758 | Roggenstein | Dec. 12, 1944 |
| 2,370,505 | Sundstrand | Feb. 27, 1945 |
| 2,371,558 | Sundstrand | Mar. 13, 1945 |
| 2,442,402 | Davidson et al. | June 1, 1948 |